US010523449B2

(12) United States Patent
Montalvo

(10) Patent No.: US 10,523,449 B2
(45) Date of Patent: Dec. 31, 2019

(54) METHOD AND SYSTEM FOR AUTOMATED CONTROL OF LOCAL POWER USAGE INCORPORATING REPROGRAMMING AND REPLACING POWER CONSUMPTION CONTROLLERS

(71) Applicant: Consolidated Energy Design, Inc., Wall, NJ (US)

(72) Inventor: Rey Montalvo, Eatontown, NJ (US)

( * ) Notice: Subject to any disclaimer, the term of this patent is extended or adjusted under 35 U.S.C. 154(b) by 64 days.

(21) Appl. No.: 15/948,542

(22) Filed: Apr. 9, 2018

(65) Prior Publication Data

US 2018/0367320 A1 Dec. 20, 2018

Related U.S. Application Data

(63) Continuation of application No. 14/679,691, filed on Apr. 6, 2015, now abandoned, which is a continuation-in-part of application No. 13/300,517, filed on Nov. 18, 2011, now Pat. No. 9,002,761, which is a continuation-in-part of application No. 12/587,564, filed on Oct. 8, 2009, now Pat. No. 8,412,654.

(Continued)

(51) Int. Cl.
| | |
|---|---|
| *H04L 12/12* | (2006.01) |
| *G05B 15/02* | (2006.01) |
| *G06Q 10/06* | (2012.01) |
| *G06Q 50/06* | (2012.01) |
| *H02J 3/14* | (2006.01) |
| *H04L 12/28* | (2006.01) |
| *F24F 11/56* | (2018.01) |
| *F24F 11/46* | (2018.01) |

(52) U.S. Cl.
CPC .............. *H04L 12/12* (2013.01); *G05B 15/02* (2013.01); *G06Q 10/06* (2013.01); *G06Q 50/06* (2013.01); *H02J 3/14* (2013.01); *H04L 12/2803* (2013.01); *H04L 12/2818* (2013.01); *H04L 12/2827* (2013.01); *F24F 11/46* (2018.01); *F24F 11/56* (2018.01); *H02J 2003/143* (2013.01); *Y02B 70/325* (2013.01); *Y02B 70/3225* (2013.01); *Y02B 70/3275* (2013.01); *Y02D 50/40* (2018.01); *Y02P 80/11* (2015.11); *Y04S 20/222* (2013.01); *Y04S 20/228* (2013.01); *Y04S 20/244* (2013.01)

(58) Field of Classification Search
None
See application file for complete search history.

(56) References Cited

U.S. PATENT DOCUMENTS

| | | | | |
|---|---|---|---|---|
| 4,788,449 A | * | 11/1988 | Katz | ........................ H02J 1/10 136/244 |
| 2012/0239218 A1 | * | 9/2012 | Forbes, Jr. | ............. G01D 4/004 700/295 |

(Continued)

*Primary Examiner* — Bernard G Lindsay
(74) *Attorney, Agent, or Firm* — Meagher Emanuel Laks Goldberg & Liao, LLP

(57) ABSTRACT

A system, method and apparatus providing fully automatic control of energy consuming or producing devices within a building or group of buildings, the system automatically reprogramming a power consumption controller (PCC) responsive to a failure to achieve a performance goal for a respective controlled device and automatically replacing the PCC responsive to a continued failure to achieve the performance goal.

19 Claims, 18 Drawing Sheets

Related U.S. Application Data

(60) Provisional application No. 61/195,608, filed on Oct. 8, 2008.

(56) References Cited

U.S. PATENT DOCUMENTS

| | | | |
|---|---|---|---|
| 2013/0181847 A1* | 7/2013 | Willig | H04Q 9/00 340/870.03 |
| 2014/0052503 A1* | 2/2014 | Zaloom | G06Q 50/06 705/7.39 |
| 2016/0020590 A1* | 1/2016 | Roosli | H02G 3/081 361/679.31 |
| 2016/0366010 A1* | 12/2016 | Hamber | G05B 15/02 |
| 2017/0293274 A1* | 10/2017 | Choi | G05B 19/042 |
| 2018/0252428 A1* | 9/2018 | Malcolm | F24F 11/46 |
| 2018/0279429 A1* | 9/2018 | Sadwick | H05B 33/08 |
| 2019/0212022 A1* | 7/2019 | Aeberhard | F24F 11/30 |

* cited by examiner

METHOD AND SYSTEM FOR AUTOMATED CONTROL OF LOCAL POWER USAGE INCORPORATING REPROGRAMMING AND REPLACING POWER CONSUMPTION CONTROLLERS

CROSS REFERENCE TO RELATED APPLICATION

This application is a continuation-in-part of U.S. patent application Ser. No. 14/679,691, filed Apr. 6, 2015, which is a continuation-in-part of U.S. patent application Ser. No. 13/300,517, filed Nov. 18, 2011, issuing Apr. 7, 2015 under U.S. Pat. No. 9,002,761, which is a continuation-in-part of U.S. patent application Ser. No. 12/587,564, filed Oct. 8, 2009, now U.S. Pat. No. 8,412,654 which application claims the benefit of the filing date of U.S. Provisional Patent Application No. 61/195,608 filed Oct. 8, 2008, the disclosures of which are hereby incorporated herein by reference in their entireties.

BACKGROUND OF THE INVENTION

In the United States, Independent Service Operators ("ISOs") and/or their affiliates, which include Energy Curtailment Service Providers ("ECSPs" or CSPs or Aggregators), utility companies, electrical power producers that are the primary source of electrical power supplied over an electrical power grid by the utility companies, etc., are under continuing pressure to reduce demand for electrical power ("kilowatt ("KW") demand") by customers ("end users"). The reasons for reducing demand include stabilizing the power grid so that electrical power may be reliably supplied to end users, thereby avoiding brownouts or possibly blackouts. In addition, there are economic reasons to reduce demand, which include an ISO or utility company having the ability to purchase wholesale electricity for supply over the power grid from the power producers at a reasonable price. As demand for electricity increases, the wholesale price for electricity typically increases. In the event the wholesale price for electricity exceeds certain thresholds, the ISOs and/or utility companies seek to decrease KW demand from end users to maintain the price at which the electrical power can be purchased from the power producers at reasonable levels.

When the ISOs and/or utilities determine, such as for one or more of the reasons discussed above, that there is a need to reduce KW demand during a specified time period, an energy demand curtailment strategy is pursued in the form of an energy demand curtailment event. At this time, the ISOs and/or utilities typically send an email to their ECSPs requesting that KW demand be reduced during the time period, in accordance with the demand curtailment strategies associated with the event. There may be various types of energy demand curtailment events, and the objectives of energy demand curtailment for each may differ. For ease of reference, these events for reducing KW demand at end users are referred to herein as demand response events or DR events. Following receipt of the email including the requesting for KW demand reduction from the ISOs and/or the utilities, which ordinarily identifies the DR event and its demand reduction objectives, the ECSPs, in turn, transmit an email or a facsimile to, or call by telephone, end users of the utilities who have entered into demand response agreements ("DR Agreements") with the ISOs, the utility companies and/or the ECSPs to reduce KW demand during a DR event. These DR Agreements set forth the amount of electrical load to be reduced, and when such load will be reduced, for a DR event(s) by the respective end users. The end users, who, for example, may be the owner of a building or store(s), are paid a monetary incentive to reduce KW demand in accordance with the terms of the DR Agreement. The monetary incentive, which may vary from state to state and for each ISO, utility company and/or ECSP, may provide that the end user is paid a certain sum by the ISO, utility company and/or ECSP for every kilowatt demand of electricity the end user reduced during a DR event. Alternatively, the end user may receive a discount from the ISO, utility company and/or ECSP on electricity usage rate in Kilowatt Hours ("KwH"), based on the end user reducing demand by an agreed upon amount during a DR event. For example, if the end user normally pays $0.17/KwH, the end user would pay $0.12/KwH if the end user reduces KW demand during the DR events covered under the DR Agreement.

The terms of DR Agreements to reduce KW demand, for example, may depend upon the geographic location of the end users being served by the power grid. On the east coast of the United States, the utility companies are typically deregulated, and ISOs or RTOs, such as the PJM Interconnection grid that serves Delaware, Illinois, Indiana, Kentucky, Maryland, Michigan, New Jersey, North Carolina, Ohio, Pennsylvania, Tennessee, Virginia, West Virginia and the District of Columbia, have agreements directly with ECSPs, and not end users, to reduce specified amounts of KW demand in the event of a DR event. These ECSPs, in turn, have DR Agreements with end users for the end users to reduce and/or eliminate KW Demand during a DR event.

Also, currently on the west coast of the United States, such as California where the utility companies are regulated, CASIO (California Independent Service Operator or California "ISO") operates in conjunction with the three (3) major California utility companies (San Diego Gas and Electric, Southern California Edison and Pacific Gas and Electric) to manage the electrical power grid in that geographic region. These utilities have DR agreements to curtail energy demand directly with end users and ECSPs (also known in California as Aggregators). Alternatively, the utilities may have agreements with ECSPs, and the ECSPs have DR Agreements with the end users.

The current technique of end users reducing KW demand pursuant to such DR Agreements, however, depends too much upon human involvement to implement actions to achieve the agreed upon demand reduction for the DR event at the end users. There are inherent weaknesses in the current technique, because the implementation of demand reduction for a DR event depends on a human responding to an email, fax or telephone call from an ISO, utility and/or ECSPs that provides notification of a request for demand reduction at the end user for a DR event. Although some requests for energy demand curtailment for some DR events permit hours to respond, the more critical ones, and usually most lucrative to the end users, may require a response within 10 minutes or less. The necessity for a human being involved in response efforts to reduce KW demand for a DR event is problematic for the following reasons:

1) Humans do not necessarily sit by their computers waiting for "that email" to show up, or by their fax machines waiting for "that fax" to show up. By the time a human sees and reads "that email" or "that fax," there may be little or no time to implement a response at an end user, as required for the DR event under a DR Agreement. In addition, in current office environments humans use fax machines much less than emails, which further decreases the chance of a timely response for a faxed request for demand reduction for a DR event.

2) During a DR event, certain geographic areas may already be experiencing brownouts and/or black outs, such that computers and fax machines at end users may already be inoperative when a request notification is transmitted by email or facsimile. Consequently, the human (operator) responsible to implementing demand reduction at the end user to comply with the DR Agreement never receives "that call" or "that fax."

3) Humans do not necessarily sit by their office telephones waiting for "that phone call" to come. By the time they return to their desk and listen to their voice mails, there may be little or no time to respond.

4) Humans do not necessarily carry their cell phones, PDAs or other type of communication device with them at all times or, if they do, the devices may be on "vibrate." Consequently, when the request notification for energy curtailment is made, either via phone call or email, this request may be missed. In addition, by the time humans pick up their cell phone and/or PDA and listen to their voice mails or look at their emails, there may be little or no time to respond. Further, it is very common that cell phone and/or PDA coverage is bad in certain areas, such that humans may never get "that call" or "that email." In addition, it is very common that cell phone and/or PDA batteries are low or dead, such that humans may never receive "that call" or "that email" until the batteries of such devices are recharged. By such time, the end user may have missed the time period in which a response to the DR event is required under the DR Agreement.

5) Humans go on vacations, get sick, are called out on emergencies, get into accidents, fall asleep, get distracted, have higher priorities, can only accomplish so many tasks at one time, etc. All these possibilities may prevent a call for energy curtailment from being acted upon in a timely manner.

6) Humans also make mistakes. Therefore, even if a call for energy curtailment is received, appropriate action by the recipient may not be timely implemented at the end user, such that the time period in which a response to the DR event is required under the DR Agreement may have been missed.

7) Humans do not have the ability to make complex mathematical calculations with a high degree of accuracy at all hours of the day. Consequently, it is highly likely that humans will not always make the proper decisions with respect to what actions to take and/or KW demand control actions to implement, and the order in which such actions are to be implemented, based upon a multitude of criteria that needs to be evaluated simultaneously and substantially instantaneously.

Thus, based on the typical human involvement in a response to a request for energy curtailment, DR events requiring implementation of demand reduction within a short period of time are not necessarily appropriately and timely responded to by end users.

The DR events in a DR Agreement may include a "day ahead" event, for which the end user agrees to reduce KW demand the day following receipt of a DR event request from, for example, the ECSP. A "day ahead" event may arise, for example, if in the opinion of the ISO, there might be a concern of a "brown out" or "black out" the very next day and/or the demand for electricity might place the ISO and/or utility company(s) at an economic disadvantage. Currently, in most states, ISOs typically send an email for a "day ahead" DR event to the ECSPs, who in turn send relay emails, faxes and/or make phone calls to end users a day in advance of the time period when demand reduction is to begin, and sometimes only 6-10 hours in advance. Assuming a human (operator) at the end user who is responsible to implement demand reduction actions for a DR event indeed receives the notification, the operator at the end user, for example, a commercial facility, may attempt to comply by quickly moving about the facility and manually turning off electric circuit breakers and/or disconnecting switches to electrical devices having larger electrical loads. These efforts are stressful, and the larger the physical size of the end user, the more difficult it is for the operator to perform such actions. For example, an end user facility may be so large that provisions of a DR Agreement for a DR event cannot be satisfied unless a very sophisticated building automation system(s) is already in place at the end user with demand reduction strategies already preprogrammed. Even in these circumstances, however, the operator at the facility still would have to manually activate this demand response system. Even if the aforementioned building automation system(s) is remotely activated by some means, the preprogrammed procedures may not be sophisticated enough to achieve the desired result or without inconveniencing building occupants.

In addition, the DR events in a DR Agreement may include a "day of" event, for which the end user agrees to reduce KW demand the day a request is received from the ECSP. A "day of" event may arise, if in the opinion of the ISO and/or utility company(s), there might be a concern of a "brown out" or "black out" on the day in question due to less available electricity from the grid than was expected the previous day. In other words, in the opinion of the ISO and/or utility company(s), the demand on the electric grid on the day in question may very well be greater than the supply of available electricity from the grid. This could occur, for example, because the temperature and humidity conditions on the day in question are higher than had been expected the day before; certain electric power producers had equipment malfunctions, etc. In addition, the "day of" event may arise because the ISO and/or utility company(s) are attempting to counteract a potential economic disadvantage of high demand and low supply with respect to their purchase of power from electrical power producers.

Although the monetary compensation that end users may receive for complying with a request for demand reduction for a "day of" DR event usually exceeds that associated with complying with a "day ahead" DR event, an end user usually has great difficulty in complying with demand reduction requirements of a "day of" DR event. For a "day of" DR event, KW demand reduction is usually required to begin at the end user within about 3 hours, and sometimes within 10 minutes or less, of the time of notice to the end user by a fax, an email or phone call from, for example, the ECSP. Consequently, most end users cannot comply with requirements of such DR event and do not include such a DR event in the DR Agreement. Typically, unless an end user has some sort of energy management system in place and can provide for demand reduction actions to be taken within very short periods of time, the end user does not include such DR events in the DR Agreement. In addition, although an end user having a very sophisticated building automation system(s) already in place with demand reduction strategies already preprogrammed may include such DR events in a DR Agreement, there are few of such end users and, those that do exist who attempt to manually activate such systems to reduce demand, more often than not are not able to respond quickly enough to provide for compliance with a "day of" DR event and, thus, fail, either partially or completely.

Further, when a request for demand reduction for a DR event is made to an end user, such as by email, fax or telephone, the end user itself is responsible to ensure reduction in electrical power consumption from the grid is achieved. Only after the monthly utility bills have been sent to the end user, and the ECSP has reviewed these bills for compliance with the terms of a DR Agreement does the utility compensate the end user for the energy demand curtailment. This compensation, thus, may occur as much as two to three months after the response by the end user to reduce demand load for a DR event.

Also, at an end user, the typical procedure to ensure a reduction in electricity consumption requires human involvement. A human operator monitors an electric meter(s) to confirm that demand reduction is occurring in accordance with the provisions of the DR Agreement for the DR event. This human involvement in monitoring does not permit a person (energy manager) at an end user, who is responsible for management of energy usage and demand load reduction activities, to have real time information on electric KW demand usage for the end user. In addition, although so called smart electrical power usage meters are known, such meters typically do not provide real time electric KW demand usage information to an end user or, for example, an ECSP with whom the end user has entered into a DR Agreement.

Also, the necessary involvement of humans (operators) to manually take actions to reduce demand loads makes it very difficult, if not impossible, for an end user to take advantage of real time pricing of electrical power. In a real time pricing program, which is currently offered only by a limited number of ISOs but will likely be offered by more ISOs in the future, an end user may desire to take action to reduce electrical demand if the electric rate during a given hour(s) during a 24 hour period exceeds the amount the end user is willing to pay (typically expressed in $/KWH). As the actions that need to be taken to reduce KW demand at the end user are manually implemented, it is difficult for the end user to reduce KW demand accordingly, such as in large or small amounts as needed, in real time, depending upon the real time electrical rate, in comparison to a threshold electrical rate above which the end user does not desire to pay for electrical power.

Further, some ISOs may desire, but typically are not able, to reduce significant end user loads directly from their operations, for example, to compensate for frequency modulations in the power grid distribution system. The typical technique of a human (operator) at an end user manually taking actions to reduce demand load does not permit for such direct demand reduction actions by the ISOs.

Also, ISOs, utility companies and/or ECSPs typically require that an end user have the capability of reducing at least about 100 KW-200 KW demand (which may vary from ISO to ISO, RTO to RTO, CSP to CSP or utility to utility) during a DR event, for the end user to become a party to a DR agreement. Typical residential homes, however, can reduce KW demand only by about 1-2 KW, and also many smaller commercial entities, such as standalone stores or factories, cannot reduce KW demand sufficiently to meet the requirements for becoming an end user party to a DR Agreement. Previously, some utilities have made attempts to aggregate thousands of residential homes, and reduce some KW demand by cycling the homeowner's central air conditioning compressors wirelessly during hot summer days when the grid is overtaxed. These efforts by utilities have met with some success, although the nominal financial incentives, such as $10 or so, that utilities may offer the homeowner for the entire cooling season does not provide much of an inducement for the homeowners to participate.

In addition, some utilities have undertaken more sophisticated measures to reduce KW demand, such as by installing "smart thermostats" that may provide an additional amount of KW reduction. In addition, wireless ZIGBEE devices (or equivalent) have been installed in residential homes by private companies who are partnered with certain utilities, which provide both the homeowner and the utility with access to electric KW demand usage for each homeowner and also provides the homeowner with rate information and KWH usage information. Homeowners, however, can opt out of DR events and/or not participate fully, such that, even though their initial intentions are admirable, the desired KW demand reduction sought is not achieved during a DR event.

Moreover, energy curtailment techniques have little concern for, and hence typically do not consider, human factors, such comfort or convenience. Although a homeowner initially may desire to maximize KW demand reduction, the discomfort associated with doing so, for example, the existence of higher temperatures in homes during DR events, the need to schedule use of electrical devices such as electric ovens around DR events, etc., ultimately proves intolerable, thereby causing many homeowners to abandon their demand reduction goals. Further, as discussed above, humans do not necessarily sit by their "smart thermostats" waiting for a DR event notification. By the time homeowners are actually notified of a DR event, there is little or no time to do anything about it except for possibly opting out of the DR event. As current demand reduction techniques do not include real provisions that may make homeowners and their occupants comfortable, homeowners many times simply opt out of the current DR event, next DR event or series of DR events.

Therefore, there exists a need for system and method for fully automated energy curtailment at end users, when an energy demand curtailment event arises, where human involvement is not required and undesirable impacts at the end users at which demand reduction actions are implemented are avoided.

SUMMARY OF THE INVENTION

Various deficiencies associated with the prior art are addressed using a system, method and apparatus for controlling power consumption of a power consuming device such as an Heating Ventilation and Air Conditioning (HVAC) device configured to adjust a climate of a room. For example, an apparatus according to various embodiments comprises a receiver, for receiving via a radiofrequency (RF) channel a control signal associated with a demand response event; a comfort determining mechanism, for determining whether air within the room exhibits a temperature level within a temperature range; optionally a relative humidity level within a relative humidity level; and a control mechanism, for generating a HVAC control signal configured to reduce power consumption of the HVAC device in response to receiving the demand response event control signal and the room air temperature level being within the temperature range and optionally the relative humidity level being within the relative humidity range.

While various embodiment are directed to controlling HVAC equipment in accordance with criteria such as temperature and relative humidity, other embodiments are directed to controlling other power consuming devices using criteria other than temperature and relative humidity.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

Figure 1:
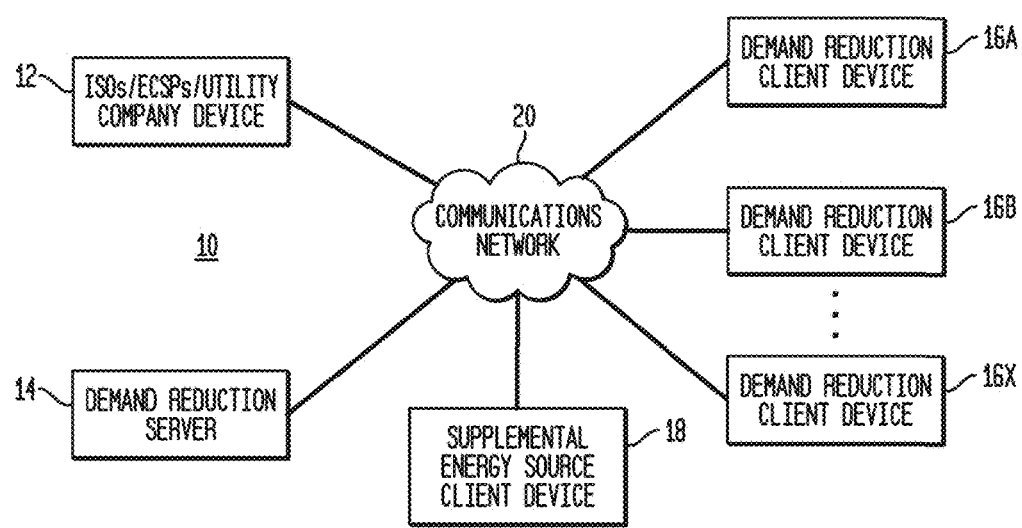
FIG. 1 is a block diagram of an exemplary system in accordance with one embodiment.

In one aspect, the inventive system and method implements, upon the occurrence of a demand response event ("DR event"), fully automated demand response to reduce KW demand at end users who are supplied electricity over an electrical power grid. The end users have entered into demand response agreements ("DR Agreements") with ISOs, ECSPS and/or utility companies, who provide for the supply of electricity to the end users, to reduce KW demand for DR event(s), where demand reduction actions are automatically implemented at the end users without human involvement, in accordance with the terms of the DR Agreements and to minimize undesired impact at the end users. DR events can also be self-initiated especially when a facility goes into "Island Mode" should utility power be disrupted and full back-up generation and its associated costs not be required or desired as described in more detail below.

For ease of describing the inventive method and system, the terms defined above are used herein and also the following definitions of terms is provided.

DEFINITIONS

End user: Any entity connected to an electrical power grid who may consume electricity supplied over the power grid and is customer of an ISO, ECSP and/or utility company. The entity, for example, may be a commercial or residential facility, such as a factory, an office building, a campus, a hotel, town, city, etc. In addition, a facility may include any defined space or region of a structure, such as a room or floor of a commercial or residential building; spaces within one or more buildings; a plurality of buildings; and any combination of spaces within respective buildings. For example, an entity may be an aggregation of commercial facilities, such as a shopping mall containing a plurality of stores, a collection of stores that are geographically separate, such as various stores of a franchise located throughout a city or state, or a collection of residential units, such as residential homes within a development or a group of residential apartment buildings.

Appliance: Any device of an end user that consumes electrical power to operate, such as a computer, A/C unit, lighting, etc., and is connected to consume electrical power supplied over the electrical power grid by a utility company, or alternatively supplied from a supplemental energy source.

Supplemental Energy Source ("SES"): A facility or a device, such as a solar panel, generator, cogeneration system, gas fired absorption chiller, gas fired absorption chiller/heater, etc., that may generate or may be controlled to generate, electricity, and may be controlled to supply the generated electricity as supplemental electrical power to an end user for consumption by an appliance(s) of the end user. As discussed below, activation of an SES may provide the end user with the ability to switch from a very expensive electricity source to an alternative natural gas or other fuel source which is typically much less expensive than electricity and, thus, opens up the opportunity for the end user to receive additional financial benefit from the extra KW demand curtailed based on this "fuel switching" activity. The supplemental energy source may be located at a stand-alone end user, at end users that are part of an aggregated end user, at a third party energy source or an electric sub-station, such as those typically subject to brownout conditions due to their distance from the primary power producers of electrical power supplied on the power grid.

Energy Device: Any appliance at an end user or any supplemental energy source.

Exterior Environmental Data: Information describing environmental conditions, such as temperature and relative humidity, outside a building or facility of an end user. The information may be obtained from conventional environmental sensors located at or near the geographic area of the end user, such as a temperature and/or Relative Humidity sensor, having the capability to create or supply electronic environmental information that may be communicated over a communication network or wired or wireless communication links; or from third parties, such as weather monitoring entities, that make information, such as weather related information, for geographic areas including or nearby the geographic area of the end user available for supply or acquisition over a communication network.

Interior Environmental Data: Information describing environmental conditions, such as temperature and relative humidity, within an interior space(s) of a facility of an end user. The information may be obtained from conventional temperature and relative humidity sensors located within a facility of the end user and having the capability to create or supply electronic environmental information, that may be communicated over a communication network or wired or wireless communication links.

Appliance Operation Data: Information describing whether an appliance of an end user is operating ("ON"), so as to be consuming electricity, or not operating ("OFF"), so to not be consuming electricity; and the status or mode of operation of the appliance when the appliance is ON, such as, for example, the temperature and/or Relative Humidity setting of a temperature and/or Relative Humidity sensor of an A/C system, the temperature setting of a furnace and the operating speed of a motor or fan.

Supplemental Energy Source Operation Data: Information describing whether a supplemental energy source is supplying supplemental electrical power for consumption by an end user; and the status or mode of operation of the supplemental energy source, such as, how much electrical power is being supplied in KWH and KW.

Monitoring Data: Appliance operation data, supplemental energy source operation data, interior environmental data and unit costs and exterior environmental data and unit costs collectively.

Demand Response Event ("DR event"): The result of a determination that there is a need to implement energy demand curtailment actions at end users to achieve demand load reduction objectives during a defined time period. A DR event may include, for example, a "day ahead" event, a "day of" event and a frequency modulation event.

Frequency Modulation Event: A requirement that an end user reduce or increase an amount of KW demand, which is usually significant, such as in excess of about 1000 KW, substantially instantaneously.

Demand Reduction Action: An action taken to implement demand load reduction at an end user, in accordance with a DR event and the provisions of a DR Agreement, or alternatively at a time other than during a DR event. The action may include reducing or eliminating consumption of electricity from the power grid at an appliance(s) of the end user, turning ON and/or controllably operating a selected appliance(s) at the end user, and/or causing supplemental energy from a supplemental energy source to be supplied to the end user for consumption by an appliance(s) of the end user.

FIG. 1 is an exemplary system 10 for implementing fully automated demand response, in real time or substantially real time, at one or more end users without human involvement, in accordance with one embodiment. Referring to FIG. 1, the system 10 may include a computer 12, a demand reduction server computer ("DR server") 14, demand reduction client devices ("DR clients") 16 and a supplemental energy source client device ("SES client") 18. Each of the computers 12 and 14, the DR clients 16 which for purposes of the exemplary illustrated embodiment are computers, and the SES client 18 has communication capabilities and may be communicatively coupled to a communications network 20.

As discussed in detail below, the computer 12 may be operated by ISOs and/or their affiliates, such as ECSPs, utility companies and the like, to transmit, over the network 20, electronic message data to the DR server 14 and the DR clients 16 which, in turn may simultaneously in real time transmit M&V reporting signals back to the ISOs, RTOs, and/or their affiliates, such as CSPs, utility companies and the like (e.g., Bi-directional communication). Further, the DR server 14 transmits data to and receives data from the DR clients 16, and optionally the SES client 18, via the network 20, to implement fully automated demand response at end users with which the DR clients are associated, in accordance with the terms of DR Agreements to which the end users are parties.

Figure 2:
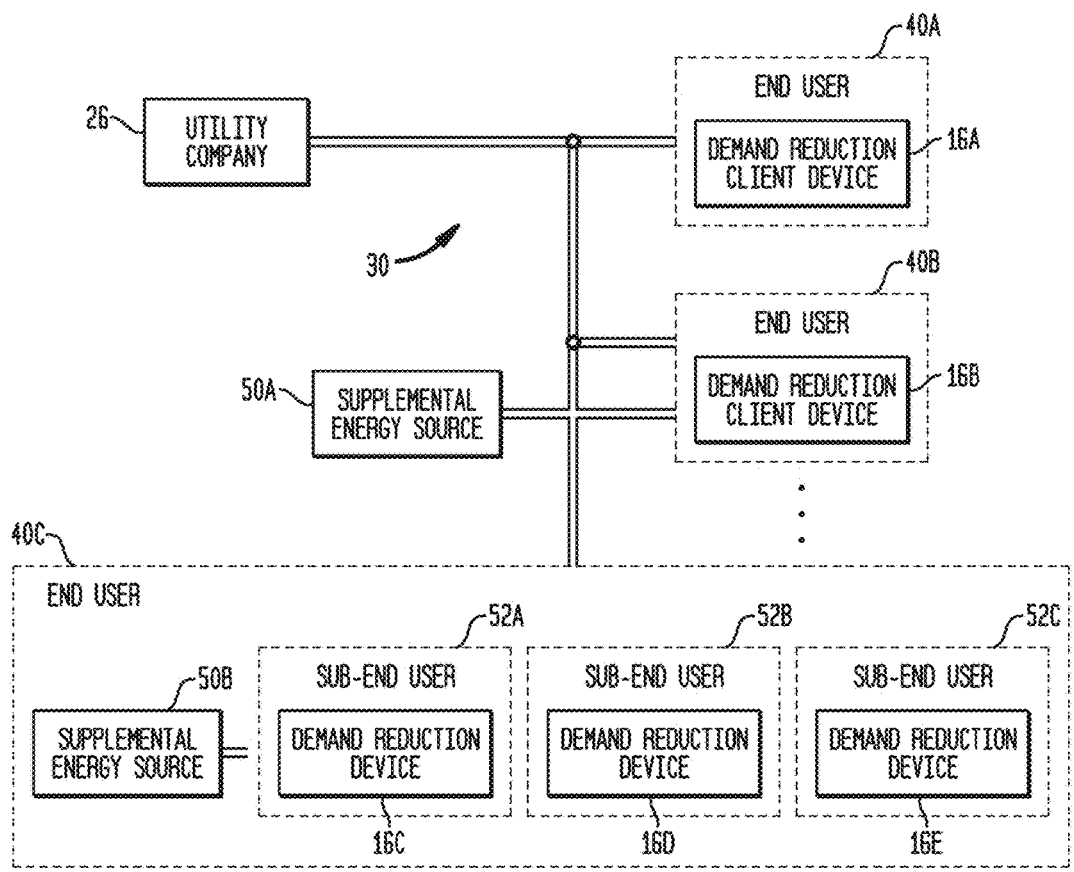
FIG. 2 is a block diagram of end users arranged to receive electrical power from an electrical power grid and supplemental electrical power sources, in accordance with one embodiment.

Further referring to FIG. 2, in an exemplary embodiment, a utility company 26, who is an operator or affiliate of an operator of the computer 12, may supply electrical power over a power grid 30 to end users 40A, 40B and 40C, who are customers of, and consume electrical power supplied over the grid 30 by, the utility company 26. In addition, supplemental energy sources 50 may be controlled, for example, by the DR server 14 or the DR clients 16 who communicate with the SES clients 18 respectively associated with the sources 50, to generate and supply supplemental electrical power to the end users 40.

In one embodiment as shown in FIG. 2, the end user 40C may include a plurality of end users 52A-52C ("sub-end users") associated with a respective plurality of DR clients 16C, 16D and 16E. The end user 40C constitutes an aggregate of sub-end users 52, where each sub-end user may be a commercial entity and/or a residential unit whose KW demand, when taken independently, is not be large enough to permit the sub-end user to qualify for participation in a demand response program of an ISO, utility company and/or ESCP, such as the utility company 26. The end user 40C, or aggregated end user, has an aggregated KW load that is sufficiently high to permit the end user 40C to be a party to a DR Agreement to reduce KW demand.

For example, the end user 40C may be an aggregation of sub-end users who are residential homeowners. A typical residential home can only reduce about 1-2 KW of electrical load during a DR event, such that a single residential home, by itself, would not qualify to become an end user that can enter into a DR Agreement with the ISO/utility company and/or ECSP, whose minimum requirement for demand reduction for a DR Agreement is typically about 100 KW-200 KW (which may vary from ISO to ISO, RTO to RTO, utility company to utility company, etc.). Consequently, the aggregation of residential homeowners into a group to form an aggregated end user permits the individual homeowners to participate in demand reduction, in accordance with a DR Agreement. It is to be understood that the end user 40C may include any aggregation of residential homeowners and/or commercial entities, such as stores, who by themselves would not qualify to become an end user that is a party to a DR Agreement.

Figure 3:
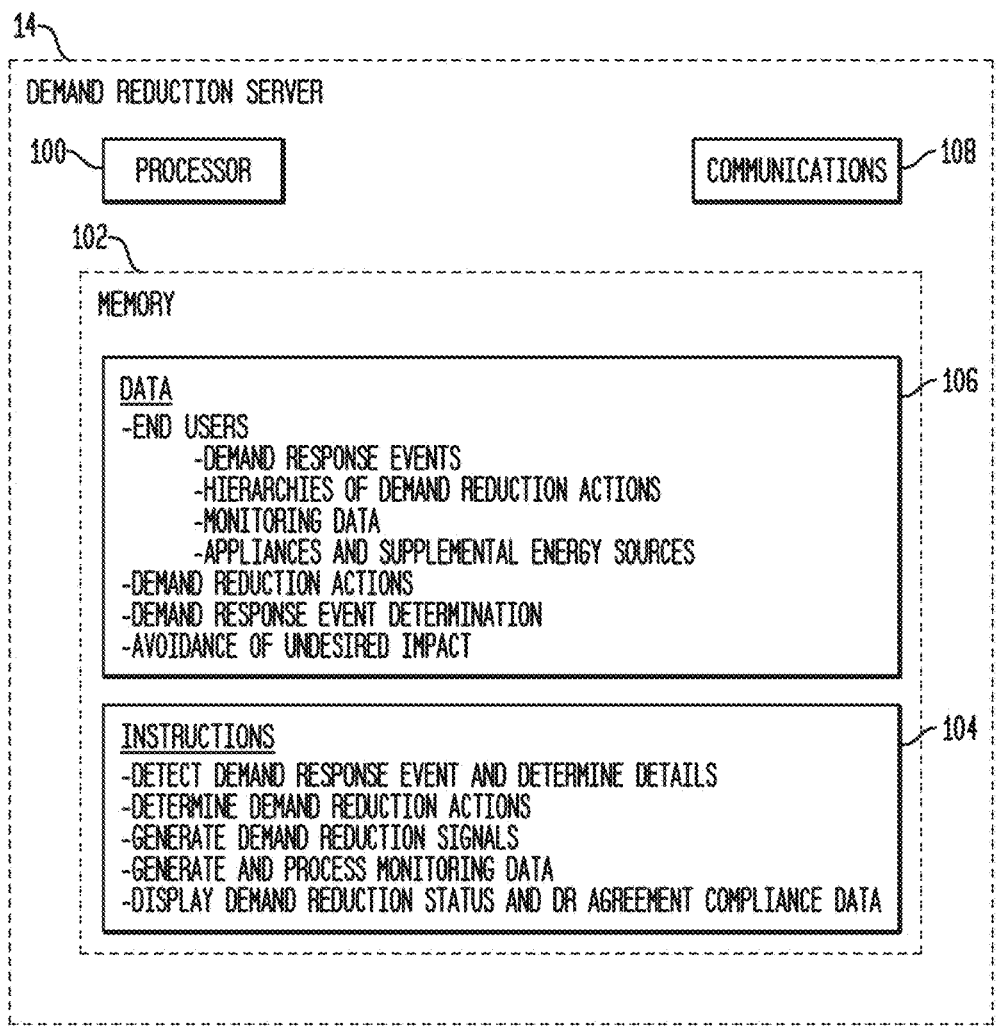
FIG. 3 is a block diagram of an exemplary demand reduction server, in accordance one embodiment.

Referring to FIG. 3, in one exemplary embodiment, the DR server 14 may include a processor 100, a memory 102, a communications network interface device 108 and other components typically present in a general purpose computer.

The memory 102 stores information accessible by the processor 100, including instructions 104 that may be executed by the processor 100. The memory 102 also includes data 106 that may be retrieved, manipulated or stored by the processor 104. The memory 102 may be of any type capable of storing information accessible by the processor, such as a hard-drive, memory card, ROM, RAM, DVD, CD-ROM, write-capable, read-only memories, etc.

The processor 100 may be any well-known processor, such as processors from Intel Corporation or AMD. Alternatively, the processor may be a dedicated controller such as an ASIC.

The instructions 104 may be any set of instructions to be executed directly (such as machine code) or indirectly (such as scripts) by the processor 100. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 106 may be retrieved, stored or modified by the processor 100 in accordance with the instructions 104. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 3 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The communications network interface device 108 is capable of establishing wired or wireless communication links with other devices over a communication network, such as the network 20.

The network 20 is any wired or wireless communications network, such as the Internet, a WLAN, a LAN, etc.

Referring to FIG. 3, the data 106 in the DR server may include information describing the terms of DR Agreements between end users and an ISO, utility company and/or ECSP to achieve KW demand reduction goals for particular DR events set forth in the DR Agreement. For each DR Agreement, the information in the data 106 describes those demand response events for which the end user agrees to reduce KW demand by implementation of one or more demand reduction actions; the demand reduction actions that the end user agrees may be implemented for a specific DR event; and a hierarchy or hierarchies indicating an order in which demand reduction actions are to be implemented for a specific DR event, where the demand reduction actions are ordered in the hierarchy or hierarchies to minimize an undesired impact at the end user during a DR event.

In addition, for each end user, the data 106 includes monitoring data that may be used by the processor 100 to determine a demand reduction action to be taken for a DR event. The monitoring data may include, for each end user, historical and real time exterior environmental data; historical and real time interior environmental data; historical and real time energy consumption data describing consumption of electrical power supplied from the power grid or from a supplemental energy source; historical and real time energy generation data describing generation of electrical power from a supplemental energy source that may be controlled to supply supplemental electrical power to be consumed by an appliance at the end user; real time energy device operation information describing the operating status of appliances at the end user and the operating status of supplemental energy sources for supplying supplemental electrical power to the end user, which includes whether the energy devices are "ON" and "OFF" and also the mode of operation of the energy devices. For example, the monitoring data may include html documents acquired from or supplied by third parties over the network 20 which including current weather and next day weather information for a geographical area local to an end user.

Further, the monitoring data may include change information representative of changes to thresholds associated with appliance operation at an end user that may be supplied from the end user, such as via the DR client 16, after the DR Agreement has been established. This threshold information may include environmental limits, such as a maximum temperature within an interior of a facility ("space temperature") of the end user, electricity pricing limits and times when certain appliances cannot be turned off. In one embodiment, the change information is supplied before a DR event, or alternatively during the course of a DR event, such as when an end user decides to partially or fully opt out of a DR event and input data is supplied that operation of selected or all appliances at the end user not be controlled, for example, turned OFF, during a DR event.

The data 106 further includes information representative of the appliances of the end user whose operation may be controlled, and the supplemental energy sources that may be controlled to generate and supply supplemental electrical power to the end user.

The data 106 also includes information describing types of DR events, and information for determining whether data included or derived from electrical message data, such as an email, XML document or SOAP document, received at the DR server 14 over a communication network, such as the network 20, corresponds to a request for demand response for a specific DR event. The DR events may include, for example, a "day ahead" event, a "day of" event and a frequency modulation event or other actions.

The information in the data 106 further provides that the processor 100 may determine, from the received, electronic message data, the details of the DR event, such as the start time, stop time and how much KW demand is to be reduced during, and also at what times during, the event.

The data 106 in the server 14 also includes information indicating an extent that demand reduction actions may cause an undesirable impact at an end user, and that the processor 100 may use, when implementing artificial intelligence, such as prediction, human centric, neural network and/or other methodologies, and desirably in conjunction with use of neural networks, to order demand reduction actions in a hierarchy or hierarchies to minimize undesirable impact at an end user. For example, such information may be used to prioritize reducing KW demand by reducing KW demand initially using appliances at the end user having lower power loads and progressively reducing KW demand by appliances at the end user having higher power loads, such as an HVAC rooftop unit, which have satisfied or nearly satisfied operational set points, such as a space temperature of a facility being at or near a temperature setting on a thermostat of the HVAC unit. In addition, the information may indicate the extent to which a demand reduction action, for example, may cause discomfort for an occupant of a building of an end user, may adversely impact a manufacturing process likely to be performed at an end user having a manufacturing facility, and may adversely impact a data center, such as a computer operation center, of an end user that likely needs to be operating continuously to avoid an unsafe condition or the end user suffering a substantial financial loss.

The instructions 104 in the server 14 may include instructions that the processor 100 may execute to detect receipt of electronic message data, such as email, XML, documents or SOAP documents, at the communications device 108 transmitted over the network 20 from an ISO, utility company and/or ESCP, process the electronic message data, by performing a conversion or translation using data in the data 106, to determine a DR event indicated by the electronic message data, and also the details of the DR event, such as the timing and demand load reduction requirements, included in the electronic message data.

Further, the instructions 104 may include instructions that the processor 100 may execute to determine one or more demand reduction actions to be implemented for a detected DR event at an end user, based on the end user DR Agreement data 106 included in the memory 102. The determination of the demand reduction action is based on the objectives and details included in the electronic message data for the DR event, and the data 106 of hierarchies of demand reduction actions, the monitoring data, and the appliance and supplemental energy source data, and the end user specified objectives or thresholds for KW demand reduction. In one embodiment, the instructions 104 may include instructions to achieve a KW demand reduction goal for a DR event at an end user by determining a demand reduction action using artificial intelligence and/or fuzzy logic and/or neural networks according to the hierarchies and to avoid undesired impact at the end user.

Also, the instructions 104 may include instructions that the processor 100 may execute to generate demand reduction action signals to be transmitted by the communications device 108. These demand reduction action signals may be transmitted to (i) a DR client 16 to provide for control operation of appliances at an end user by the DR client 16, and (ii) a SES device 18 to provide for control of generation and supply of supplemental electrical power to the end user from a supplemental energy source, during the course of a DR event.

In addition, the instructions 104 may include instructions that the processor 100 may execute to process monitoring data received, over the network 20, from DR clients 16 and also from other sources, such as third party weather data sources, supplying monitoring data; and to store the monitoring data as data 106 in the memory 102 that the processor 100 may use to determine a demand reduction action for an end user.

The instructions 104 may further provide that the DR server 14 may function as a web server that may be accessed by a computer, such as the DR client 14, and provide access to data associated with an end user based on supply of a correct user name and password. In addition, the instructions 104 may provide for generation of screen displays on a browser of the accessing device. In one embodiment, the instructions 104 may provide for generation of screen displays showing real time and historical information-representative of: electrical power consumption at an end user, supplemental electrical power generation by supplemental energy sources and usage of such supplemental electrical power by the end user, operating status of appliances of the end user and supplemental energy sources, and cost saving achieved based on the end user implementing demand response in compliance with the terms of a DR Agreement.

In one embodiment, the processor 100 may store in the data 106 electrical power consumption data included in the monitoring data received from the DR clients in 15 minute increments, and also data representative of all requests received from a utility Company and/or ECSP for energy demand curtailment.

In a further embodiment, the processor 100 may store in the data 106, for an end user, data representative of instances of KW demand first dropping to zero or changing from zero to greater than zero KW demand. In addition, the processor 100 may store in the data 106, for an end user, data representative of analog loads of an appliance, such as Variable Frequency Drives and chiller reset curves that will vary KW from 0%-100% of their total KW load.

Figure 4:
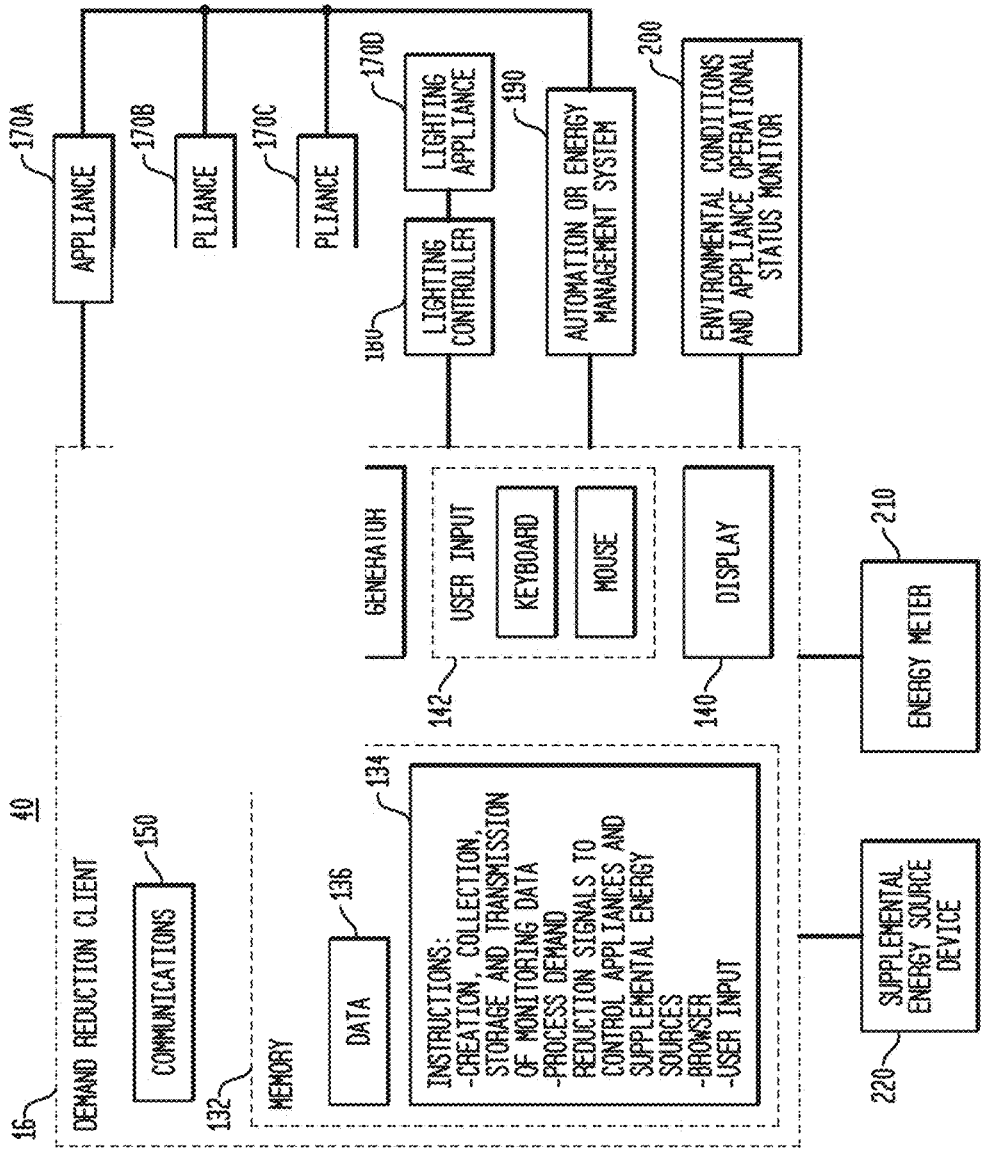
FIG. 4 is a block diagram of an exemplary end user including a demand reduction client, in accordance with one embodiment.

Referring to FIG. 4, in one embodiment an end user 40 may include a DR client 16 which is electrically and/or communicatively connected to appliances 170, a lighting controller 180 which is electrically connected to a lighting appliance 170D, and an automation control or energy management system 190 which is electrically connected to some or all of the appliances of the end user 40.

In addition, the DR client 14 is communicatively connected to an environmental conditions and appliance operating status monitor 200, an electrical power consumption meter 210 and a supplemental energy source ("SES") client device 220.

The DR client 16 may be configured similarly to the DR server 14, with a processor 130 and a memory 132 containing instructions 134 and data 136. For example, the DR client 16 may be a personal computer, intended for use by a person, having all of the internal components normally found in a personal computer, such as a central processing unit (CPU), a display device 140 (for example, a monitor having a screen, a projector, a touch-screen, a small LCD screen, a television, or another device such as an electrical device that is operable to display information processed by the processor), CD-ROM, hard-drive, a user input 142, such as a mouse, keyboard, touch-screen or microphone, speakers, and a communications network interface device 150 and all of the components used for connecting these elements to one another.

The user input 142, for example, may serve as an interface that permits a human ("operator") at an end user to modify set points, such as environmental limits and appliance operation limits, or to opt out of participation in a DR event prior to and/or during a DR event.

The instructions 134 of the DR client 16 may include instructions that the processor 130 may execute to create monitoring data from information supplied to the DR client 16, or acquired by the DR client 16 from, the monitor 200, the meter 210, the SES client device 220 and the appliances 170; to store all or portions of the monitoring data in the data 136; and to transmit the monitoring data, in real time or substantially real time, over the communication network 20 to the DR server 14.

In addition, the instructions 134 may include instructions that the processor 130 may execute to process data included in demand reduction action signals received from the DR server 14 and, in turn, provide for generation of energy device control signals and/or control data by the generator 160 and output of such control signals and/or control data to the appliances 170 and the SES client 220 to control operation, respectively, of the appliances 170 and a supplemental energy source(s), such as the source 50B, associated with the SES device 220.

In addition, the instructions 134 may include instructions that the processor 130 may execute to process signals and/or electronic data received directly from an ISO, utility company and/or ECSP, and, in turn, provide for generation of energy device control signals and/or control data by the generator 160 and output of such control signals or control data to selected appliances 170 to control their operation.

Also, the instructions 134 may provide for generation of control signals at the generator 160 that may be supplied to the lighting controller 180 or the management system 190 to have the controller 180 or the system 190, in turn, control operation, respectively, of the lighting appliances 170D and one or more of the appliances 170.

In addition, the instructions 134 may provide that the processor 130 causes electronic message data, such as email, XML documents or SOAP documents, received over the communication network 20 from the ISOs, utility company(s) and/or ESCPs to be transmitted, in real time, from the DR client 16 to the DR server 14.

Further, the instructions 134 may provide that the processor 130 includes a browser for facilitating communications over the network 20 and accessing a website of the DR server 14.

The energy meter 210 is a conventional or "smart" device that may be connected at the point at which electrical power from the grid is supplied to an end user, and also an electrical power line on which supplemental electrical energy is supplied to the end user. The meter 210 includes components for monitoring usage of electrical power from the grid and the supplemental energy source, and transmitting, over a wireless or wired communication network, to the DR client 16, in real time, data representative of the electrical power being consumed from the power grid and the supplemental energy source that supplied supplemental electrical power to the end user 40. In one embodiment, the energy meter 210 may be a sub-meter, smart meter or like meter which provides to the DR client 16 such electrical power related information as KW demand, KWH usage, voltage, amperage, power factor, KVAR, harmonics and/or other electrical characteristics.

The monitor 200 is a device that may be connected to the appliances 170, and conventional electronic environmental sensors, such as electronic temperature and relative humidity sensors located within an interior and exterior to a facility of the end user. The monitor 200 may generate or collect data representative of environmental information available at the sensors, and also of the operating status of appliances, such as whether the appliance is ON or OFF, the mode of operation of the appliance, and how much electrical power the appliance is consuming in real time, which may be provided as energy consumption information from a conventional or "smart" energy meter included as part of the appliance. The monitor 200 transmits the generated or collected data to the DR client 16 in substantially real time, where the DR client 16 converts the received data into monitoring data as described above.

The SES device 220 is an electronic device for controlling operation of the SES, such as the SES 50B, based on control signals or control data received from the DR client 16, or alternatively received directly from the DR server 14.

The lighting controller 180 and the system 190 are electronic control devices for controlling operation of appliances connected thereto, according to preprogrammed instructions which may provide for timed activation ("ON" or "OFF"), variable speed control, reset of operating level, such as reset of a chiller, or activation of selected appliances to operate in selected modes at predetermined times. The lighting controller 180 and the system 190 may include a microprocessor that generates and transmits control signals or control data according to the pre-programmed instructions and based on a control signal or control data received from the DR client 16. In one embodiment, the DR client 16 may be incorporated into the controller 180 and the system 190, such as in the form of a microchip or like hardware, which includes a processor and a memory with instructions and data as described above.

It is to be understood that, although the DR server or the DR clients 16 may comprise a full-sized personal computer, the system and method may also be used in connection with mobile devices capable of wirelessly exchanging data with a server over a network such as the Internet. For example, the DR clients may be a wireless-enabled PDA such as a Blackberry phone, I-Phone or an Internet-capable cellular phone.

In one embodiment, the DR server 14 and the DR client 16 may be configured for each end user and each ISO, utility company(s), and/or ECSP(s) to comply with the standard communication protocol of each.

Figure 5:
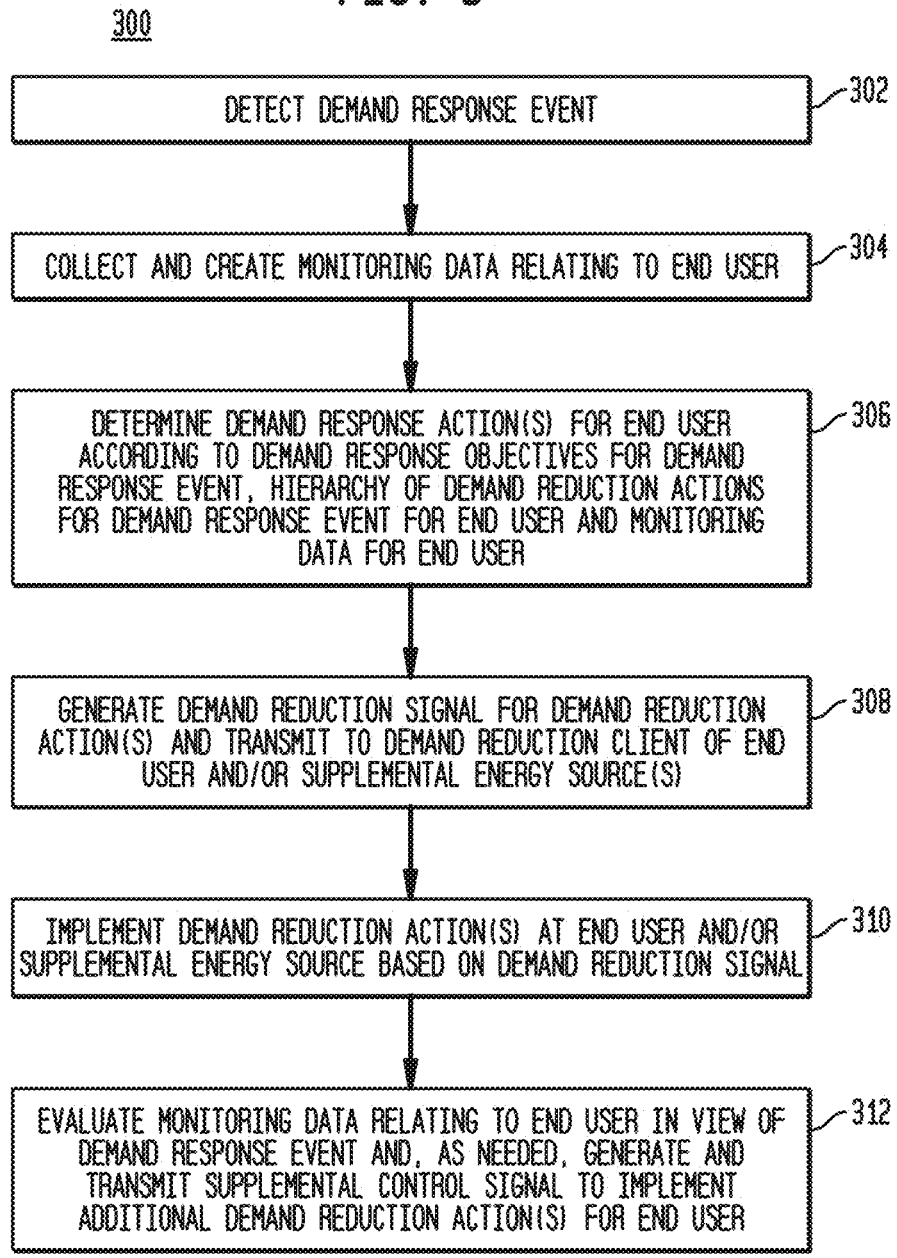
FIG. 5 is a flow diagram of an exemplary process, in accordance with one embodiment.

In accordance with one embodiment, a fully automated demand response is implemented in substantially real time based on electronic message data transmitted from a utility, ESCP and/or ISO, where demand reduction actions are automatically implemented at end users that are party to a DR Agreement in accordance with a DR event indicated by or included in the electronic message data to achieve demand reduction objectives for the utility, ESCP and/or ISO, associated with the DR event. The demand reduction actions desirably are determined in accordance with a hierarchy of demand reduction actions to minimize undesired impact at the end users and based on monitoring data for the end user. For purposes of highlighting features of the present invention, an exemplary process 300 for fully automated demand response, as shown in FIG. 5, is described below in connection with operations performed at components of the system 10, as described at FIGS. 1-4, for implementing demand reduction actions at end users 40. Although the invention is described below as the DR server 14 performing substantially all of the processing to determine demand reduction actions for implementing the fully automated demand response at the end users, it is to be understood that the some or all of the operations performed at the DR server 14 may be performed at the DR client 16 and some or all of the operations performed at the DR client 16 may be performed at the DR server 14. In addition, the invention is described below with reference to FIGS. 6-9, which illustrate exemplary signal flows, according to aspects of the present invention, to implement fully automated demand reduction actions, which require no human intervention, to reduce KW demand at an end user(s).

Referring to FIGS. 1 and 3-5, in block 302 the processor 130 of the DR client 16 continuously monitors whether electronic message data transmitted over the network from an ISO, UTILITY and/or ECSP, or like affiliate, is received and, upon determining receipt, immediately transmits the electronic message data over the network 20 to the DR server 14. The DR server 14 is typically located remotely from the DR client 16, which is typically located at or near a facility of the end user. The electronic message data may be in the form of, or included in, an email, an XML document, a SOAP document or a like electronic document or electronic signal. The DR server 14, in turn, detects the receipt of the electronic message data from the DR client 16, and then processes the electronic message data to identify the type and details of a DR event indicated by the electronic message data. The DR event and its details may be viewed over the network 20, such as by a human (operator) of the end user, by the operator using the DR client 16 to browse to the ISP address of the DR server 14 and entering a username and password.

Advantageously, the DR event and its details may be determined at the DR server 14 without human intervention, and also desirably without use of open communication protocols that some ISOs use to provide notification of a DR event. In one embodiment, the processor 100 may translate or convert the electronic message data received from the ISO into standard communication protocols such as BACNET, LON WORKS, MODBUSS and OBIX.

In an alternative embodiment, only the DR server 14 is configured to receive an electronic message data transmitted from the ISO, utility company and/or ECSP over the network 20, and upon receipt processes the received electronic message data to determine the indicated DR event and its details.

In block 304, monitoring data is continuously created at the DR client 16, and also received or acquired from other sources over the network 20, either at the DR server 14 or the DR clients 16. The DR server 14 stores the monitoring data, which includes the monitoring data created at the DR client 16 that is transmitted to the DR server 14, as the data 106 in the memory 102. The processor 100 may use the monitoring data to determine demand reduction actions for end users for a DR event. Referring to FIGS. 6-9, the monitoring data may be created, for example, from electrical power usage information supplied by a utility meter, smart meter or sub-meter, from temperature and relative humidity data provided at electronic temperature and relative humidity sensors, from sensors that monitor light levels within the interior and exterior of a facility of an end user, and from appliance operational status devices that provide information regarding the operating status of appliances, etc. For example, as discussed above, the monitoring data may include outdoor air temperature and relative humidity at the end user, local weather data, electricity usage data available at utility revenue meters within the end user, such as electric revenue meters, and electricity usage data available at additional meters, such as electric, gas, steam, water, etc. In addition, the monitoring data may include real time status of operation of appliances 170 of the end user and operating status of the supplemental energy source controlled by the SES client 220.

In block 306, the processor 100 of the server 14 may automatically determine one or more demand reduction actions to be implemented at an end user 40 for the DR event determined in block 302. The demand reduction actions are desirably determined to minimize undesired impact at the end user and in accordance with the demand response objectives for the DR event, a hierarchy or hierarchies of demand reduction actions for the DR event that may be implemented for the end user and the monitoring data relating to the end user.

In one embodiment, the hierarchies of demand reduction actions for the end user may provide for activation of lower KW demand load initially, and the demand reduction actions may be selected in view of real time and historical monitoring data relating to electrical energy consumption for the area corresponding to the end user and by performance of algorithms, including use of artificial intelligence and fuzzy logic along with neural networks, that minimize undesired impact at the end user.

For example, the initial activation of appliances having lower KW demand loads, according to a hierarchy, may include activation of low power heat reclamation fans or low power destratification fans, which an end user does not usually use when a DR event is not occurring. In addition, heat purge systems, which provide for natural cross-through ventilation in a facility by automatically opening lower and upper level windows or louvers, may be initially activated to permit cooler air to enter the facility through the lower windows (or louvers) and exhaust warmer air through the upper windows (or louvers) utilizing a low power exhaust system. Also, low power swamp coolers, which end users in dry or arid climates may use, may be activated initially.

In addition, low power desiccant systems, if available at an end user, may be initially activated. The desiccant systems may be activated according to a hierarchy where a desiccant system utilizing a solar thermal desiccant is utilized first if available, and if not, then a desiccant system using a solar photovoltaic desiccant is utilized if available, and if not, then a less expensive natural gas or propane supplemental energy source may be utilized to regenerate the desiccant wheels of such systems. It is noted that the final choice in such hierarchy of desiccant systems may be the first choice when a DR event is not occurring. Further, the desiccant systems may be operated first using electricity from solar photovoltaic units if available, and if not, then from standby gas or diesel generation. It is noted that electricity supplied by a utility over the power grid may be the primary choice for operating such systems outside of a DR event. The desiccant system may remove sufficient latent heat from the outside air and thus require less electricity be used to cool an interior space within a facility of the end user.

In another embodiment where the DR event is a "day ahead" event, the demand reduction action may be to activate a thermal storage device, such as several hours before the start of the "day ahead" event when electricity is less expensive, such as during the night, to generate .about.28.degree. F. chilled glycol. The chilled glycol then may be used to cool a building of the end user during the event the next day. At times other than during the DR event, electric cooling or a combination of electric cooling and thermal storage may be used to cool the building.

Figure 6:
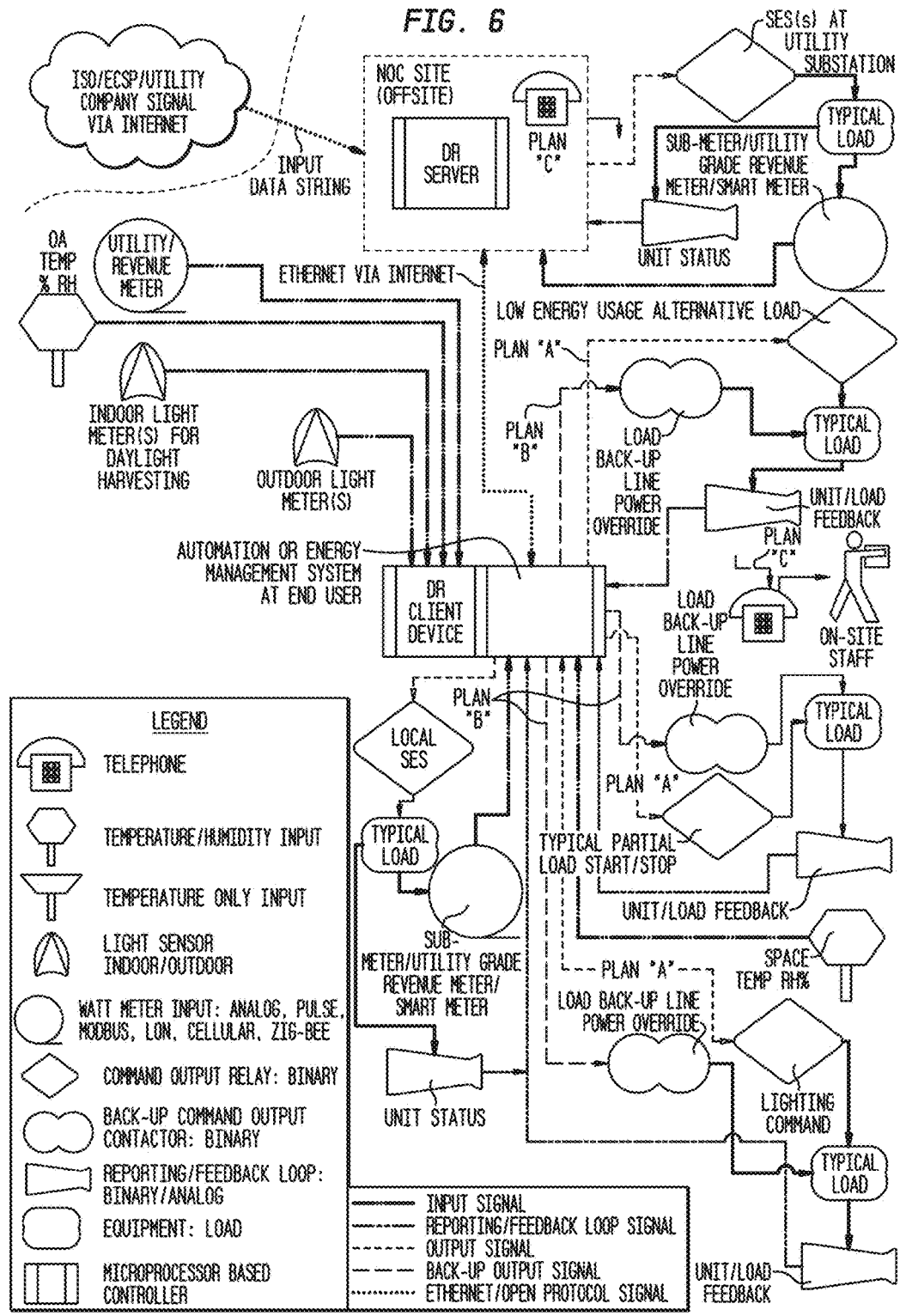
FIG. 6 is an exemplary signal flow arrangement, in accordance with one embodiment.

Referring, for example, to FIG. 6, in a further embodiment where the DR event is a "day ahead" event, historical monitoring data representative of the amount of daylight typically provided to the interior of a commercial facility through, for example, diffuse, solar tracking or Solatube® (or equivalent) skylights ("daylight harvesting" monitoring data) may be used at the DR server to determine whether lighting appliances may be turned off at the end user during the DR event, such that less electric lighting is used during the event.

In a further embodiment, the DR server may use real time monitoring data indicating daylight harvesting within a space of a facility of an end user, outside of the time of a DR event, to reduce KW demand, such as by determining a demand reduction action to turn off or dim lighting appliances within the space of the facility when the daylight harvesting monitoring data indicates there is sufficient natural light in the space.

In still another embodiment, lighting appliances, such as the appliance 170D, which have been retrofitted for improved efficiency and to provide permanent delamping, for example, an existing lighting fixture retrofitted with super high efficiency ballasts, silver reflectors and two bulbs instead of four bulbs, may be operated when diffuse or solar tracking skylights, such as described above, do not provide sufficient daylight lighting.

In a further embodiment, referring to FIG. 4, the lighting controller 180 may be, for example, a sophisticated T8 and pulse start metal halide lighting controller that reduces KW demand about 15%-18% when the light appliance 170D attached thereto is "ON." The controller 180 may be operated during the DR event, based on control signals supplied by the DR client 16 as discussed below, to control operation of the light appliance 170D to reduce KW demand about 33% to 66% during an DR event. In one embodiment, the lighting controller 180 does not lower voltage supplied to the light appliance 170D and has a negligible loss in lumens, which results in energy efficient ballasts operating at lower temperatures, such as about 13.degree. F. cooler than that of electronic ballasts not conditioned in this manner, thereby decreasing the amount of cooling needed for a space within a facility.

In a further embodiment, the demand reduction actions may include operation of a supplemental energy source 50 having a specialized energy conservation feature, so as to temporarily or permanently reduce KW demand and KwH usage from the grid, and also generation of thermal energy within a facility of an end user, during a DR event. The operation of supplemental energy sources may be arranged in a hierarchy of demand reduction actions as follows. Operation of a large scale solar photovoltaic device would be the first demand reduction action of the hierarchy that is selected to reduce the need for electricity, so as long the processor 100 determines that the monitoring data indicates there is sufficient sun to permit generation of a desired amount of electricity by such device. In the event solar conditions are not sufficient or optimal, the next demand reduction action in the hierarchy that may be selected by the processor 100 is operation of an hot water absorption chiller in conjunction with the larger scale solar thermal device to provide space cooling within a facility at nominal cost to the end user. In addition, the next demand reduction action may include activation of a standby gas or diesel generator(s), such as embodied by the SES 50B of the end user 40C as shown in FIG. 2.

In an alternative embodiment, the demand reduction action which is first in a hierarchy may be operation of wind turbines. If wind conditions are not optimal or sufficient to generate a desired amount of electricity as determined from the monitoring data, the next demand reduction action to be selected from the hierarchy may be operation of a standby gas or diesel generator(s).

In a further embodiment, the demand reduction action which is first in a hierarchy may be operation of a standby gas or diesel generator(s), or alternatively gas fired clean burning distributed generation systems if the operation of gas or diesel generator is not permitted due to code restrictions and/or high air pollution at time of operation and/or restricted run times, to generate supplemental electricity for use by the end user. For example, the operation of such supplemental energy sources may be a demand reduction action in geographical regions where summer temperatures are so high that turning a central air conditioning OFF during a DR event is not possible or practical.

In a further embodiment, the supplemental energy source 50 may be a cogeneration or trigeneration system, or a biofuel, natural methane or other alternative fuel source, that provides low cost gas fired electricity, and also provides cooling of interior space within a facility through an absorption chiller or similar equipment without incurring additional cost to the end user.

In another embodiment, a demand reduction action may be resetting an operating temperature curve of an electric chiller which is an appliance 170 of an end user. For example, depending upon an amount of KW demand load to be reduced for a DR event, a supply water temperature set point of the electric chiller may be automatically reset from, say, 44.degree. F. output to 48.degree. F. output or higher, and also a similar reset action may be automatically performed for the return water temperature set point. The processor 130 in block 304 continuously determines from the monitoring data whether the space temperature within a facility of the end user exceeds a specified pre-approved upper limit of, for example, 78.degree. F., and if yes, a demand reduction action is determined in block 306 to reduce the set point(s) of the chiller to maintain the space temperature at no more than the pre-approved upper limit. Further, according to a hierarchy of demand reduction actions and changes in the monitoring data, the processor 100 may determine that the set points of the chiller need to be further reduced, and if such determination is made, a demand reduction action is determined where a standby generator, such as a gas or diesel fired generator or distributed generator, such as the SES 50B of the end user 40C, is automatically activated to generate electricity at the end user itself, thereby reducing KW demand from the power grid.

In a further embodiment, the supplemental energy source of the end user may include a gas fired absorption chiller/heater, which may be cogeneration enabled and permit the end user to switch cooling of interior space within a facility from use of electricity to gas during a DR event. In addition, the switch from electric to gas-based cooling may also be performed at times other than during a DR event, depending upon economic feasibility or when maintenance and/or emergency repairs are performed to electrical cooling systems. In a further embodiment, the determination of a demand reduction action may be based on artificial intelligence, cost of operation of the chiller and chiller operational efficiency at various indoor and outdoor temperatures and relative humidity conditions, and may implement, during or outside of a DR event, use of one chiller as opposed to another chiller.

In another embodiment, the demand reduction action may be automatically diverting condenser water, which ordinarily flows from an electric chiller to a cooling tower, to specially designed ponds and/or fountains that utilize smaller and low power electrical pumps. The operation associated with such demand reduction action, however, may not be a primary choice outside of DR event, because of typically higher maintenance costs of filtration, etc.

In a further embodiment, the demand reduction action may be to reset an existing speed setting of a fan, blower and/or pump of an appliance 170, where appropriate, by utilizing variable frequency drives installed on such devices, thereby providing for a lower fan, blower and/or pump speeds, warmer space temperatures, and less electric KW Demand and KWH usage from the power grid.

In still a further embodiment, a demand reduction action may be to reschedule operation of appliances of the end user having electrical loads exceeding a predetermined amount, which may be considered to be large loads, for periods outside of DR events. The rescheduling may include, for example, operation of appliances used for manufacturing, charging batteries, water pumping such as used at water treatment plants, or operation of any appliance that may be operated before or after a DR event without negatively impacting the end user. In one embodiment, the rescheduling may include completely and safely shutting down computers that are not in use or are in "sleep mode." In a further embodiment, a process performed daily at a commercial facility end user may be rescheduled based on the details included in a "day ahead" DR event, which is typically received a day in advance of the start of the DR event.

In a further embodiment, the processor 100 may use the monitoring data, such as weather forecast data local to the end user, for prediction purposes, and as a result determine a demand reduction action in view of expected weather conditions at the end user. A demand reduction action determined based on expected weather conditions may, for example, reset the temperature setpoint of an A/C system to a lower temperature during morning hours to pre-cool interior space of the facility before the afternoon, when outside temperatures and relative humidity are expected to rise substantially based on the monitoring data.

In block 308, the processor 100 of the DR server 14 generates, and transmits over the network 20, a demand reduction action signal to implement the demand reduction action(s) determined at block 306. The destination of the demand reduction action signal may be, for example, the DR client 16 of the end user 40, or the SES client 18 that controls operation of the SES 50 that may supply supplemental electrical power to the end user.

In one embodiment, referring to FIG. 2, the demand reduction action(s) may be determined for one or more of the sub-end users 52 of the aggregated end user 40C, in accordance with the terms of the DR Agreement for the aggregated end user 40C, and demand reduction action signal(s) may be transmitted from the DR server 14 to one or more of the DR clients 16C, 16D and 16E to implement the demand reduction action(s).

In block 310, the DR client 16 may generate at, and output from, the generator 160 control data and/or control signals, based on the demand reduction action signal received from the DR server 14, to implement the demand reduction action(s) indicated by the received demand reduction signal. In addition, the SES client 220 may control operation of the corresponding SES 50B based on the received demand reduction signal.

In one embodiment, the control data and/or control signals output from the DR client 16 may be digital, analog or in a format suitable for an open protocol, such as LON, BACNET, OBIX and MODBUS. For example, referring to FIG. 4, the DR client 16 may transmit a control signal(s) to the fluorescent or LED lighting controller 180 to provide for operation of the appliance 170D by the controller 180, in accordance with a determined, demand reduction action. In an alternative embodiment, control signals may be transmitted directly to appliances 170 which may include therein, for example, a variable speed drive, a chiller controller, a boiler controller for controlling operation of the associated appliance.

In one embodiment, the generator 160 may include a relay module with a plurality of digital and/or analog outputs attached to respective appliances 170. Control signals are transmitted from the outputs to the respective attached appliances 170 to implement the determined demand reduction action(s), and thus reduce KW demand during a DR event based on the terms for the end user 16 (FIG. 4) set forth in the DR Agreement.

Still referring to FIG. 2, the supplemental energy source device 220 within the end user 40C, based on receipt of a demand reduction signal directly from the DR server 14 or a control signal or control data from the DR client 16, may cause the attached supplemental energy source 50B, such as an emergency standby generator, a distributed energy generator, etc., to supply supplemental electrical power to the end user.

Referring again to FIG. 5, in block 312, the processor 100 of the DR server 14 continuously evaluates the monitoring data, such as for the appliances 170 on which demand reduction actions are being implemented, during the DR event and determines, desirably using artificial intelligence, whether the demand reduction actions should continue to be implemented, or alternative demand reduction actions should be determined and implemented in place or together with the demand reduction actions being implemented, to ensure that the demand load reduction strategies in the DR Agreement for the end user are maintained.

In one embodiment where the processor 100 determines, from the monitoring data, that a permissible upper threshold relating to operation of an appliance, such as a maximum indoor space temperature for a facility of the end user, has changed, the processor 100 may re-arrange an order of demand reduction actions in a hierarchy, desirably using artificial intelligence, to ensure that the modified maximum temperature is not exceeded by implementation of demand reduction actions according to the hierarchy during a DR event. For example, the threshold that is changed may be an indoor space temperature limit, an electricity pricing limit, and appliance operation mode prior to a DR event.

In a further embodiment, the determination of a demand reduction action from a hierarchy is performed using artificial intelligence supplemented by neural networks. For example, the neural networks may apply weightings to demand reduction actions in view of the monitoring data indicating interior space temperature and available daylight, to provide that the determined demand reduction action may implement an energy curtailment objective with minimal undesired impact on the end user.

In one embodiment, the processor 100 may process monitoring data representative of the status of an appliance for which a demand reduction action should have been implemented to confirm whether the appliance in fact has responded to control signals generated at the client device 16 of the end user.

In a further embodiment, each of the appliances 170 that may be controlled at the end user during a DR event include (i) a current sensing transducer (CT) in the electrical power supply line for the appliance, and (ii) a power control relay connected to a secondary wiring control system and whose contacts may be separately controlled to cause interruption of the supply of electrical power to the appliance. For example, if the appliance 170 is operating, current will flow through the voltage leads of the CT, such that the CT will close, and information representative of the CT closing is provided to the DR client 16. If the appliance 170 is not operating, however, current will cease to flow through the voltage leads and the CT will "open," and information representative of the CT being open is provided to the DR client 16. The DR client 16 generates feedback monitoring data from such information which includes information identifying the subject appliance that is operating or not, and then transmits, in substantially real time, such monitoring data to the DR server 14 over the network 20. The processor 100, in turn, in substantially real time, processes the feedback monitoring data to confirm the operating status of the appliance 170, and in particular whether or not the appliance has responded to a control signal transmitted by the DR client 16, based on the demand reduction action signal of the DR server, to turn OFF the appliance. If the appliance has not responded, the DR server 14 determines a further demand reduction action, desirably without human intervention.

Thus, if the DR server 14 determines a demand reduction action, using hierarchical artificial intelligence processing, to turn OFF a particular appliance at an end user, and the feedback monitoring data received at the DR server 14 for the end user indicates that the CT of the appliance remains closed, the appliance continues to operate, and thus, does not contribute to achieving reduced KW demand according to the Agreement for the end user. In such circumstance, the processor 100, based on the feedback monitoring data that is substantially instantaneously supplied to the DR server 14, may determine a further demand reduction action to be implemented at the end user. Referring, for example, to FIGS. 6-9, further demand reduction actions ("plan B" and optionally "plan C") may be implemented at a commercial facility end user, when it is determined, such as by the DR client of the end user or the DR server, based on the monitoring data, that an initial demand reduction action ("plan A") was not successfully implemented. The further demand reduction action of "plan B" may be, for example, instructions for the DR client 16 to generate a control data override signal to automatically turn off the appliance by means of the secondary wiring control system of the appliance 170. In a further embodiment, if the processor 100 still determines that the appliance is not turned OFF from the feedback monitoring data, despite the implementation of the further demand reduction action of plan B, the DR server 14 may implement a "plan C" by transmitting a demand reduction action signal to a computer device at the ISO, utility, ECSP and/or the end user to cause an alarm to sound and/or be visible on a display to alert all concerned parties of the malfunction of the appliance. Advantageously, all parties are notified of the precise appliance that does not turn OFF as commanded, and also exactly where this appliance is located in a facility of the end user. Further, the DR server 14 may transmit, as part of the "plan C" demand reduction action, an email, page, fax and telephone to an operator of the end user that the appliance is not responding to control signals, such that the operator can manually turn off the appliance during the DR event.

In still a further embodiment where each of the appliances 170 at the end user are connected to the building automation system 190, such as shown in FIG. 4, a special emergency override "button" on the system 190 may be depressed by the operator, who has received notification of a malfunctioning appliance(s) 170 from the DR server 14, to electronically turn OFF all appliances, including the malfunctioning appliances, that need to be turned OFF during a DR event to achieve a demand reduction agreed to under the DR Agreement.

In a further embodiment, the processor 100 of the DR server 14 causes transmission of a demand reduction action signal to the DR client 14 in advance of the start time of a DR event, such as five minutes before the start time, where the signal causes the processor 130 of the DR client 14 to control the lighting appliance 170D through the lighting controller 180 to turn on and off several times, and also to control appliances that are speakers at the end user to generate audible warning sounds, a predetermined time before the start of the DR event.

In another embodiment, the processor 100 may use artificial intelligence to minimize undesirable impact to the end user, in view of monitoring data representative of space temperatures and other critical conditions, to determine a second demand reduction action in a predetermined hierarchy of demand reduction actions to be implemented in place of, or together with, the previously determined first demand reduction action of the same or another hierarchy. For example, the processor 100 may determine that one or more or all demand reduction actions be terminated for an end user, such as a residential homeowner, if the monitoring data for the residence indicates that the indoor air temperature exceeds 78-80.degree. F. and/or 65% relative humidity. Consequently, in block 312, the DR server 14 transmits a supplemental demand reduction action signal to the DR client 16, such as the DR client 16C of the end user 40C corresponding to the residence, which causes the appliances within the residence to revert to a default status not associated with a DR event.

In still a further embodiment, referring to FIG. 2, the processor 100 may control a supplemental energy source 50B, which may be a distributed generation plant(s) directly tied into the power grid 30, such as a utility electrical sub-station or a third party electrical power producer, to provide supplemental electrical power to an area associated with the end user 40C which typically suffers brownout conditions due to its isolated location in the electrical power distribution chain, to supply supplemental electrical power on behalf of the aggregated end user 40C. The processor 100 may perform such determination when the monitoring data indicates that several of the sub-end users of the aggregated user 40C decided to "opt out" of a DR event. In such circumstances, the DR server 14 may directly activate the supplemental energy source 50B, by transmitting a demand reduction action signal to the corresponding SES device 18, in accordance with how much supplemental electrical demand reduction is required. The DR server 14 determines the amount of supplemental electrical power that is needed, based on the monitoring data provided from the DR clients 16C, 16D and 16E, which is representative of the real time electric KW demand of each the sub-end users 52A, 52B and 52C of the end-user 40C obtained from respective energy meters 210 (FIG. 4) within the sub-end users 52. The processor 100 compares the cumulative total demand reduction by the aggregate of sub-end users, which may be single home residences or small stores that are part of a chain of stores, with the demand reduction under the DR Agreement for the aggregated end user, and any difference (deficit) in demand reduction is removed by a demand reduction action that automatically activates the supplemental electrical energy source 50B to generate and supply supplemental electrical power at least equal to the deficit. For example, if the aggregated end user 40C entered into a DR Agreement committed to 30 MW of demand reduction for a DR event, and some of the residence or small retail store sub-end users of the aggregated end user 40C opt out of the DR event such that the total aggregated demand reduction only would be 20 MW, the processor 100 automatically and in substantially real time determines such circumstances and activates, by transmission of a demand reduction signal, such as within 60 seconds, to one or more supplemental energy sources 50B, such as a gas fired, bio fuel, diesel, methane, propane, hydrogen fuel cells or some other fueled distributed generators, as needed, to make up the 10 MW deficit. Advantageously, this implementation of demand response for an aggregate of residences or small stores, in accordance with one embodiment, without human involvement, may redirect electrical power, in the form of supplemental electrical power, to the portions of the grid where the electrical power is needed when there are already historically known areas that suffer from low voltage during high demand periods; and may determine exactly how much electrical power is needed to be diverted or generated by a supplemental energy source.

In one embodiment, the monitoring data may include information representative of whether and how many times a sub-end user of an aggregated end user opted out of a DR event. The DR server, based on such monitoring data, may determine a monetary award for the sub-end user, and the monetary award desirably is determined pro-rata based on the level of participation of the sub-end user in DR events of the aggregated end user. The level of participation may be, for example, a function of the amount of KW demand reduced and/or the percentage of the total number of DR events in a time period, such as a month, for which the sub-end user opted out.

Figure 7:
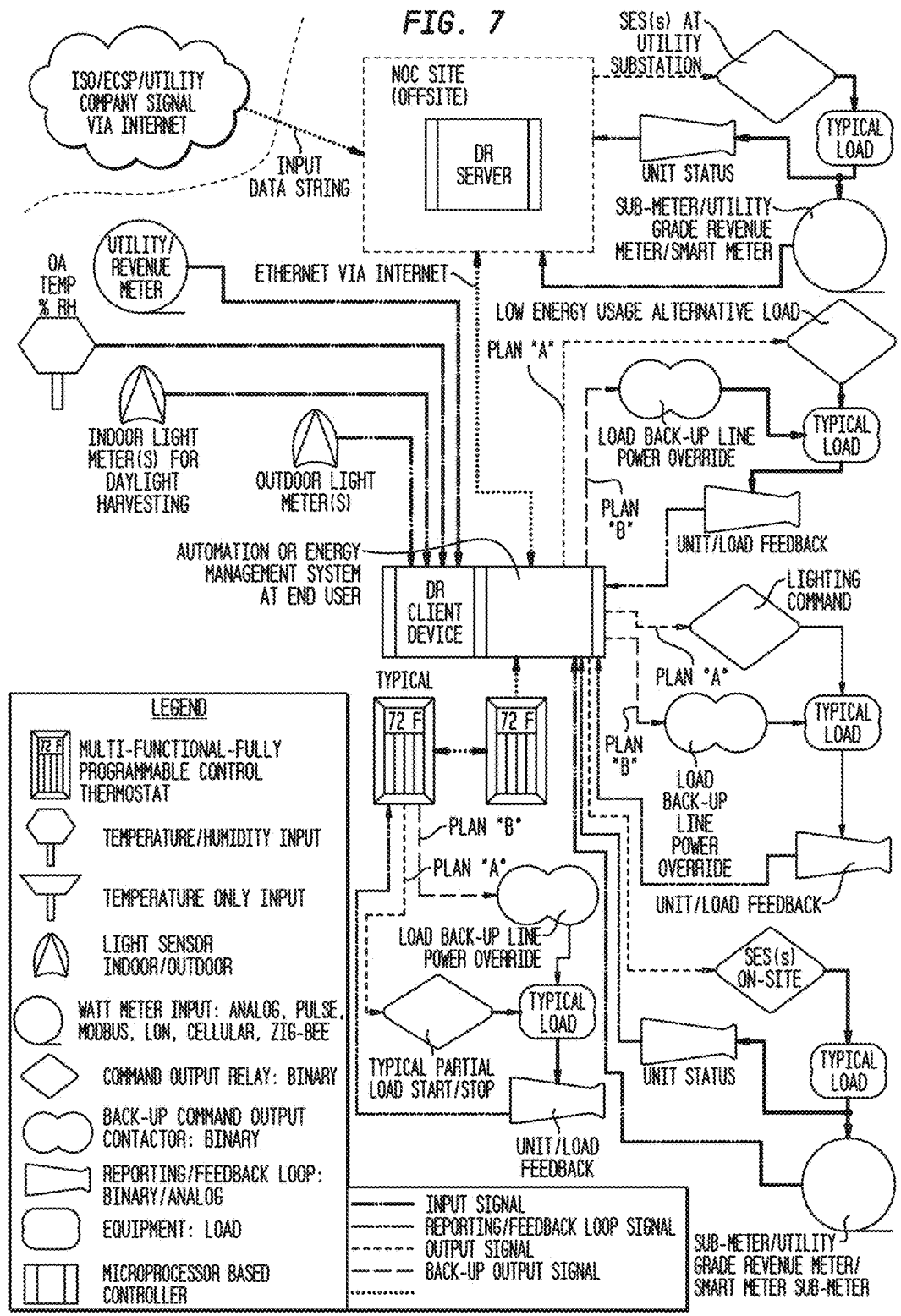
FIG. 7 is another exemplary signal flow arrangement, in accordance with one embodiment.
Figure 8:
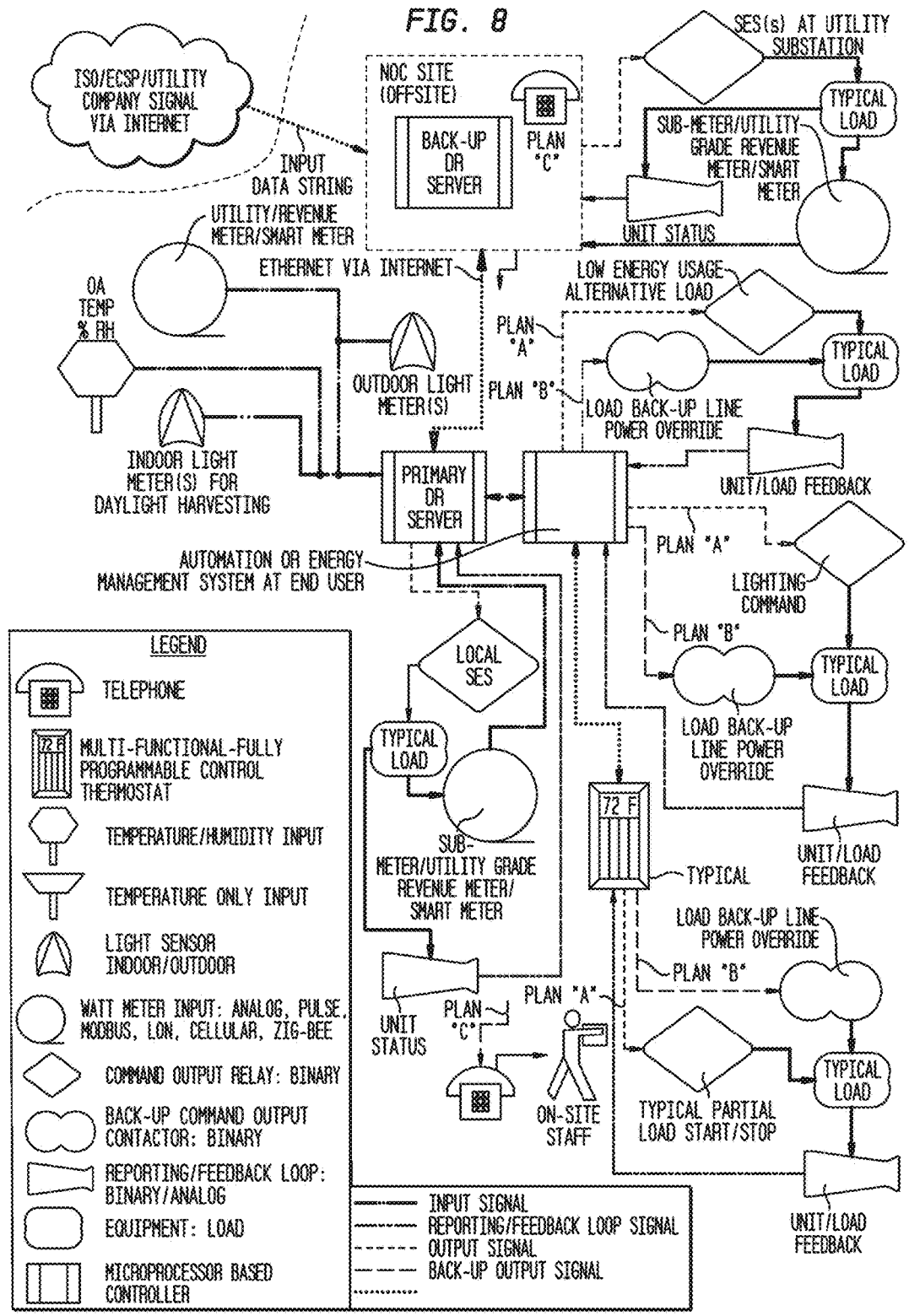
FIG. 8 is another exemplary signal flow arrangement, in accordance with one embodiment.

In a further embodiment, and referring, for example, to FIGS. 7-8, the processor 100 continuously evaluates monitoring data indicating space temperature, based on information obtained from multifunctional fully programmable control thermostats or "smart thermostats" installed in sub-end user residential units of an aggregated end user. Based on the evaluated monitoring data, the processor 100 may determine a demand reduction action that provides for (i) a return of the smart thermostats to a default condition so as to not implement a KW demand reduction, and (ii) activation of ceiling fans in the sub-end user units to make the occupants of the units more comfortable during the DR event. In this manner, the fully automated demand system of the present invention may achieve energy curtailment objectives for a DR event while maintaining the comfort of occupants of end user residential units, thereby providing for greater participation of residential unit end users to achieve demand reduction and increasing the chances of successful energy curtailment for a DR event initiated by the ISOs, utilities and/or ECSPs.

In a further embodiment, a manager(s) of an aggregated group of residences constituting an aggregated end user who entered into a DR Agreement may be paid a monetary incentive to reduce electrical demand, based upon individual agreements between the manager and each owner of a residential sub-end user unit forming the aggregated end user. A similar strategy may be employed for smaller stores that are part of a chain of stores or a similar group of facilities that would otherwise not be able to participate in demand reduction in connection with a DR Agreement without being part of an aggregation.

In one embodiment, the processor 100 of the server 14 may provide for an arcade style or other suitable screen display on a web site that may be accessed, such as from the DR client 16 or a computer, and may show information relating to energy curtailment at an end user 40. The display, for example, may include a listing of appliances at the end user that may be controlled during a DR event to reduce KW demand along with how much electrical power the appliances are currently using; a listing of the appliances and/or supplemental energy sources that may be controlled during respective DR events along with indicators identifying whether the appliances and/or supplemental energy sources are being controlled to reduce KW demand for a particular DR event and what the DR event is; a summary of savings based on implementation of demand reduction according to the DR Agreement, including a display of how much money or other metric is being saved based on demand reduction being performed during a current DR event; and a summary of cumulative savings displaying how much money or other metric has been saved based on implementation of demand reduction implemented according to the DR Agreement for the current year and the current month. In addition, the display may show to the manager of a sub-end user how much financial award the manager has accumulated, or is currently accumulating, based on the implementation of demand reduction at sub-end users for a DR event(s). Thus, the display provided by the inventive system may entertain the manager and also encourage the manager to continuously adjust operation of appliances at the end user to increase reduction of KW demand that may be achieved, during implementation of fully automated energy demand curtailment by the inventive system and method, on a 24/7 basis, even outside of DR events, and therefore achieve even greater financial rewards for both the manager and the company (end user) of the manager. In addition, such actions by the manager may work to the advantage of the ISO/utilities and/or ECSPs in that their KW demand response goals stand a better chance of success.

In a further embodiment, an operator of an end user who accesses a website of the DR server 14 may select a type of music to be supplied, such as from the server 14 or a third party music content source, while the display is shown on the website.

In still a further embodiment, a website of the DR server 14 (may include energy curtailment information that end users, or sub-end users of an aggregated end user, may access to become informed about the DR agreement, potential financial awards and demand reduction actions that may be implemented during a DR event, etc., to provide that the end users may become willing participants in a DR Agreement and, consequently, increase the likelihood of compliance with the terms of the DR Agreement.

In an alternative embodiment, all or substantially all of the processing, and all or substantially all of the data, to implement a fully automated demand response at the end user in accordance with the present invention may be viewed on a display of a computer, similar to the client device 16, located remotely from the end user, such as at a network operations center at which implementation of demand response for a plurality of sub-end users of an aggregated end user may be controlled.

In still a further embodiment, the processor 100 of the DR server 14 may process monitoring data representative of real time electric meter readings at end users, such as from the energy meter 210 as shown in FIG. 4, to permit ISOs, ECSPs, utility companies and/or end users to confirm, at their own Network Operating Centers (NOCs), via the website of the DR server 14, such as illustrated in FIGS. 6-9, or other methods, exactly how much KW demand is being reduced during a DR event in real time. The display may also be controlled to provide an audit trail of energy consumed from the power grid, which may be used prove compliance with the DR Agreement to the ISOs, utility companies and ECSPs, where the audit trail is desirably in an EXCEL spreadsheet or other formats.

In another embodiment, an operator of an end user may input data on the user input 142 to select sound effects to be generated at the DR client 16 that may alert the operator that certain demand reduction actions are being implemented at the end user.

In another embodiment, a sub-end user of an aggregated end user which is a single residential unit, such as a single family home, may include managed appliances 170B, such as ENERGY STAR rated ceiling fans that may be wirelessly controlled individually from a management system 190 for each occupied room of the house, such as during an DR event. In addition, each single family home residential unit may include an ENERGY STAR rated whole house dehumidifier. A demand reduction action may include utilization of such appliances during a DR event so as to make warm indoor temperatures during a DR event more bearable for occupants of the residential unit due to much greater air movement, thereby minimizing undesirable impact during a DR event to make the occupants of the residential units as comfortable as possible and thus minimize the number of homeowners that "opt out" of a DR event(s).

In another embodiment, the DR event may be a frequency modulation event, which is a request by an ISO for direct control of an extremely large electrical load, for example, a 10,000 hp motor, at an end user for a short period of time and where the request may be made at anytime. Referring to FIG. 4, at the end user 40, an appliance, such as the appliance 170B, may include a motor operating at an extremely large electrical load and a variable frequency drive or like drive element, as conventionally known in the art, that is used to drive the motor and may receive a fully modulating signal for controlling operation of the motor. The fully modulating signal may be received at the appliance directly from an ISO, or alternatively from the DR client 16 in response to a request for such modulating signal transmitted from the ISO to the DR client 16 or the DR server 14. This modulating signal is typically 0-10 VDC or 4-20 mA, and essentially increases or decreases the speed of the motor within the appliance 170B to help the ISO modulate/regulate electrical power frequencies on the grid and also reduce significant KW demand.

In a further aspect, demand reduction actions implemented at an end user may include demand reduction actions implemented after a DR event ends ("post-DR event demand reduction actions"). These post-DR event demand reduction actions may be implemented to avoid too large of a KW demand immediately after a DR event ends, based on appliances being switched to operate at default set points too quickly after the end of the DR event, which would result in high KW demands for the utility billing period immediately following the DR event. After the DR event is concluded, the processor 100 may desirably determine post-DR event demand reduction actions according to a hierarchy of artificial intelligence programmed commands that correspond to those demand reduction actions initiated at the onset of the DR event just terminated, to reduce high KW demand after DR event. The implementation of such post-DR event demand reduction actions may protect expensive HVAC equipment, as well as ensure that new KW demand peaks during a utility billing period are not established.

In still a further aspect, the DR server 14 may determine demand reduction actions to implement demand reduction objectives automatically, and without human involvement, at end users during time periods not within a DR event defined by an ISO, utility company and/or ECSP. For example, the DR server 14 may provide for continuous reduction of KW demand and electrical power KWH usage on a twenty-four a day, seven day a week basis, at an end user during time periods not within a DR event defined by an ISO, utility company and/or ECSP, based on demand reduction criteria provided by the end user. This continuous reduction of KW demand (and associated KWH usage) may include determining demand reduction actions to be implemented at the end user that reduce unnecessary operation of appliances and/or generation of thermal energy, such as by operation of selected appliances in selected operating modes, where the selected appliances involve, for example, space heating, domestic hot water generation and fossil fuel-based appliances used for snow melting.

Figure 9:
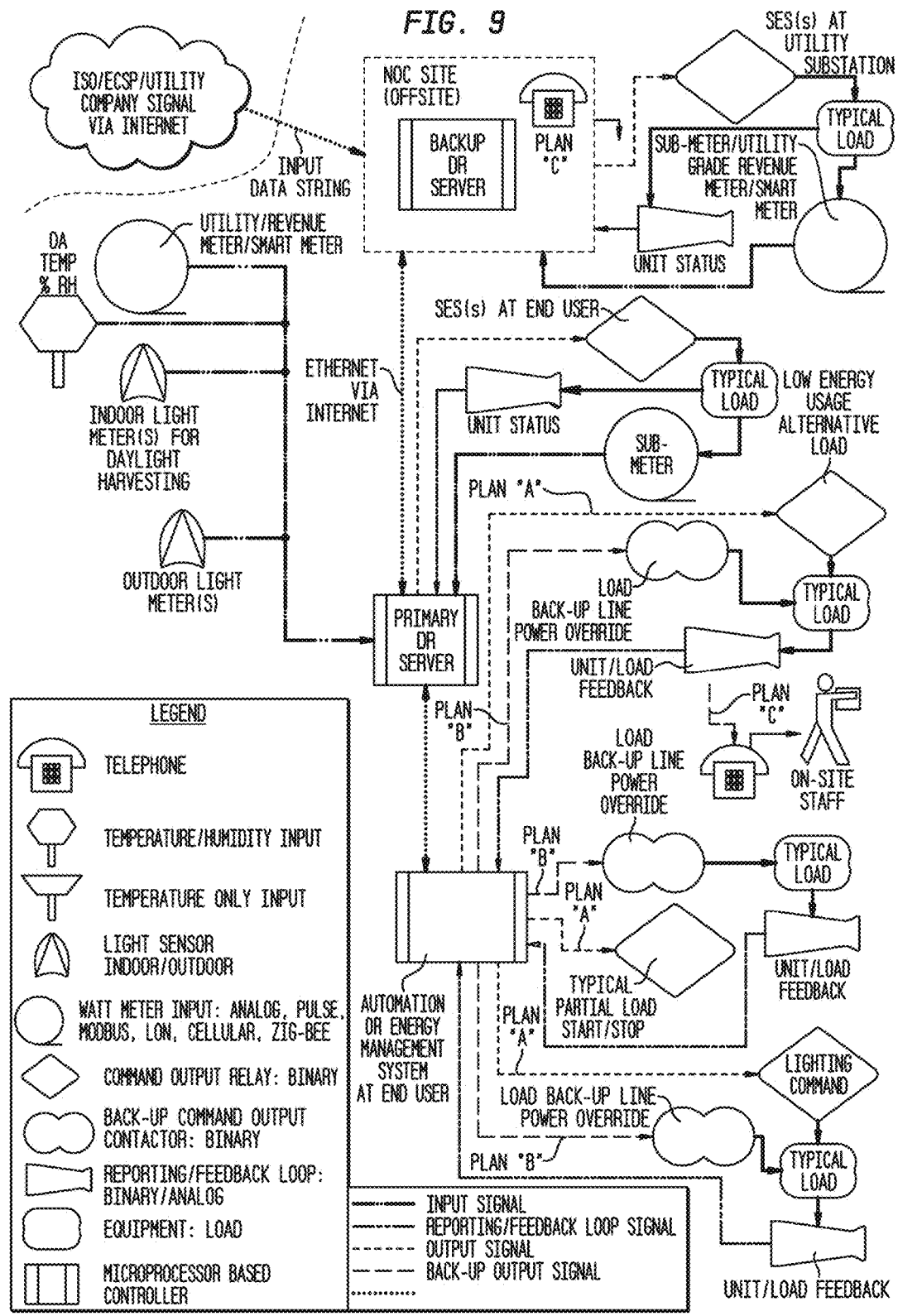
FIG. 9 is another exemplary signal flow arrangement, in accordance with one embodiment.

Referring to FIGS. 8-9, in one embodiment fully automated demand reduction may be implemented using a primary DR server at the end user, and a back up DR server located remotely from the end user, for example, at a NOC, where the primary and back-up DR servers provide for all or a portion of the functionalities of the exemplary DR server 14 of FIG. 3. The back-up DR server sends demand reduction action signals to the primary DR server and receives monitoring data, which may include feedback data, from the primary DR server, which may cause certain demand reduction actions to be determined for implementation at the end user. In one embodiment, the primary DR server may operate to implement fully automated demand response during a DR event or to automatically implement reduction of KW demand and KWH usage at all times of day outside of a DR event. In the event a problem may arise at the primary DR server that prevents it from fully performing its functions, the back-up DR server, based on artificial intelligence programming along with neural network technology, may become aware of this problem substantially instantaneously and automatically take over the functions of the primary DR server while at the same time handling its own prescribed functions.

In another aspect, the DR server 14 may provide for implementation of a demand reduction action in form of demand rolling, which may occur during a DR event or in the absence of a DR event. In demand rolling, the processor 100 may provide that the DR client 16 reduces a percentage of the KW electrical load for the end user every 15 minutes, and on the 16th minute restores those electrical loads and reduces the same percentage of other electrical loads at the end user so that the total KW demand does not to exceed a pre-established threshold. The features of this demand reduction action are established based on the fact that utility electric meters typically read an average KW demand over 15 minute increments. In one embodiment, the pre-established threshold may differ monthly, and vary from a previously established baseline in accordance with days previously identified as heating and cooling degree days requiring more or less KW demand. In another embodiment, the processor 100 may utilize monitoring data from enthalpy sensors indicating enthalpy information, which is total heat content information including temperature (sensible heat) and moisture in air (latent heat), to determine, using artificial intelligence, whether or not the total KW of demand rolling may be increased without adversely affecting the end user. In a further embodiment, the processor 100 may evaluate monitoring data representative of temperature and/or humidity in the interior space of a facility of an end user impacted by demand rolling, so that the demand reduction action may provide that appliances with certain electric loads are reinstated (turned ON) and other appliances already closest to temperature and/or humidity set points agreed upon by the end user are turned OFF, where different spaces or facilities impacted by the demand rolling may have different set points.

In a further aspect, the DR server 14 may provide for operation of a supplemental energy source if the rate of electricity exceeds the average price in $/Kwh that the end user typically pays. This is made possible by the ISO, utility company, and/or ECSP providing the DR server 14 with the price per KWH hourly for the next 24 hours. Based on this information, the processor 100 of the DR server 14 may automatically determine which hours the price for electricity is higher than the average price the end user pays, and so long as the end user can produce electricity (including fuel, maintenance and equipment burden) for less money than the end user can purchase electricity from the utility company, then the demand reduction action automatically implemented is to turn on a supplemental energy source, such as a distributed generator(s), to produce electricity during those high cost hours. In one embodiment, the determination by the processor 100 is in accordance with an "Economic Dispatch" model, which includes rules and/or information regarding when it makes economic sense to turn on a supplemental energy source. In a further embodiment, the determination of a demand reduction action is based on artificial intelligence and in accordance with an economic dispatch model, and may implement, during or outside of a DR event, a switch of energy sources, such as from electric to gas cooling, or use of one chiller as opposed to another chiller.

In another embodiment, the processor 100, during a real time electrical power pricing program, which may occur at the same time as a DR event, may compare real time electrical consumption data to electricity price set points of the end user and, based on such comparison, determine if any appliances should be turned off or otherwise operated to reduce KW demand to satisfy an average electrical price maximum set by the end user. The end user may be paid an incentive for taking advantage of real time pricing programs offered by the ISO, Utilities and/or ECSPs.

Furthermore, it is to be understood that the determination of demand reduction actions for reducing KW demand of electrical power from the power grid, in accordance with the present invention, may be similarly adapted to reduce demand for other resources consumable by humans which may become in scarce supply and high demand, and whose costs are a function of supply and demand, such as fossil fuels, clean water and the like.

Figure 10:
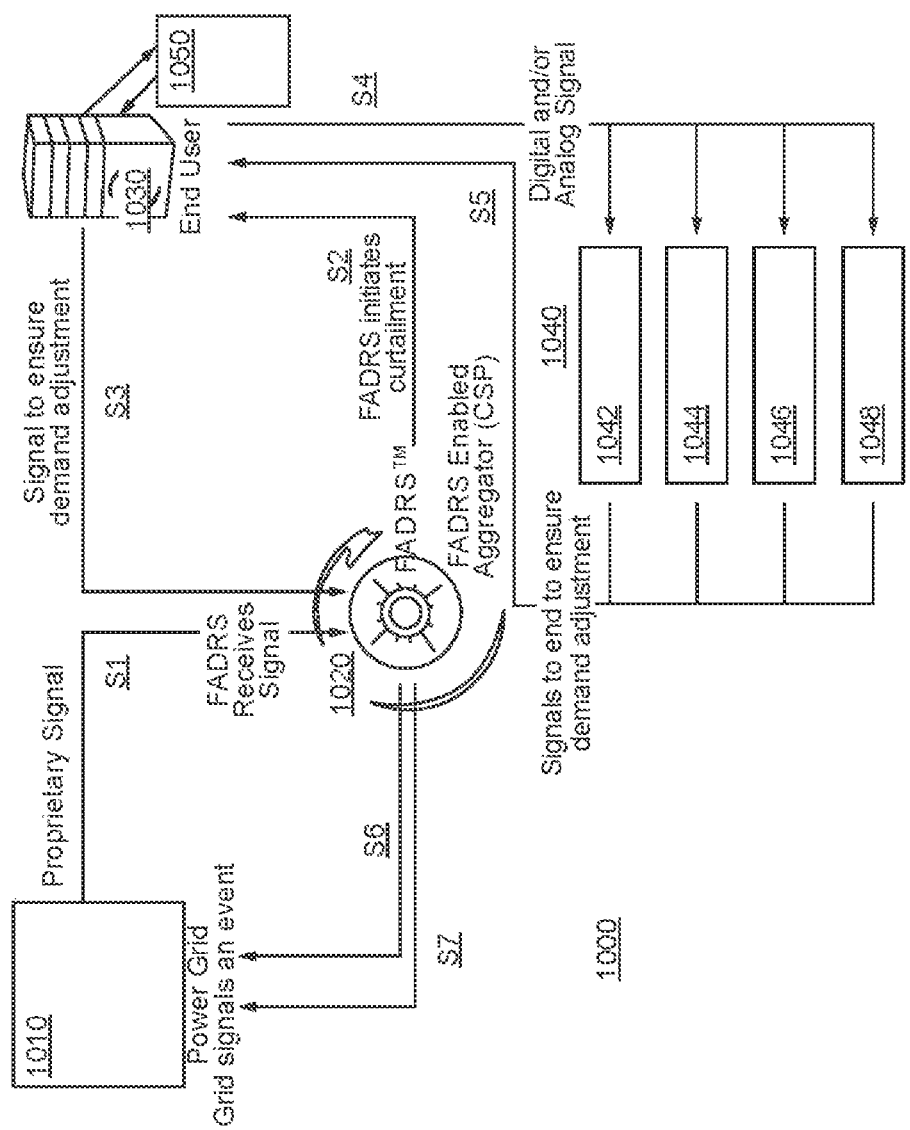
FIG. 10 depicts a high-level block diagram of a system according to one embodiment.

FIG. 10 depicts a high-level block diagram of a system according to one embodiment. Specifically, FIG. 10 depicts an electrical smart grid control topology 1000 in which a power grid (ISO/RTO or utility company) utilizing some internal energy management system (EMS) 1010 communicates power grid events (Capacity, Synchronous Reserves, Real Time Economic and the like), power quality information (including but not limited to Frequency Regulation), ancillary services, power demand information and the like to an Energy Curtailment Service Provider (ECSP) or simply, Curtailment Service Provider (CSP) 1020 utilizing public or private terrestrial or satellite networks, which responsively adapts various demand response resources without human intervention and in "real time" or "near real time" and in a manner tending to improve power availability, improve power quality and/or appropriately adjust power grid operating parameters as described herein.

Specifically, the EMS 1010 communicates data toward the CSP 1020 via a first signal path S1. The signal path S1 may comprise any encrypted or nonencrypted proprietary signal path or an encrypted or nonencrypted nonproprietary signal path suitable for use in communicating power grid events (Capacity, Synchronous Reserves, Real Time Economic and the like), power quality information (including but not limited to Frequency Regulation), power demand information and/or other data from the EMS 1010 utilizing public or private terrestrial or satellite networks to the CSP 1020 in "real time" or "near real time".

The CSP 1020 communicates with, illustratively, one or more end-users 1030 via a second signal path S2, utilizing public or private terrestrial or satellite networks in "real time" or "near real time" wherein each end-user is associated with one or more types of power consuming internal assets 1040 and, optionally, one or more types of power consuming or generating external assets 1050. It is noted that for simplicity only a single end user/client 1030 is depicted in FIG. 10. However, it will be appreciated by those skilled in the art and informed by the teachings herein that many more end-users/clients 1030 may be included within the various control methodologies and systems described herein with respect to embodiments described with respect to FIG. 10 as well as described with respect to the various other figures.

Internal assets 1040 comprise those power consuming assets supporting end-user operations, such as HVAC equipment 1042, process loads 1044, lighting 1046, fountains, escalators and miscellaneous loads 1048 and so on. These receive control signals from end user/client 1030 via signal path S4.

External assets 1050 comprise those power consuming or generating assets or Frequency Regulation assets such as standby generators, distributed generators, peaker plants, cogenerators, lithium-ion batteries, deep cycle lead acid batteries, flow batteries, flywheels, air compressors, solar based power generators, wind-based power generators, tidal/wave or geothermal based power generators, variable speed drives (sometimes referred to as variable frequency drives) and so on installed/located at a user site for the purpose of supplying power to the grid or otherwise adapting power supplied to the grid.

In various embodiments, external or internal assets may be controlled to send power to the grid and/or accept power from the grid in short intervals of 1-6 seconds each. Appropriate programming of assets may be illustratively determined within the context of a power adaptation function calculated to meet power or frequency management needs associated with the grid.

In various embodiments, such external assets are installed at a client or user location where they may be used to support demand response, Frequency Regulation and ancillary services functions alone or power adaptation functions, Frequency Regulation and ancillary services along with various internal assets 1040.

In various embodiments, M&V signals confirming compliance are sent simultaneously with control signals. The end user/client 1030 receives an M&V signal from the 1040 loads and 1050 loads and generation equipment via signal path S5.

The CSP 1020 receives M&V data from the end-users 1030 via signal path S3. The CSP 1020 either aggregates this data from several end-users 1030 and forwards it to the power grid 1010 (e.g., such as in the case of smaller end-users), or forwards the data without aggregating to the power grid 1010 (e.g., such as in the case of large end-users). This forwarding may be provided via signal path S7. It will be appreciated that the signal paths may be combined into a single bidirectional path, implemented via a network architecture and so on.

Generally speaking, the CSP 1020, end user/client 1030 or associated NOC determines an appropriate demand response based upon information received from the EMS 1010 via the CSP 1020 as well as data pertaining to the various uses end user/client 1030. In particular, the end user/client 1030 illustratively determines which internal assets 1040 and/or external assets 1050 associated with one or more end-users 1030 are to be adapted to achieve a demand response, Frequency Regulation and ancillary services supporting one or more goals of the EMS 1010.

The determined Frequency Regulation or ancillary services response may utilize any power related asset (e.g., distributed generators, peaker plants, cogenerators, lithium-ion batteries, deep cycle lead acid batteries, flow batteries, flywheels, air compressors, solar based power generators, wind-based power generators, tidal/wave or geothermal based power generators, variable speed drives and so on) to increase or decrease the power loading associated with the asset. The determined Frequency Regulation and ancillary services may comprise, for any power related asset, increasing or decreasing a power contribution to the grid of the power asset.

The determined demand response may comprise a sequence of precisely timed manipulations of asset operating parameters. For example, a demand response adapted to a goal of the EMS 1010 may require that power loading associated with multiple power consuming assets be controlled in a coordinated manner. In addition to coordinated control of power consuming assets (or instead of), the demand response may require that some or all generation associated with one or more power generating assets be controlled in a coordinated manner.

For example, and as described in more detail elsewhere herein, operating levels of internal assets 1040 such as HVAC equipment, lighting, industrial processes and miscellaneous may be reduced to achieve a reduction of 10%, 20%, 50% or some other amount. Similarly, operating levels of external assets 1050 such as battery/inverter combinations and the like may be ramped up to provide more power as needed such as to offset on-site demand spikes (i.e., flatten the electricity consumption curve to avoid excursions into higher tiers of billing/costs) as well as provide for some or all of baseline power usage behind the meter.

Frequency Regulation

The modern power grid comprises multiple power generation sources such as fossil fuel based power plants, nuclear power plants, solar power sources, wind turbines, tidal/wave power sources, geothermal power sources and so on, and the like. Unfortunately, the nature of some of the power generation sources is such that managing frequency regulation issues as well as power distribution and loading issues becomes much more complex. For example, while solar PV and wind turbines are wonderful Class I Renewable clean and green technologies, the variable power output of these renewables has resulted in increased difficulty in meeting frequency regulation requirements.

The terms Frequency Regulation and Frequency Modulation are used at times interchangeably in various instances within this specification. For example, in the case of demand response the frequency of a motor may be modulated (e.g., lowered) via a variable frequency drive such that the power or kilowatt demand associated with the motor is reduced in accordance with the demand response. In the case of Frequency Regulation, additional power is accepted from the power grid or sent to the power grid based upon, illustratively, control signals from the power grid or its control/management systems. These power transfers may be effected utilizing an energy storage asset(s) working in conjunction with one or more variable frequency drives controlling respective motors.

In various embodiments, precision control of internal assets 1040 and/or external assets 1050 associated with one or more end-users 1030 is adapted to achieve a frequency regulation goal. Specifically, in most power grids a fixed frequency of, illustratively, 60.00 Hz±1.00 Hz is required to be maintained. Frequency regulation is a process of maintaining the fixed frequency of the power grid within a required range.

Most power grids have elected to pay end users very lucrative incentives for helping them regulate this frequency of 60.00 Hz. For example, depending upon the specific ISO/RTO, this payment can be in the area of $300,000 per MW/hr. per year. Depending upon the geographic region and/or power grid/utility company needs, this incentive can be much greater than ALL three (3) demand response programs combined. However, while this incentive is very attractive to the end user, it is also by far the most difficult smart grid technology solution for an end user to participate in. Depending on the ISO/RTO, the minimum participation starts at 100 KW (This amount varies from ISO/RTO to ISO/RTO, CSP to CSP or utility to utility). Various embodiments described herein provide the end-user with sophisticated electronic equipment that can read and act on the need on the part of the ISO/RTO to either reduce KW or use more KW every 4-6 seconds.

In some embodiments of the invention, internal or external assets may include Variable Frequency Drives (VFDs) comprising, illustratively, motors used for some purpose that may be controlled by a computer to increase or decrease in speed. Control signals to these VFDs slow down motors when a reduced electricity load is required and speed up motors when an increased electricity load is required, such as during a demand response event.

Slowing down or speeding up of motors is also useful within the context of frequency regulation, which is provided in various embodiments to benefit the power grid operator rather than an individual user. For example, these techniques may be used within the context of external assets at a location (such as advanced large scale Lithium Ion batteries; flow batteries, capacitors, flywheels; air compressors; etc.) equipped with one VFD that regulates the power "up" and a second VFD which regulates the power "down" every 4-6 seconds depending on the requirements of the power grid (e.g., in some cases it can be a bidirectional VFD). The amount of "frequency regulation up" and/or "frequency regulation down" depends on the instantaneous needs of the power grid to maintain 60.00 HZ±1.00 HZ. Similarly, a building or other locale may have hundreds of internal asset VFDs (such as a research and development facility, large building and so on), where the motor speed of these internal assets may be controlled to contribute to a desired frequency regulation. In addition, a water or sewer treatment plant may include only a few internal asset VFDs, but where the motors they control are huge (e.g., 2000-8000 hp apiece). Controlling the internal asset VFDs for each of these motors may result in an enormous contribution to demand response as well as a frequency regulation. In other embodiments, internal assets such as HVAC equipment are controlled to achieve such power regulation and/or frequency regulation, though the control loop may have "stepped" incremental control for some of these devices such that a "resolution" or accuracy of power regulation and/or frequency regulation is relatively "choppy" (i.e., not having a smooth performance curve).

Figure 11:
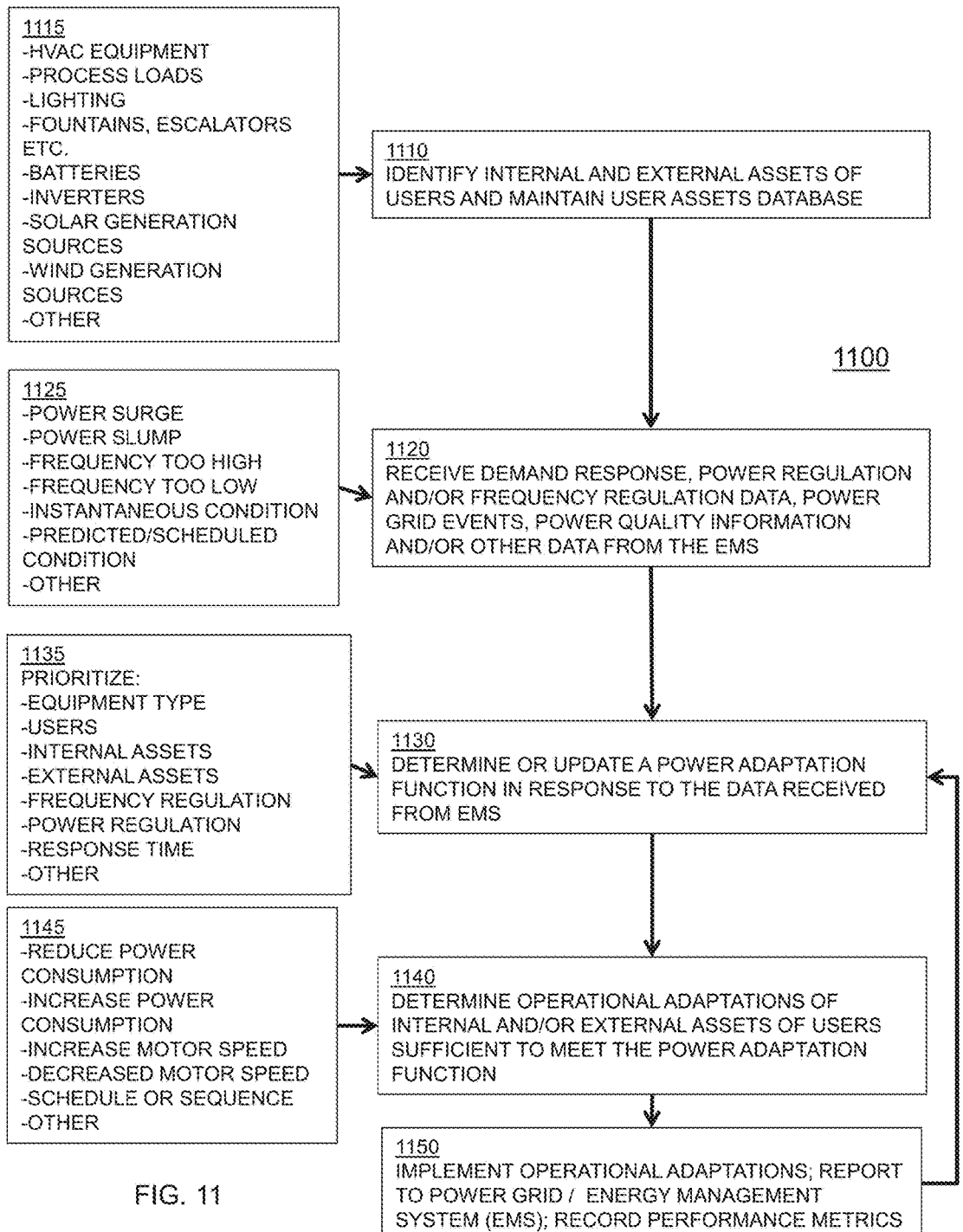
FIG. 11 depicts a flow diagram of a method according to one embodiment.

FIG. 11 depicts a flow diagram of a method according to one embodiment. Specifically, the method 1100 of FIG. 11 is adapted to use at, illustratively, a power grid for controlling internal and/or external assets associated with one or more end users or clients to achieve power regulation and/or frequency regulation.

In various embodiments, a CSP adapts the operation of internal and/or external assets of clients/end-users to address various instantaneous or predicted/scheduled demand response, power regulation, frequency regulation or other conditions or functions. Nonoptimal conditions within the power grid may be addressed by automatically adapting the operation of client assets for the benefit of the power grid itself. Additionally, such adaptation of asset operation may be employed to benefit the clients/end-users such as by load shifting, leveling peak demand, providing inexpensive base load electricity (or other source such as heating, cooling, water, etc.) during peak hours of the day and so on. In various embodiments both power grid benefits and user/client benefits are addressed simultaneously, such as by adapting the operation of user assets in a manner achieving a power grid regulation function while lowering a cost of power to one or more users/clients.

At step 1110, the end user identifies internal and external assets located at their site and maintains a user asset database. Referring to box 1115, such assets include HVAC equipment, process loads, lighting, fountains, escalators, batteries, inverters, solar generation sources, wind generation sources and/or other internal or external assets.

For example, in one embodiment a CSP or other processing entity in communication with power grid management functions and power consuming clients/end-users maintains a database associated with the internal and external assets of the various clients/end-users.

At step 1120, the method receives data indicative of power grid issues such as demand response, power regulation and/or frequency regulation data, power grid events, power quality information and/or other data from, illustratively, an energy management system (EMS). Referring to box 1125, the received information may be related to a power surge condition, a power slump condition, a frequency condition and so on. Moreover, each of these conditions may be occurring instantaneously or may be predicted to occur or scheduled to occur.

In one embodiment, such as where a set of conditions dealing with ancillary services or Frequency Regulation requires too fast of a response, the power grid control and management systems interact directly with one or more end users to accomplish the demand response, frequency regulation and/or other processes described herein (i.e., bypassing a CSP or other processing entity).

For example, in one embodiment a CSP or other processing entity in communication with power grid management functions (e.g., an EMS) and power consuming clients/end-users receives data indicative of instantaneous, predicted and/or scheduled demand events, power regulation conditions, frequency regulation conditions and/or other nonoptimal operating parameters associated with the power grid.

At step 1130, a power adaptation function is determined. The power adaptation function may be defined according to specific instructions from the power grid relating to a demand response, power regulation or frequency regulation condition. The power adaptation function may also be defined according to a determination of specific power and/or frequency related adaptations that will improve or mitigate the nonoptimal operating conditions and/or power grid issues as indicated in the data received at step 1120. In either case, the power adaptation function may identify various internal or external assets suitable for use in improving or mitigating the negative effects of those power grid issues. In addition, internal or external assets at the end user may be prioritized according to more of the following: demand response events, power regulation, frequency regulation and/or other programs to improve or mitigate nonoptimal grid operating parameters. Referring to box 1135, such characterization may include prioritizing one or more of equipment type, users, internal assets, external assets, frequency regulation, power regulation, response time and/or other factors.

For example, in one embodiment a CSP or other processing entity utilizes the received data to determine an appropriate power grid response function which, when implemented, will operate to improve or mitigate the negative effects of those power grid issues utilizing internal or external assets at the end user in a prioritized fashion that could employ one of more of the following: demand response events, power regulation, frequency regulation and/or other programs to improve or mitigate nonoptimal grid operating parameters. In addition, the CSP or other processing entity may utilize the asset database to identify individual assets or groups of assets which may be operationally adapted to address various aspects of the determined power grid issues. Where the data received from the EMS changes over time, such as in response to CSP adaptation of user assets and the like, the method or prioritized scheme of dealing with the power grid issues may also be adapted over time.

In one embodiment, the smart grid technology at the end user may identify power grid issues that could negatively affect its operations and take all necessary steps in a prioritized sequence and utilizing internal or external assets at the end user to improve or mitigate non optimal grid operating conditions while at the same time doing so in such a way so as to either save energy or take advantage of power grid incentive programs or improve their commodity purchasing position for the following year.

At step 1140, a determination is made as to the operational adaptations of the internal and/or external assets of users sufficient to improve or mitigate power grid issues. Referring to box 1145, the operational adaptations may comprise any of reduced power consumption, increased power consumption, increased motor speed, decreased motor speed and so on. Moreover, any of these adaptations may be performed instantaneously, according to a schedule of adaptations or according to a sequence of adaptations.

In the case of a power adaptation function defined according to specific instructions from the power grid relating to a demand response, power regulation or frequency regulation condition, the specific instructions may also define the various operational adaptations.

In the case of a power adaptation function defined according to a determination of specific power and/or frequency related adaptations, a determination is made as to the specific asset operational adaptations sufficient to meet the power grid goals associated with the power adaptation function. That is, the specific operational adaptations of various internal or external assets of one or more users is determined such that the resulting operational changes will improve or mitigate the nonoptimal operating conditions and/or power grid issues as indicated in the data received at step 1120

For example, various adaptations may be implemented in a cyclic manner (e.g., increased motor speeds in 4 second bursts, decreased motor speeds in 4 second bursts and so on) to achieve a combined result consistent with the determined power grid issue. For example, in one embodiment a CSP or other processing entity utilizes the asset database to identify individual assets or groups of assets which may be operationally adapted to address various aspects of the power grid issues. In addition, the CSP, other processing entity or equipment at the NOC and/or job site determines the particular operational adaptations of the individual assets or groups of assets likely to meet the requirements of the power grid issues.

At step 1150, the operational adaptations are implemented and, optionally, the results of such implementation are reported to the power grid/energy management system (EMS) utilizing public or private terrestrial or satellite networks in "real time" or "near real time" and without human intervention. Optionally, performance metrics associated with the adaptations are recorded for subsequent use (e.g., determining efficacy of individual assets with respect to meeting power adaptation function criteria).

For example, in one embodiment a CSP or other processing entity implements the determined operational adaptations of the individual assets or groups of assets by sending asset adaptation commands to corresponding users/clients. The asset adaptation commands are adapted to cause specific operational adaptations of internal and/or external assets. In various embodiments, the user/clients may report back to the CSP or other processing entity that specific assets are unavailable or cannot be adapted, in which case the CSP or other processing entity may issue additional asset adaptation commands such as to adapt different assets at the same or other users/clients. Performance metrics associated with the various adaptations may also be recorded for subsequent use.

The method 1100 may exit or, optionally, return to step 1130 where the power adaptation function is adapted in response to new data received from the power grid, such as data indicative of improvements or degradations and power grid operations, some of which may be related to operational adaptations of client assets. In particular, the various steps of the method 1100 may be iteratively performed until power grid issues such as indicated within the data received at step 1120 have been eliminated or reduced to a threshold level.

The method 1100 of FIG. 11 advantageously utilizes, in various embodiments, both internal assets and external assets of users to accomplish power regulation and/or frequency regulation functions in a manner beneficial to both the power grid itself as well as the end-users associated with the power grid. In operation, the financial incentives put in place by the power grid or utility to motivate end user frequency regulation capabilities are such that the significant financial incentives can help offset the end users total energy costs. In various embodiments, frequency regulation is a prioritized end-user function using internal assets and/or external assets.

In one embodiment, the above methodologies are implemented by a CSP, EMS or other entity in communication with power grid control or management functions as well as our clients/users and/or related internal or external assets. For example, a CSP may operate to receive data indicative of a nonoptimal operating parameter or operating deficiency associated with a power grid, determine a fully automated method(s) to improve or mitigate that condition in response to the received data, determine operational adaptations of one or more user assets sufficient to meet said nonoptimal operating parameters or operating deficiency associated with a power grid, and send commands or messages adapted to cause a change in operation of internal or external assets associated with one or more users/clients such that the indicated nonoptimal operating parameter or operating deficiency associated with the power grid is improved or mitigated.

Various embodiments of a Fully Automated Demand Response/Reduction System (FADRS®) and/or the FADRS® Smart Grid Multiple Advanced Technology Integrated System (FADRS® SG MATIS) described herein (e.g., such as with respect to FIG. 11) provide an automated control relationship between end users, CSPs and the power grids serving them such that both end user requirements as well as power grid requirements are met in a mutually beneficial manner.

The various embodiments discussed herein provide a number of benefits to both power grid owners/operators, power grid users/clients and other interested parties, including:

1) Homeland Security/infrastructure protection benefits by using secure, bi-directional, "real time" encrypted public or private terrestrial (e.g. Internet) or satellite networks communication between the power grid/Utilities and CSPs and end users. This provides a more reliable and stable power grid that is more resilient to cyber attack. Also, having a more reliable and stabile power grid helps communities, cities, military bases, etc. to remain fully operational. In one embodiment, can make such communities, cities, military bases, etc. become islands operating independently from the power grids/utility companies.

2) Address power grid needs in "real time" or "near real time."

Support Capacity, Synchronous Reserves and Real Time Economic Pricing Demand Response programs as well as any other types of power grid programs that may become necessary or preferable in the future.

Provide Frequency Regulation (also referred herein in some places as Frequency Modulation) by controllably causing power increases or decreases (e.g., every 1-6 seconds) utilizing internal or external assets, which in turn adapt spectral conditions associated with the power grid.

Provide using Energy Storage assets such as large format advanced battery technology, flywheels, air compressors, capacitors, Variable Frequency Drives and so on. For example, using electric vehicle batteries in such a manner such as not to establish new demand peaks or create a local black out condition by bringing down that segment of the local power grid.

Increasing power output at electric sub stations.

Using alternatives to Peaker Plants for extra power generation (Fuel cells, standby generators, cogeneration/trigeneration, distributed generation, etc.

3) Commodity Broker needs are addressed in "real time" or "near real time". FADRS® and FADRS® SG MATIS show Commodity Brokers the available capacity that they can use as a market hedge against spikes in wholesale market prices brought on by supply and demand thereby providing various financial benefits to end users. In another embodiment, these additional available capacity resources can be used in the demand response market to help some of their low performing clients to fully participate using the excess capacity of other end users and thus improve the reliability and stability of the power grid as well as provide additional income to the contributing end users with the excess capacity.

4) Curtailment Service Provider (CSP) needs addressed in "real time" or "near real time". Similar to item "3" above but application slanted more toward Demand Response needs from the power grid.

5) Electric needs of end-users are addressed using a combination of power generation sources including fossil fuel, solar PV, solar Thermal, wind power and other power sources.

24/7 robust Advanced Building Automation energy savings (10%-40%).

Demand Response incentives (Inside buildings, advanced batteries, standby generators, distributed generation, fuel cells, emergency generators, cogeneration/trigeneration, other sources of power).

Frequency Regulation incentives.

Charge up advanced battery storage at night with less expensive electricity from the local utility (typically as part of a Real Time Pricing Tariff) and discharge "behind the meter" to facility to provide for inexpensive electricity to the facility (minus utility company Transmission and Distribution charges) by removing ALL peaks and assuming a large share of base load. An additional benefit is that the end user will receive a more favorable commodity rate the following year because they can be used as a "hedge fund" by the commodity broker.

Charge up advanced battery storage from variable generation power sources such as wind and solar PV (and others) and provide steady source of power "behind the meter" to facility while at the same time participating in net metering wherever approved and applicable.

Providing for managed battery charging for electric vehicles using other sources of power if power grid is experiencing difficulties or to prevent a new KW peak demand charge from occurring. In another embodiment the batteries in the electric vehicles can be used for Frequency Regulation and ancillary services to the financial benefit of the end user and to improve the reliability and stability of the power grid (A Homeland Security issue)

Turning a facility into an "island" in the event there is a storm or other event that results in facility losing utility power (Excellent for everyone including military bases).

Figure 12:
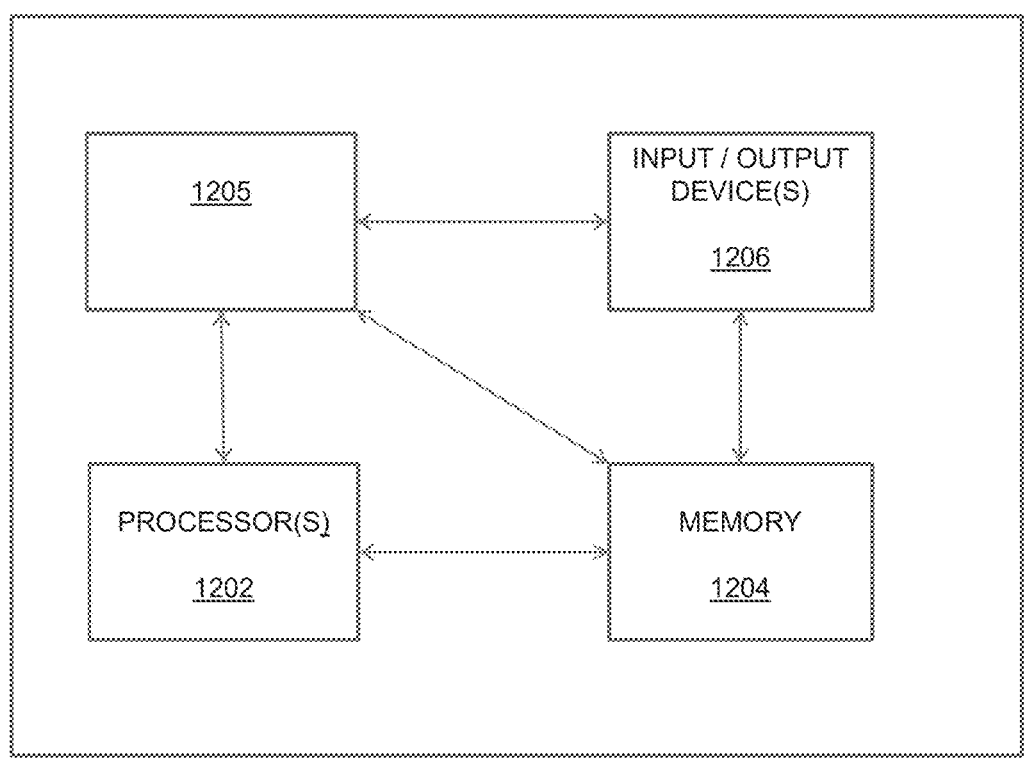
FIG. 12 depicts a high-level block diagram of a general-purpose computer suitable for use in performing the functions described herein.

FIG. 12 depicts a high-level block diagram of a general-purpose computer suitable for use in performing the functions described herein. Specifically, FIG. 12 depicts a high-level block diagram of a general-purpose computer suitable for use in performing the functions described herein. As depicted in FIG. 12, system 1200 comprises a processor element 1202 (e.g., a CPU), a memory 1204, e.g., random access memory (RAM) and/or read only memory (ROM), an RMT management module 1205, and various input/output devices 1206 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the various processes can be loaded into memory 1204 and executed by processor 1202 to implement the functions as discussed above. As such the processes (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

In various embodiments, the methodologies and techniques discussed above with respect to FIGS. 10-11 may also be implemented using hardware, software or a combination thereof such as provided with respect to any of the embodiments disclosed in or discussed with FIGS. 1-9 as well as FIG. 12. Such embodiments include various processing operations using artificial intelligence and/or fuzzy logic and/or neural networks, optionally according to the hierarchies discussed above. Broadly speaking, any of the embodiments discussed above with respect to any of the figures may be operably combined with any other embodiments discussed above with respect to any of the other figures.

Rapid Demand Response Control Embodiments

The various embodiments discussed above and herein provide mechanisms for implementing various systems or portions thereof adapted to provide demand response, frequency regulation, voltage regulation, enhanced building automation and other power grid and off-the-grid solutions. The various embodiments improve power utilization efficiency and generally incentivize intelligent power distribution and consumption.

Various embodiments provide rapid demand response control via real-time use of commercial or broadcast radio and television stations within a local area (e.g., AM radio, FM radio or other analog or digital radio technologies, analog or digital television broadcast, satellite broadcast channel and so on). In particular in-band or out-of-band data communications via used or unused ("whitespace") portions of spectrum such as normally allocated to broadcast radio or television may be used to propagate demand response command signals (i.e., demand response control signals) toward individual receiving devices associated with utility customers or individual equipment associated with such customers (e.g., air-conditioning units, refrigeration units and the like). Specific commercial radio or television stations (e.g., some or all of the stations in a geographic area) may be used for such broadcast. Further, infrastructure such as governmental emergency response channels or networks may be used for such broadcasts. Generally speaking, in-band or out-of-band radio or television or other broadcast transmission mechanisms may be advantageously employed to propagate command signals (it is noted that the terms command signals and control signals are used interchangeably throughout this document) for triggering demand response, frequency regulation, voltage regulation, enhanced building automation and other power grid functions in one or more areas of the geographic region.

Unlike systems that are used to turn power consuming loads on and off with little to no regard for human comfort, the various embodiments provide a mechanism to ensure human comfort and user/client acceptance of demand reduction in their homes or businesses. Further, while it is important to turn off unnecessary power consuming devices, it is also important to send back Measurement and Verification (M&V) signals in real time or near real time to utility companies (ISO, RTO, CSP or other entity) via more economical methods such as an Internet access network as provided by cellular telephone wireless communications infrastructure and other methodologies.

Variations of these embodiments contemplate reporting or feedback mechanisms for monitoring the impact of trigger actions, verifying customer compliance with demand response agreements, ensuring appropriate billing/credit adjustments and so on. Ancillary uses for such feedback mechanisms include rapid reporting of brownout conditions, blackout conditions and so on to a local utility company.

It should be stated that while many of the embodiments contemplate demand response events initiated by power grids (including utility companies and other entities), other embodiments enable clients' behavior to become conditioned to accept private demand response events initiated by their own companies for 24/7/365 energy savings so long as these events are less aggressive than power grid initiated demand response events and utilize the artificial intelligence, prediction technology and human centric Painless Demand Response™ that our system provides. Another major advantage of our Painless Demand Response™ is that Distributed Generation systems or Standby Generation Systems operating in "island mode" as a result of a utility blackout can be downsized because our Painless Demand Response™ would not require 100% backup energy. The installation and operating costs resulting from this embodiment is obvious.

Figure 13:
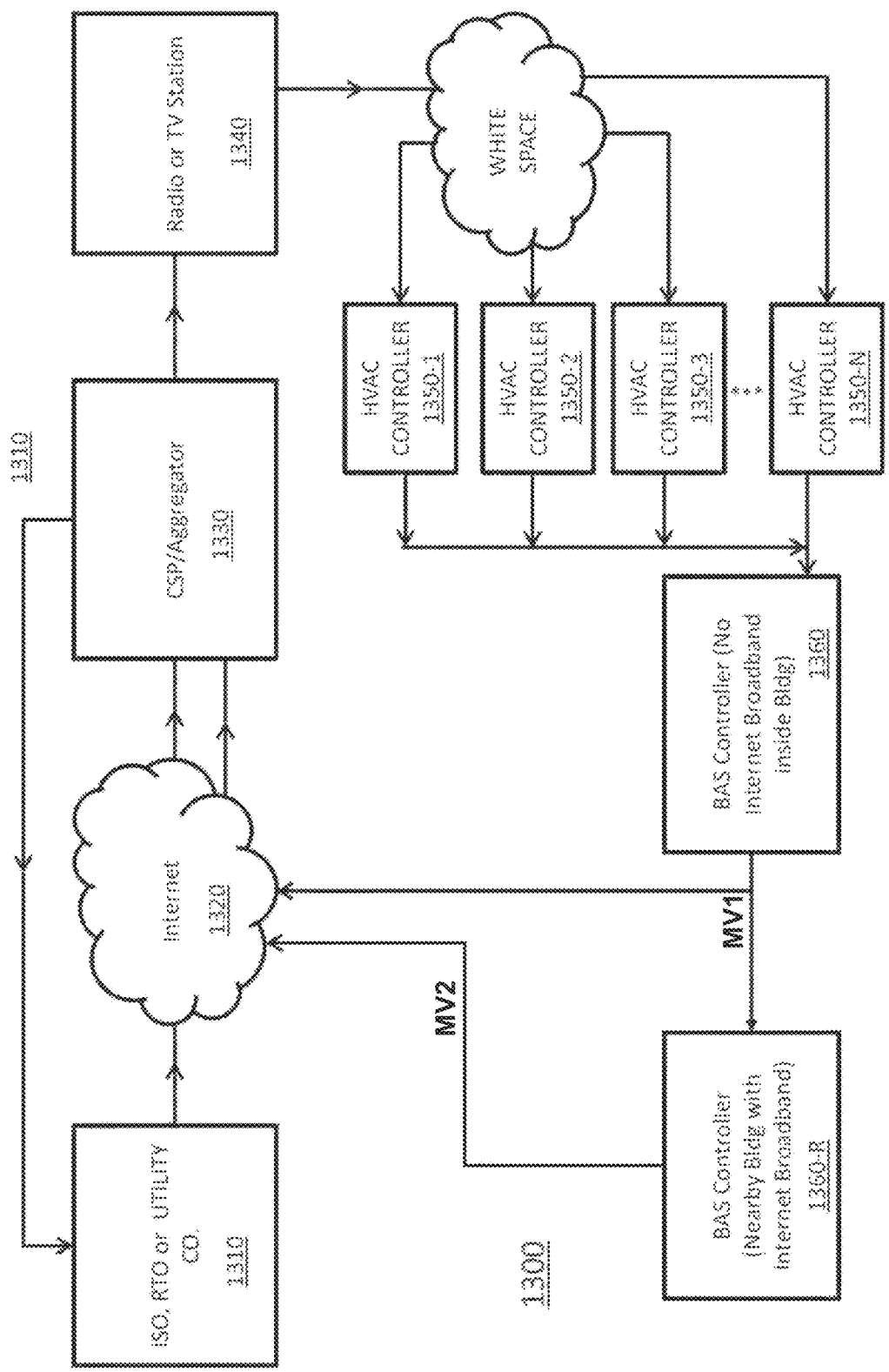
FIG. 13 is a block diagram of an exemplary system in accordance with one embodiment.

FIG. 13 is a block diagram of an exemplary system in accordance with one embodiment. It will be appreciated that the teachings and discussion herein associated with the system of FIG. 13 may be readily adapted for use with the various systems discussed above with respect to the various other figures. Moreover, much of the teachings and discussion herein with respect to the system of FIG. 13 includes significant overlap with the teachings and discussion provided above with respect to the various other figures.

FIG. 13 contemplates an exemplary system 1300 in which a utility company, Independent Service Operator (ISO), Regional Transmission Organization (RTO) or similar entity 1310 communicates with an Energy Curtailment Service Provider (ECSP or CSP), aggregator or similar entity 1330 via the Internet 1320 or some other communications means.

The CSP/aggregator 1330 communicates with one or more radio or television stations 1340 in a given geographic region to provide thereto a command signal (or multiple command signals) to be propagated by the one or more radio or television stations 1340 toward a plurality of local power consumption controllers 1350 within the given geographic region served by the one or more radio or television stations 1340.

Decisions pertaining to an amount of power reduction that is necessary, the geographic area in which power should be reduced, the types of customers or power consuming devices that should be effected, the timing and duration of such reductions and so on may be made by a utility or similar entity 1310, a CSP or similar entity 1330 or some other power manager or management entity that determines when power reduction (or other power criteria) indicate that a demand event is appropriate, the parameters of that demand event, and the customers or resources to be impacted. Moreover, using identification information as discussed below, specific classes or types of customers may be targeted for such reductions. Moreover, compensation to customers opt in to demand reduction at various levels may also be provided as discussed below.

The power consumption controllers (including but not limited to Heating, Ventilating and Air Conditioning (HVAC) controllers) 1350, in response to receiving the command signal, shut down or disable one or more respective power consuming components of local control equipment, such as shutting down compressors of local air-conditioning units (window, wall or other type). The various embodiments ensure that this shut down or disabling only occurs if certain local criteria associated with customer comfort are met; namely, equipment such as air conditioning compressors are only shut down if such shutdown does not result in discomfort to the customer. For example, various embodiments contemplate that a room or wall air conditioner compressor is only shut down if the temperature of the room is less than a predefined or selectable maximum indoor space temperature level (Tmax) or maximum indoor space relative humidity level (RHmax) and/or in response to an occupancy sensor (e.g., ultrasonic sensor, infrared sensor, alarm system in active mode and the like) indicating that the indoor space is occupied or unoccupied. Typical values for Tmax comprise temperature levels above a "normal" climate controlled temperature (e.g., 70° F. to 72° F.) yet below a subjectively uncomfortable temperature level, such as temperatures between 75° F. and 82° F. Similarly, typical values for RH Max comprise humidity levels above or outside of a "normal" climate controlled humidity level/range (e.g., between 50% and 55% relative humidity) yet below a subjectively uncomfortable humidity level, such as humidity levels above 60% relative humidity. If the occupancy sensor senses that no one is in the space, then the acceptable maximum indoor space temperature may be permitted to rise by some amount predefined by the client (say 2F-4F higher than the occupied Tmax). In various embodiments, exceeding the RHmax will be avoided to conserve the cost of electrical energy otherwise needed to return the room to occupied "normal" humidity levels.

In addition, various embodiments contemplate that each of the power consumption controllers 1350 is associated with a particular class or group based on criteria such as location, customer priority level, customer service level, residential or commercial, distribution grid circuit/location, type of equipment to be controlled and so on.

The class or group associated with a power consumption controller 1350 may be used to increase or decrease an amount of discomfort tolerable to a power consumer, which amount of discomfort may be associated with a varying monetary incentive such as a billing credit, direct payment and the like. Since clients are typically incentivized at a higher amount if they drop more demand (KW) and possibly usage (KWH), it is clear that clients who are willing to permit a higher Tmax and/or RHmax will receive greater monetary incentives than clients who only permit lower Tmax and/or RHmax levels. Various embodiments contemplate increasing billing credits to customers for each increase in Tmax, RHmax or other criteria associated with discomfort to be experienced by the customer due to demand events. For example, a monetary incentive (in the form of a billing credit, direct payment or other method to a consumer willing to tolerate air-conditioning compressor shutdown up to a Tmax of 75° F. which may be lower than a billing credit of a second amount that may be provided to the customer willing to tolerate air-conditioning compressor shutdown up to a Tmax of 80° F. The same holds true for RHmax or combination of Tmax and RHmax.

To simplify the discussion, only one radio or TV station 1340 is depicted in FIG. 13. However, it will be appreciated that multiple radio stations and/or multiple television stations may be used for this purpose. Moreover, it will be appreciated that one or more radio or television stations 1340 associated with respective or differing geographic regions may also be used for this purpose.

As depicted in FIG. 13, it is contemplated that the command signal or multiple command signals to be propagated by the one or more radio or television stations 1340 toward power consumption locations will be propagated via unused spectrum or "whitespace" associated with the radio or television stations 1340. Other embodiments contemplate that different broadcast communications means may be used. For example, rather than using radio or TV stations 1340, public or emergency broadcast mechanisms may be used for this purpose. Similarly, other communications techniques and/or communications infrastructure may be used for this purpose.

To simplify the discussion, only a very few power consumption controllers 1350 and of a single type are depicted in FIG. 13, illustratively, HVAC controllers operably coupled to home or apartment air-conditioning units such as room air conditioning units in large apartment buildings within a city served by a utility company. Thus, the power consumption controllers 1350 are generically depicted as, illustratively, respective HVAC controllers denoted as 1350-1, 1350-2 and so on up to 1350-N (collectively HVAC controllers 1350) within, illustratively, an apartment building whether common structure or location.

Various embodiments contemplate other types of power consumption controllers, such as for controlling different types of air-conditioning units, refrigeration units, pool pumps, plug and non-plug load appliances and so on where the high power consumption of different power consuming devices (such as air conditioning compressors) is thought to be the most practical mechanism for decreasing demand. Other types of equipment may also be controlled to achieve power demand reduction such as described herein with respect to the various figures. If this is the case and occupant comfort is not relevant, then the criteria for doing so may not be temperature or relative humidity but some other criteria such as whether or not the space is occupied and what the specific customer preferences are. The various embodiments also find utility within the context of demand control signals for requesting reduction of resources other than electricity, such as natural gas, propane, oil, biofuel, water and the like. FADRS® also utilizes in various embodiments an Enhanced Building Automation mode to conserve these resources on a 24/7/365 basis using similar smart grid technology.

FIG. 13 also depicts embodiments wherein M&V information is propagated via a back channel toward the utility company 1310 and/or CSP/aggregator 1330 for various purposes. The back channel may comprise any suitable communications infrastructure, such as a mechanism for accessing the Internet 1320 is depicted herein. For example, within the context of a building such as an apartment building including multiple HVAC controllers 1350 controlling window air-conditioning units or other conditioning units, some or all of the power consumption controllers 1350 may provide an analog or digital M&V signal to a Building Automation System (BAS) controller inside the apartment building for subsequent propagation by the back channel. The communication between the power consumption controllers 1350 and the BAS controller 1360 may be provided via twisted pair wiring, power line carrier, power over Ethernet, wireless communication or other mechanisms.

In some embodiments, the BAS controller 1360 of a building is coupled directly to the Internet or other communications network 1320 (MV1). In some embodiments, the BAS controller 1360 of a building is coupled indirectly to the Internet or other communications network 1320 (MV2) via, for example, a BAS controller associated with a nearby building. Communication between BAS controllers of nearby buildings may be provided via twisted pair wiring, fiber optic or other type of network cabling or other mechanisms.

Figure 14:
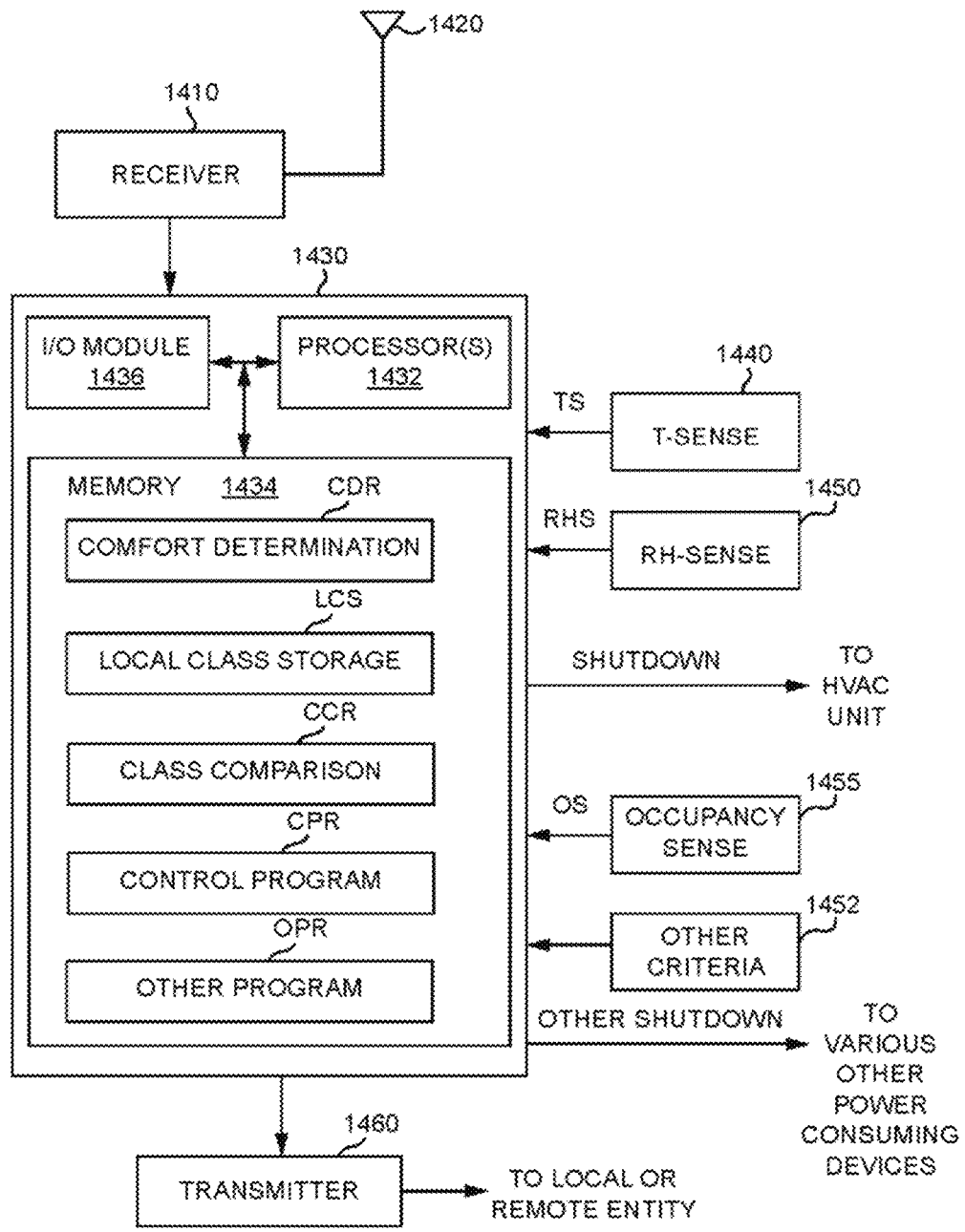
FIG. 14 is a block diagram of a fully automated local control apparatus according to one embodiment.

FIG. 14 is a block diagram of a control apparatus according to one embodiment. Specifically, the control apparatus 1400 of FIG. 14 may be used to implement, illustratively, a power consumption controller 1350 such as described above with respect to FIG. 13. Further, the control apparatus 1400 described herein may be modified in many ways in accordance with the various embodiments.

As depicted in FIG. 14, the control apparatus 1400 a receiver 1410, an antenna 1420, the control module 1430, a temperature sensing module 1440, a relative humidity sensing module 1450, an occupancy sensing module 1455 and a transmitter 1460. While depicted as separate modules, in various embodiments some or all of the functions performed by the receiver 1410, control module 1430, temperature sensing module 1440, relative humidity sensing module 1450, occupancy sensing module 1455 and/or transmitter 1460 are included within a single integrated circuit, chipset or the like. In various embodiments, some or all of these functions are implemented by different techniques depending upon, illustratively, the particular communication technologies utilized to implement the functions associated with the receiver 1410 and/or transmitter 1460, such as receiving broadcast radio signals versus receiving broadcast television signals.

The antenna 1420 and receiver 1410 cooperate to receive broadcast radio, television or other communications including command signals such as from the analog or digital radio or TV stations 1340 described above with respect to FIG. 13. The receiver 1410 operates to provide a received command signal to the control module 1430 in the form of a data stream, data packet, partially or fully demodulated signal or other formats.

In various embodiments, receiver 1410 demodulates, decodes and/or extracts from a broadcast radio or television signal any command signal modulated, encoded and/or inserted therein. Techniques for including data such as command signals within broadcast radio, television or other signals are well known to those skilled in the art and will not be discussed in detail. For example, various reserved or data-specific fields within digital radio and television formats may be used to include extra data such as command signals therein. Similarly, analog radio signals may utilize the known Radio Data System (RDS) techniques to include extra data such as command signals therein. Various other techniques may be used as well known to those skilled in the art.

The control module 1430 comprises one or more processors 1432, a memory 1434 and an input/output (I/O) module 1436, which may be implemented in a manner such as those described above with respect to the general-purpose computer 1200 of FIG. 12. Generally speaking, the memory 1434 includes various software modules comprising computer instructions which, when executed by the one or more processors 1432, perform specific functions.

Memory 1434 is depicted as including computer instructions for implementing a comfort determination routine (CDR) which determines whether or not temperature information T received from temperature sensor 1440, relative humidity information RH received from relative humidity sensor 1450, occupancy information received from occupancy sensor 1455 (OS) and/or other information is such that an appropriate comfort level exist such that turning off an HVAC compressor or other device would not unduly discomfort a customer.

Memory 1434 is depicted as including computer instructions for implementing a local class storage (LCS) routine which is used to store class or class-representative identification or criteria associated with the local power consumption controller 1350 being implemented.

Memory 1434 is depicted as including computer instructions for implementing a class comparison routine (CCR) which determines whether the locally stored class or class-representative identification or criteria matches or otherwise correlates to that of a received command signal to determine thereby whether or not a shutoff command associated with the received command signal should be generated.

Memory 1434 is depicted as including computer instructions for implementing a control program routine (CPR) as well as other program routines (OPR) for performing various control functions and/or other functions as described herein. For example, the control module 1430 is depicted as interacting with the receiver 1410 to receive a command signal or data therefrom and, optionally, with a transmitter 1460 to provide an M&V signal or data thereto, such as identification information associated with the control module and/or HVAC unit thereby controlled., Such information may be propagated toward a utility or CSP via the Internet 1320 or other back channel communications means to verify operation of the control module or HVAC equipment control thereby, as well as associate the control module or HVAC equipment control thereby with a user or customer of a utility or CSP such as for billing or credit/compensation purposes. Further, the control module 1430 is depicted as generating one or more shutdown signals per command signals received by the antenna 1420 and receiver 1410 (only one being depicted for simplicity) configured to cause a shutdown of a compressor, motor or other power consuming equipment or component thereof. Further, the control module 1430 is depicted as receiving temperature, relative humidity and occupancy indicative signals from the temperature sensor 1440, relative humidity sensor 1450 and occupancy sensor 1455, respectively.

The apparatus 1400 described herein may be used to implement a controller(s) suitable for controlling one or more power consuming, generating and/or storage devices (not just HVAC equipment) as discussed herein.

It is noted that the processing and memory resources associated with the control module 1430 may be extremely limited if there are a relatively small number of functions to implemented or could be expanded as required. These and other functions will be described more detail below with respect to FIG. 15. It is noted that the various functions of control module 1430 may be implemented within hardware or a combination of hardware and software, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

In various embodiments, the apparatus of FIG. 14 may be modified to accept other criteria (OC) 1452 in addition to or instead of temperature and relative humidity, which other criteria may be used in addition to or instead of temperature and relative humidity criteria within the context of the method 1500 discussed below with respect to FIG. 15. That is, rather than comfort-related criteria the various embodiments may be adapted to consider load specific criteria associated with various other power consuming devices in addition to or instead of the comfort-related criteria associated with HVAC devices as described herein. Such other power consuming devices may comprise electric domestic hot water heaters, microwave ovens, electric ovens, coffee urns, vending machines, computer workstations, plug loads, lighting fixtures via lighting control systems, pool pumps and so on which may be associated with criteria indicative of whether or not the device can or should be shut off or otherwise caused to reduce its power consumption, such as time of day or preprogrammed time periods or whether sufficient hot water exists in a hot water heater and so on.

Figure 15:
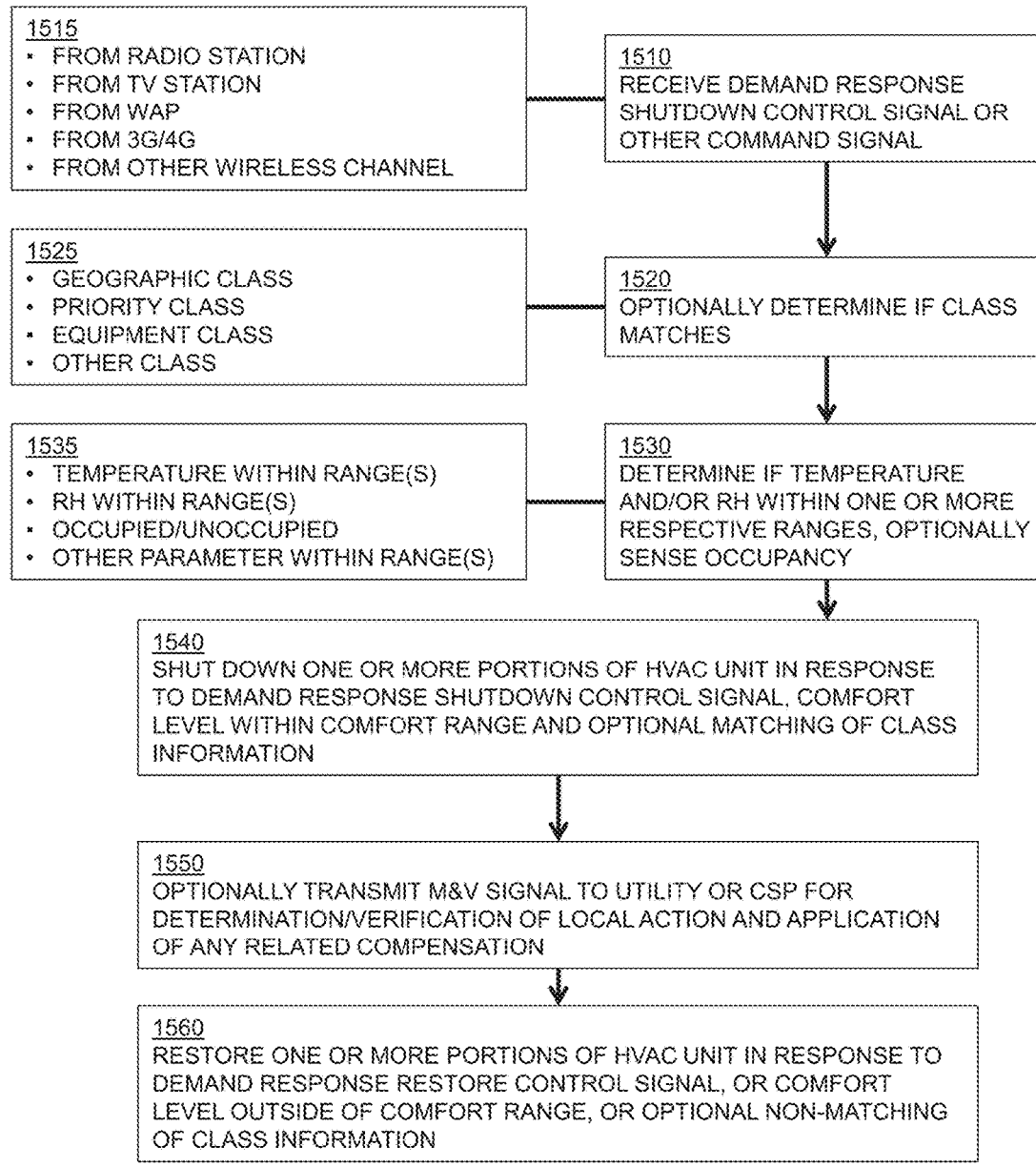
FIG. 15 depicts a flow diagram of a method according to one embodiment.

FIG. 15 depicts a flow diagram of a method according to one embodiment. Specifically, the method 1500 of FIG. 15 describes the operation of various embodiments of a power consumption controller 1350, controller apparatus 1400 or similar entities such as described above with respect to the various figures.

At step 1510, the controller receives a demand response shutdown control signal or other command signal. Referring to box 1515, the command signal may be received via, illustratively, a radio station, television station, wireless access point (WAP), 3G or 4G cellular network, or some other wireless channel.

At step 1520, the controller optionally determines whether class information or criteria included within the command signal matches class information or criteria associated with the controller itself. Referring to box 1525, such class information may be used to identify geographic classes, priority classes, equipment classes and/or other classes for use in determining whether or not the controller should invoke an equipment shutdown command.

Geographic class criteria may be used to identify and/or illustrate the specific areas or regions within a utility company (ISO, RTO, CSP or other entity) service footprint that should or should not invoke equipment shutdown procedures. These areas or regions may be associated with specific portions of a power grid such as substations, distribution regions and the like. Priority class criteria may be used to specify customer or service priority classes which should or should not invoke equipment shutdown procedures. These classes may specify higher or lower priority customers based upon differentiated service agreements, differentiated applications (residential/commercial and the like), high electric load pockets or other criteria. Equipment class criteria may be used to specify the type of equipment which should or should not be shut down, such as air conditioning compressors, air-conditioning fans, industrial motors, office lighting, pumps, computer peripherals, heat pumps, electric heating, electric domestic hot water heaters and so on.

At step 1530, the controller determines if a comfort level associated with the controlled equipment is within one or more comfort ranges, such as one or more temperature ranges and/or relative humidity ranges and, optionally, whether the room or space is occupied. Referring to box 1535, the comfort range may be determined with respect to one or more temperature ranges, one or more relative humidity ranges, or within one or more ranges associated with some other parameter. Further, these ranges may be adapted or defined with respect to whether or not the room is occupied or unoccupied. In various embodiments, the user or client determines setpoints such as the "occupied" temperature and relative humidity, and "unoccupied" temperature levels, they will tolerate during the cooling season. These may be set at, illustratively, the time of installation. In various embodiments, these setpoints may be remotely adjusted by the utility or CSP, or revised by the client.

It is noted that various embodiments of the FADRS® system are able to identify in real time or near real time how much kW (or how many watts) each piece(s) of equipment controlled by 1350 is drawing as a result of the M&V process. This gives the utility company (ISO, RTO, CSP or other entity) the information necessary to balance their electrical supply traffic. The utility company (ISO, RTO, CSP or other entity) may then either manually or utilizing a fully automated FADRS® dispatch system (or a third party to communicate with said FADRS® system), determine how many systems should be receiving a command signal, in what priority level and in what geographic region. Another important feature of this M&V signal is to alert staff monitoring operations to identify which units are not responding properly to 1350 controllers so technicians can be dispatched at their earliest convenience.

At step 1540, in response to receiving a shutdown command signal and a determination that a comfort level is within a comfort range, the controller generates one or more shutdown signals for equipment controlled thereby. For example, the controller may generate a shutdown signal configured to cause a compressor and/or fan of an air conditioner to turn off, or an electric heating element to turn off. Optionally, the controller generates the one or more shutdown signals only if the class information or criteria associated with the controller, the identified subscriber, equipment and/or other criteria matches class information or criteria associated with the shutdown command signal.

At step 1550, an optional M&V signal(s) is transmitted toward a utility company (ISO, RTO, CSP or other entity) to enable determination and/or verification of local energy usage (e.g., shutting down some portion of an HVAC unit) so as to determine in a fully automated manner application of any related compensation and continued levels of shut down procedures required.

In various embodiments, a first level of compensation is associated with a first or "most comfortable" range of temperature and/or relative humidity, a second level of compensation is associated with a second range of temperature and/or relative humidity, and so on up to a final level of compensation associated with a final or "least comfortable" range of temperature and/or relative humidity. Various embodiments also contemplate that temperature and/or motive humidity ranges, as well as compensation levels associated thereto, may be adapted in response to whether or not the climate controlled space is occupied or not. Generally speaking, a user willing to tolerate more discomfort would generally be entitled to increase compensation such as in the form of billing credits, direct payment or other form of compensation. In various embodiments, identification information associated with a particular HVAC controller implementing the methods described herein is linked to the appropriate subscriber account for tracking, compensation and other management purposes.

At step 1560, in response to receiving a restore command signal or a determination that a comfort level is no longer within an appropriate comfort range, the controller 1350 stops generating the one or more shutdown signals for equipment controlled thereby. For example, the controller may stop generating a shutdown signal and/or generate a restore signal configured to cause a compressor or fan of an air-conditioner to turn back on, or an electric heating element of a heating or domestic hot water heating unit to turn back on.

Optionally, the controller stops generating the one or more shutdown signals if the class information or criteria associated with the controller, related subscriber, equipment and/or other criteria no longer matches class information or criteria associated with a currently broadcast shutdown command signal. For example, in various embodiments it is contemplated that different staggered, alternate or other defined groupings of HVAC units are controlled in unison (e.g., every other apartment in an apartment building, particular users willing to tolerate more discomfort or otherwise prioritized in some manner). In various embodiments, it is contemplated that HVAC units receive a shutdown signal intended to last for a predefined period of time (e.g., five minutes 10 minutes 20 minutes and the like) beginning at the time in which control or command signal is received terminated.

Thus, in various embodiments, a digital or analog command signal is propagated toward power consumption locations such as various buildings, homes, apartments and the like in one or more regions of the service area associated with the utility company (ISO, RTO, CSP or other entity). The command signal is configured to cause a shutdown of one or more power consuming devices or portions thereof, but only if the predefined local conditions exist. For example, the command signal may be configured to cause the shutdown of compressors within air-conditioning units in one or more apartments of an apartment building, one or more homes in a suburban housing development, one or more offices or industrial sites and so on but only if such shutdown would not result in discomfort to occupants as predefined by the clients. Thus, a broadcast shutdown signal does not trigger an automatic shut down without regard to occupants; rather, compressor shutdown or other action is only invoked in response to the command signal if the local environment (e.g., apartment, office, room or house and the like) is comfortable for occupants such as defined with respect to a predefined temperature range, relative humidity range, occupancy state and so on.

Similarly, in various embodiments, a digital or analog (M&V) signal is propagated from the power consumption locations toward a utility company, CSP/aggregator or other entity to provide information pertaining to local power quality (including blackouts or brownouts), power consumption, temperature, relative humidity, occupancy, equipment type, equipment condition, equipment service information/alerts, equipment or service tampering indicators, impact upon consumers and/or other types of information. Thus, these embodiments contemplate a communication mechanism for delivering information from consumers toward a service entity, such as via an Internet link or other communications link. M&V signals associated with multiple local equipment control devices may be aggregated locally and propagated via a back channel supported by a landline or cellular telephone network, cable television network, satellite communication network or other communication network.

Thus, various embodiments advantageously encourage end user participation and reduce the likelihood of end users opting out of any DR event because FADRS® smart grid technology is human centric (achieving electric reduction goals takes second place to human/occupant/client comfort). This is encouraged by adhering to respective ranges or threshold levels of temperature, relative humidity, $CO_2$ and/or other sensor-derived information pertaining to the space being cooled or heated. In various embodiments, these specific sensor-derived information and/or the threshold levels or ranges of such information indicative of one or more levels of comfort (or discomfort) tolerated by end users are agreed to by end users In this manner, customers are paid on how well they perform. The more kW demand the customer reduces, the more financial incentive received and vice versa. If the customer "opts out" then they either receive some financial incentive for the kW they reduced as a percentage of the duration of the Demand Response event or they get no financial compensation at all. In this manner, a human centric or "Painless Demand Response™" approach to DR opt-in levels and compensation for doing so is achieved. Various embodiments contemplate that differing credits, offsets, payments and the like may be provided to those users who opt in to the DR system, and at value levels in accordance with, illustratively, the level of discomfort agreed to by the users.

FIGS. 13-15 are generally discussed within the context of controlling HVAC equipment (room or building or household heating or cooling equipment) in a manner retaining human/occupant comfort as measured by, illustratively, temperature and relative humidity. However, various other embodiments are also contemplated by the inventor. In particular, various embodiments contemplate more general control of power consuming units with for HVAC purposes or other purposes. Moreover, in addition to or instead of considering temperature or relative humidity ranges, other load specific criteria are considered in determining whether or not a shut off signal associated with a power consuming unit should be transmitted to that unit. Thus, in various embodiments, the apparatus of FIG. 14 may be modified to accept other criteria (OC) in addition to or instead of temperature and relative humidity, which other criteria may be used in addition to or instead of temperature and relative humidity criteria within the context of the method 1500 of FIG. 15. That is, rather than comfort-related criteria the various embodiments may be adapted to consider load specific criteria in addition to or instead of the comfort-related criteria.

Figure 16:
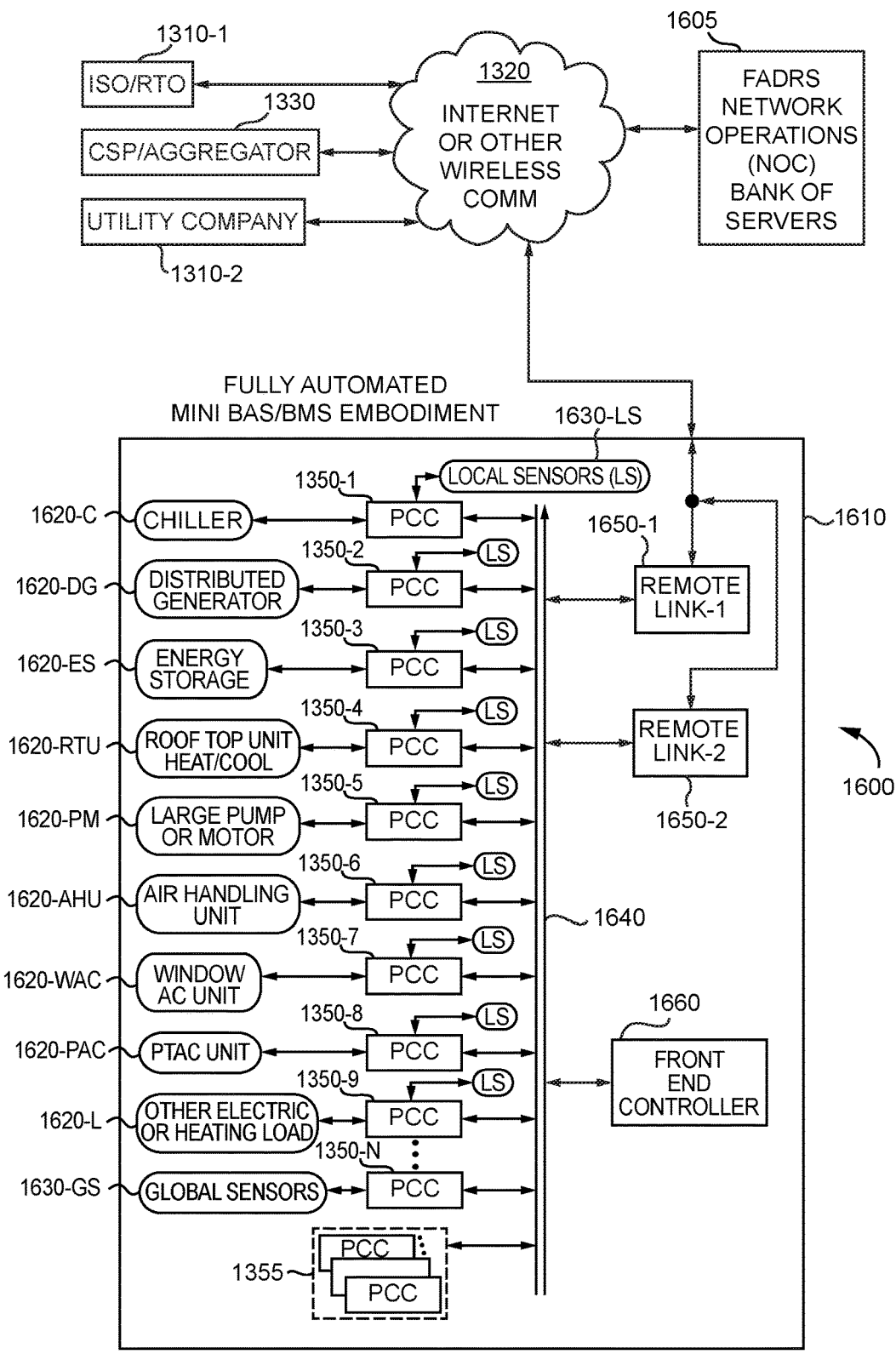
FIG. 16 is a block diagram of an exemplary system in accordance with one embodiment.

FIG. 16 contemplates an exemplary system 1600 in which one or more of a utility company 1310-2, Independent Service Operator (ISO) or Regional Transmission Organization (RTO) or similar entity 1310-1, Energy Curtailment Service Provider (ECSP or CSP) or aggregator or similar entity 1330 communicates via the Internet 1320 (or some other wireless or wired communications network) with a Network Operations Center (NOC) 1605 configured to provide the various FADRS functions as described above with respect to one or more of FIGS. 1-15.

FIG. 16 also depicts a fully automated Building Automation System (BAS) (or Building Management System (BMS)) 1610 operative to autonomously perform various FADRs functions including demand management functions. In particular, the BAS 1610 comprises a plurality of autonomous power consumption controllers (PCCs) 1350-1 through 1350-N (collectively PCCs 1350), each PCC 1350 being in communication with, and capable of adapting the operation of, one or more respective energy consuming devices, energy producing devices, or energy consuming and producing devices 1620 (load devices). Such operational adaptation may comprise changing operating mode of a power consuming device (e.g., turning off an air conditioning compressor while leaving a fan on, causing an energy storage device to stop drawing power from the grid, performing peak shaving, demand response, frequency regulation and the like), initiating a turn-on sequence for an energy producing/generating device (e.g., starting a generator, bringing a bank of batteries online and the like), and/or generally causing one or more power consuming devices to operate in a manner consistent with demand response, peak shaving, energy efficiency, frequency regulation or other requirements.

Figure 17:
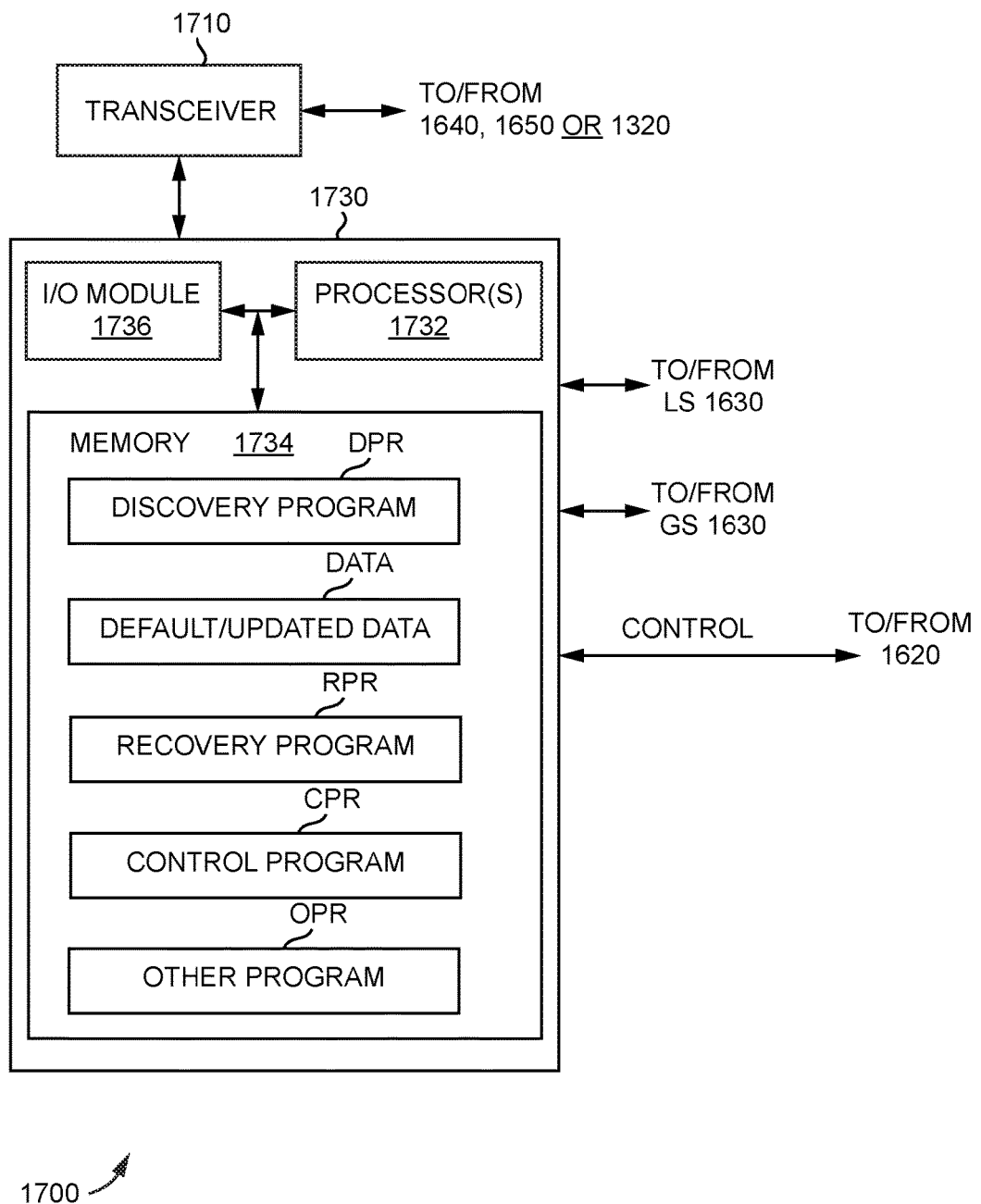
FIG. 17 is a block diagram of a power consumption controller (PCC) according to one embodiment.

The autonomous power consumption controller (PCC) 1350 described herein with respect to FIG. 16 is suitable for use in various embodiments including those depicted and described with respect to FIGS. 12-18 such as the PCC 1700 of FIG. 17 and various control modules described in the various figures.

As depicted in FIG. 16, PCCs 1350-1 through 1350-9 communicate with and are configured to adapt the operation of, respectively, a chiller 1620-C, a distributed generator 1620-DG, an energy storage device 1620-ES, a rooftop heating/cooling unit 1620-RTU, a pump or motor 1620-PM, an air handling unit 1620-AHU, a window AC unit 1620-WAC, a PTAC unit 1620-PTAC and some other type of electrical heating load 1620-L. Each of PCCs 1350-1 through 1350-9 are also depicted as receiving local sensor (LS) information 1630-LS, such as inside space temperature, relative humidity (RH), CO2 levels, volatile organic compound (VOC) levels, electrical/mechanical parameters of the energy generating/consuming device (e.g., voltage levels, current draw, pump levels such as in gallons per minute, BTU, supply discharge and/or return temperatures and the like.

The Nth PCC 1350-N (illustratively a $10^{th}$ PCC) is depicted as receiving global sensor (GS) information 1630-GS such as sensor information from multiple devices throughout a building or group of buildings including outside ambient temperature, RH, CO2 and the like.

In various embodiments, one or more of the PCCs 1350 communicate with each other via a local communications means 1640, illustratively a wireless network, wired network or other communications means.

In various embodiments, one or more of the PCCs 1350 communicate with the Internet 1320 (or some other wireless or wired communications network) via one or more remote links 1650 such as to communicate with the FADRS NOC 1605.

In various embodiments, a front end controller 1660 configured to provide local control and coordination functions, store programs for each PCC 1350 and to communicate with the PCCs 1350, spare bank of PCCs 1355, FADRS NOC 1605 and/or other devices within or remote from the building being managed.

In various embodiments, a plurality of spare PCCs 1355 (i.e., a bank of spare PCCs) is provided as backup PCCs for use in the event of a failure of one or more active PCCs 1350. The spare PCCs may be coupled to the local communications means 1640 to enable thereby communications between member PCCs 1350 and the bank of spare PCCs 1355 and individual/active PCCs 1350, the front end controller 1660, the remote links 1650, the FADRS NOC 1605 and/or other entities.

FIG. 17 is a block diagram of a power consumption controller (PCC) according to one embodiment. Specifically, the PCC 1700 of FIG. 17 may be used to implement, illustratively, a power consumption controller 1350 such as described above with respect to FIG. 16, as well as controllers described above with respect to the various other figures (i.e., the PCC 1700 described herein may be modified in many ways in accordance with the various embodiments described above with respect to FIGS. 1-16).

As depicted in FIG. 17, the PCC 1700 generally comprises a transceiver 1710 and control module 1730 which, while depicted as separate entities, may be included within a single entity such as entirely within the control module 1730.

The transceiver 1710 is depicted as facilitating communications between the control module 1730 and one or more of the local communications means 1640, remote links 1650 or Internet 1320. As previously noted, the local communications means 1640 supports communications between multiple PCCs 1700, such as within the context of a number of controllers disposed within a building or other facility.

The control module 1730 comprises one or more processors 1732, a memory 1734 and an input/output (I/O) module 1736, which may be implemented in a manner such as those described above with respect to the general-purpose computer 1200 of FIG. 12. Generally speaking, the memory 1734 includes various software modules comprising computer instructions which, when executed by the one or more processors 1732, perform specific functions.

Memory 1734 is depicted as including computer instructions for implementing a discovery program routine (DPR) which performs a discovery process in response to a power-on condition or discovery trigger signal received from a local or remote entity associated with the PCC 1700. The DPR performs various functions including identifying and communicating with connected energy consuming devices, energy producing devices, or energy consuming and producing devices 1620 such that default control parameters (or updated control parameters) may be retrieved and used within the context of an autonomous control mode invoked using a control program routine (CPR) as discussed below. The DPR also initiates communications with nearby PCCs via, illustratively, the local communications means 1640 (e.g., local Wi-Fi network, local ethernet network and so on). In this manner, the PCC 1700 identifies for itself the entities 1620 which it is tasked with controlling as well as the adjoining/neighboring PCCs forming the BAS/BMS 1610.

Memory 1734 is depicted as including computer instructions for implementing a control program routine (CPR) as well as other program routines (OPR) for performing various control functions and/or other functions as described herein.

In an autonomous control mode, the CPR causes the PCC 1700 to control its respective connected energy consuming, energy producing or energy consuming and energy producing devices 1620 in accordance with default or updated data (DATA) retrieved from memory 1734. The autonomous control mode contemplates that each type of device 1620 is associated with a respective profile, which profile defines the operating parameters of the device 1620, any timing or scheduling of changes to such operating parameters, any particular response to be taken in view of different demand response initiatives/commands and so on.

In a non-autonomous control mode, the CPR causes the PCC 1700 to control its respective connected energy consuming, energy producing or energy consuming and energy producing devices 1620 in accordance with command received by, illustratively, the FADRS NOC 1605 or other controlling entity. In various embodiments, the parameters associated with one or more of the devices 1620 may be modified by the FADRS NOC 1605 or other controlling entity for use by the PCC 1700 upon returning to the autonomous control mode.

Thus, unless the NOC (which has priority control depending upon system configuration) sends a command causing the PCC to enter the non-autonomous control mode, the PCC will remain in the autonomous control mode and be fully capable of controlling the specific load or controlled device in a fully automated manner (i.e., consistent with the FADRS fully automated load management and control concepts discussed herein).

Memory 1734 is depicted as including computer instructions for implementing a recover program routine (RPR) which performs a recovery process in response to determination that a performance goal associated with a controlled energy consuming/generating device has not been achieved within a reasonable or predicted time frame. A performance goal may include the cooling or heating of a room, causing a pump to operate at an expected pressure level, causing a generator to produce an expected level of power and so on.

Performance goals associated with an energy consuming/producing device may be included within the control profile associated with that device. In these embodiments it is contemplated in various embodiments that the autonomous mode of operation further includes retrieving and examining measurement information sufficient to evaluate performance goals associated with one or more load devices. Optionally, in various embodiments the non-autonomous mode of operation also includes retrieving and examining measurement information sufficient to evaluate performance goals associated with one or more load devices.

Performance goals may be included within commands provided to the PCC by a local or remote control entities. In these embodiments performance goals provided via direct command to the PCC may be used to temporarily (e.g., for the duration of the immediate non-autonomous mode of operation of the PCC) or permanently override performance goal information included within the control profile of one or more load devices such that performance goal changes imparted to the PCC via a local or remote control device are utilized within the context of the autonomous mode of operation of the PCC.

Various types of performance goals are contemplated for use in the PCCs, and each PCC is optionally configured to determine whether the various performance goals associated with its corresponding controlled energy consuming/generating devices have been achieved within the relevant timeframe. If a performance goal associated with a load device has not been met, then there may be a problem with the PCC, the load device under its control, the goals themselves or some other factor.

Performance goals comprise predicted expectations associated with a load device under control of a PCC. Performance goals may be adapted in response to the environment within which a load device operates. For example, the goals associated with window air-conditioning units will vary depending upon the size of a room to be cooled. For example, if a performance goal or expectation is that after 30 minutes a rooftop A/C unit should drive a space temperature from 77° to 75° F. (or a heater raise a temperature of a space by 10° F., or a generator produce power at a particular level, or a generator pump water at a particular flow rate etc.), then a failure to drive the space temperature to 75° F. within an hour or some other period of time (or raise space temperature by 10° F., or produce power at a particular power level, or pump water at the particular flow rate etc.) may result in a determination of a failed performance goal such that a problem with the load device, the PCC or something else is indicated and a recovery mode of operation initiated.

In the recovery mode of operation a determination may first be made as to whether the load device is operating properly. That is, whether the nominal operating parameters of the device itself, any diagnostic information associated with the device and the like indicate that the load device is operating properly such that the load devices are probably not the source of the failure to achieve the performance goal. If the load device is operating properly, then the PCC itself may be malfunctioning, or executing an incorrect control profile, or executing a control profile with incorrect information or experiencing some other problem. The goal of the recovery mode of operation is to solve the problem without human intervention or, if necessary, solve the problem with less skilled human intervention (i.e., rather than requiring a service technician to diagnose the problem merely have local facilities staff perform a plug-and-play replacement of a faulty PCC with an automatically reprogrammed replacement PCC).

If the PCC is not achieving its objectives in terms of correctly controlling the energy consuming/producing equipment, interacting with the FADRS server or otherwise, the PCC will then perform one or more of the steps: (1) send an alarm to the FADRs NOC via one or more of the available communications channels; (2) access a local front end controller (e.g., at the job site or building location) and allow itself to be reprogrammed (e.g., reprogram the device profiles, control program and/or other PCC programs); (3) pass control of the energy consuming/producing device to a redundant/backup/spare PCC associated with the respective energy consuming/producing device (e.g., one of a bank of PCC spares/replacements 1355 deployed at the location); (4) access a PCC associated with a similar respective controlled device and cause that PCC to reprogram the PCC failing to meet its goals; and (5) take other measures as necessary to ensure that each device is properly controlled and control goals are met, such as requesting human/technician intervention.

Once the repaired/redundant PCC is in place, then a recurrence of the same problem (i.e., failure to achieve the same goal), then likely the problem is a device problem rather than a PCC problem and appropriate steps are taken (e.g., send event data to FADRS NOC and the like). It is noted that the PCCs may comprise relatively inexpensive devices configured to have a generic or base PCC function and in various embodiments is programmed to control any energy consuming/producing device at the job site, building or group of building utilizing the various embodiments. It is contemplated that unused/extra/spare PCCs may be configured to be programmed in response to a failure of an existing PCC such that non-technical personnel may perform a simple plug-and-play replacement of the failed PCC with a properly configured repaired/redundant PCC.

Within the context of a job site, building or group of buildings employing various embodiments, it is contemplated that the specific power consuming/producing equipment 1620 (i.e., the load devices) is known and that each of the load devices 1620 is assigned a particular PCC 1350 for control purposes. Each PCC 1350 is programmed so that it can control its assigned load device 1620 and communicate with other job site PCCs (e.g., including spares PCCs 1355), the front end controller 1660 and the front office NOC 1605. The front end controller 1660 and the NOC 1605 may utilize communications mechanisms 1640, 1650-1 and/or 1650-2. Each job site optionally includes a bank of spare PCCs 1355 connected to the local communications loop 1640, 1650-1 and 1650-2.

Figure 18:
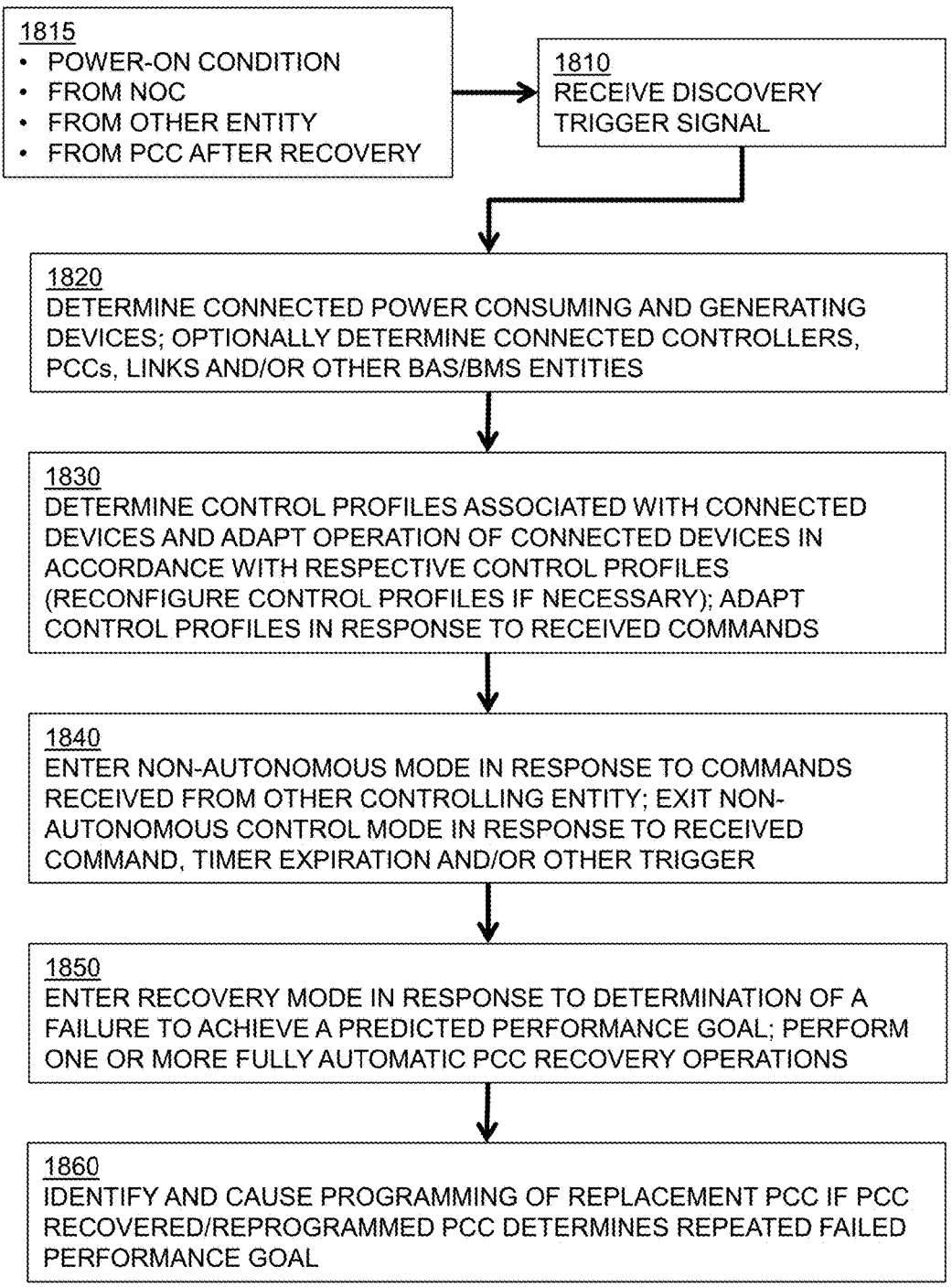
FIG. 18 depicts a flow diagram of a method according to one embodiment.

FIG. 18 depicts a flow diagram of a method according to one embodiment. Specifically, FIG. 18 depicts an operational method 18 associated with a PCC such as described above with respect to FIGS. 16-17.

At step 1810, the PCC receives a discovery trigger or PCC initialization signal. Referring to box 1815, the trigger or initialization signal may comprise a power-on or PCC initialization condition, a signal from a network operations center (NOC), or signal from some other controlling entity including, illustratively, another local PCC.

In response to the discovery trigger signal, the PCC enters a discovery mode of operation; specifically, at step 1820 the PCC determines any respective connected energy consuming and/or energy producing devices (including confirming it is connected to respective assigned equipment/device or devices) and, optionally, any connected controllers, other PCCs, communications links and/or other BAS/BMS entities. Generally speaking, the discovery mode of operations comprises the PCC utilizing available communications means, output control signals, input sensing/detecting signals and the like to detect/determine some or all of the various load devices (e.g., power consuming/producing devices), neighboring PCC devices, communications devices and the like operatively coupled to the PCC directly or indirectly.

After the discovery process, the PCC enters an initial autonomous operating mode. Specifically, at step 1830 the PCC starts controlling respective assigned equipment/device(s) and communicating with the local front end controller and NOC as well as communications access with the other active PCCs and spare PCCs on the job site. Further, the control profiles of the PCC are reconfigured if necessary, and from time to time, by the local front end controller or NOC. These communications will include program upgrades.

Generally speaking, the autonomous operating mode comprises controlling one or more load devices (e.g., power consuming/producing equipment/devices) in accordance with profile information defining the operating parameters and programming/control goals associated with the one or more load devices.

As previously stated, each PCC 1350 may be loaded with a FADRS program specific to its load device(s) 1620 (i.e., the device under its control). If a PCC is configured to control a specific device (e.g., a water pump, window air conditioner, power generator, battery backup system and the like), then the configured PCC includes all of the programming necessary for that specific device. If a PCC configured to control a specific device discovers that it is connected to such a device, then the PCC begins controlling the device as per its programming and begins communicating with the FADRs NOC and/or other control or monitoring entities by the various communications mechanisms described herein and in a fully automated manner. If a PCC configured to control a specific device discovers that it is not connected to such a device, then the PCC sends an alarm to the front end controller 1660 and the NOC 1605 requesting said connection.

Further at step 1830, the PCC adapts control profile information one or more load devices in response to received commands from, illustratively, the NOC 1605, other connected controllers, PCCs and so on. That is, while the PCC may continue to control the one or more load devices in an autonomous manner, the profile information defining how the one or more load devices should be controlled may be updated/adapted such that the PCC modifies its control of the one or more load devices.

At step 1840, the PCC enters a non-autonomous mode of operation in response to commands received from some other controlling entity, such as the NOC 1605, other connected controllers, PCCs and so on. In the non-autonomous mode of operation the PCC receives, and performs operations associated with, commands pertaining to demand response functions, operational functions, default parameters and the like. Generally speaking, the non-autonomous mode of operation the PCC is more directly controlled by a local or remote control entity such that the local or remote control entity asserts direct control of the one load devices connected to the PCC. The PCC exit the non-autonomous control mode in response to a received exit command, the expiration of a timer or some other trigger, at which time control by the PCC of the one or more load devices is performed in accordance with their respective control profiles.

At step 1850, the PCC enters a recovery mode of operation in response to a determination that one or more load devices have failed to achieve a predicted performance goal. In the recovery mode of operation, the PCC performs one or more of a fully automated sequence of PCC recovery operations such as described herein, including reprogramming the PCC using local or remote reprogramming information appropriate to the PCC in recovery mode and available at another PCC, a local front end controller, a remote network operations center or other source. The recovered/reprogrammed PCC is then caused to reenter discovery mode and autonomous operations mode via a trigger signal that is either self-generated or received from another PCC, front end controller or NOC.

The PCC predicts or otherwise generates performance goals associated with connected load devices such that a fully automated response is provided in the event of a failure of a connected device to meet a performance goal.

Performance goals associated with a load device are predicted in accordance with various factors relevant to the performance of the load device such as environmental factors (e.g., internal or external ambient temperature, relative humidity, carbon dioxide saturation and so on), load device capability/capacity, process or device performance factors (e.g., measurements including any of gallons per minute, amount of heat produced or removed, rate of heat production or removal, amount of energy processed, rate of energy processing, voltage, current, power factor, KW, KWh, discharge or return air temperatures, discharge or return water temperatures and the like), historical information pertaining to the performance of the specific load devices under control of the PCC (e.g., individual load device historical data), historical information pertaining to load devices of the same type as the load devices under control of the PCC (e.g., aggregated load device historical data).

Various embodiments contemplate comparing historical prediction data and respective actual historical data and utilizing artificial intelligence and prediction technology fully automatically calculate control changes required for both actual and predicted data to help improve predictions such as to converge prediction and actual outcomes to match within some acceptable performance criteria (e.g., 2.0% accuracy).

In various embodiments the PCC itself predicts the performance goals associated with the one or more load devices under its control. In various embodiments the PCC receives the performance goals associated with the one or more local devices under its control from, illustratively, the front end controller or NOC.

Based on the various information available to the PCC, the predicted performance goal may be defined in terms of an amount of time within which a particular result is expected to have been achieved (e.g., cooling or heating a room, pumping a liquid a predefined flow rate, reducing load device power consumption by a predefined amount and so on) or some other metric (e.g., cooling or heating rate, flow rates, charge rate, discharge rate, reduction in power consumption and the like). It is noted that some information such as aggregated historical information may be retrieved as needed from the NOC for use by the PCC in generating a predicted performance goal. It is further noted that the performance goal may vary as environmental factors vary such that the performance goal is dynamically predicted as needed (e.g., at step 1850 below) in view of present environmental factors Generally speaking, the PCC enters the recovery mode of operation when an predicted/expected result has not been achieved, such as within a reasonable or predicted time frame. Such a result may be achieving the cooling or heating of a room, causing a pump to operate at an expected pressure level, causing a generator to produce an expected level of power and so on. Performance goals associated with a energy consuming/producing device may be included within the control profile associated with that device. Performance goal information may be included within commands provided to the PCC by local or remote control entities.

At step 1860, if the recovered/reprogrammed PCC still exhibits the same performance goal failure, then the problem is likely with the PCC itself rather than the programming of the PCC. That is, if after the automated recovery mode the initially determined failed performance goal is still occurring, then a replacement/spare PCC is automatically identified and programmed by the front end controller 1660, and failing that, by the NOC 1605, to perform the functions of the failing PCC.

The replacement PCC may comprise any of a redundant/spare PCC installed proximate the reprogrammed PCC (optionally prewired to assume control of the one or more corresponding lower devices), an available PCC within the bank of spare PCCs 1355, a PCC associated with a low priority load device (e.g., a nearby PCC controlling a window air conditioning unit or some other lower priority device as compared with a higher priority device such as a generator or battery management system) or some other PCC.

In the case of a replacement/spare PCC comprising a redundant PCC wired or otherwise in communication with the one or more corresponding load devices of the failing PCC, the entire process of shifting control of the one or more corresponding load devices from the failing PCC to the replacement PCC may occur automatically (i.e., without human intervention). In the case of a replacement PCC that is not wired or otherwise capable of immediately controlling the one or more corresponding load devices, lower skilled human intervention (i.e., not a highly skilled service technician) may be employed to simply replace the failing PCC with the replacement/spare PCC in a plug-and-play or "drop in" manner.

The above-described PCCs operate in various individual and cooperative modes to control respective devices as discussed herein. To summarize, in various embodiments:

1. Each PCC autonomously controls the load or generating equipment it is connected to.
2. Each PCC autonomously performs performance analytics of the load or generating equipment it is connected to.
3. The job site "front end" controller hosts a complete set of programming for each PCC on the job site and can, among many other functions, be used for reprogramming corrupted PCCs, programming spare PCCs, BAS control and communication to the FADRS NOC.
4. If an "active" PCC determines that the equipment it is connected to is not operating efficiently and/or as intended or is not achieving its goals per its AI and Prediction technology calculations, it will send an alarm via one of its two (2) communications links (A or B) for human technicians to arrange for a service call to ascertain and correct the potential equipment malfunction.
5. If an "active" PCC determines that the equipment it is connected to is working efficiently but either not as intended or not achieving its goals per its AI and Prediction technology calculations, it will conclude that something is corrupted with its programming. It then changes state to a "problem" PCC. The "problem" PCC will then perform many novel actions that will reduce service calls/truck rolls, enhance BAS system stability, reliability and resilience and save time and money with NO HUMAN INTERVENTION. For example:

a. The "problem" PCC will follow a prearranged hierarchal protocol, including but not limited to, the following:
   1) Send an alert to FADRS NOC of potential programming issue.
   2) Simultaneously send an alert to the job site "front end" controller AND requesting that the job site "front end" controller reprogram said "problem" PCC.
   3) The job site "front end" controller will place the affected equipment in a "default mode" and "uninstall" the "problem" PCC's software program and reinstall its original software programming from the job site "front end" controller's data base. It will reset the "problem" PCC and restart.
   4) If the "problem" PCC then takes control of its load or generation equipment and everything resumes proper operation, then it will simply send a "normal" status to the job site "front end" computer and its status will change to an "active" PCC. This "normal" status will be accompanied by a time and dated service report indicating the steps that were taken.
   5) However, if the "problem" PCC takes control of its load or generation equipment and things are still not working properly, then it will send a signal to the job site "front end" controller which will then program an appropriate spare PCC from the "PCC Spare Bank". It will then:
      a) Have the spare, newly programmed PCC take control of the "problem" PCC's equipment, place the "problem" PCC into "sleep" mode and send an alarm along with time date and stamped service ticket to the FADRS NOC for a human technician to visit the job site and repair or replace the "problem" PCC and check out operation of the equipment it was connected to currently running off of the "spare" PCC or
      b) If this is not possible, then any handyman trained on minor FADRS repairs, can take the "problem" PCC and switch it out with the "preprogrammed" spare PCC and get the "problem" PCC's equipment back on line until a human technician from FADRS arrives at the job site and repairs the "problem" PCC or arranges to get it replaced under warranty while taking time to check out operation of the equipment it was connected to that is currently running off of the "spare" PCC.
   6) If for some reason, the "problem" PCC cannot successfully be automatically reprogrammed by the job site "front end" controller, then the "problem" PCC will go to a "sister" PCC on the redundant network (Links A and B) that controls a similar load or generating equipment and copy its program. It will also send an alarm to the job site "front end" AND the FADRS NOC to have a software technician "tweak" its parameters to reflect the piece of equipment it is actually connected to. This alarm will be accompanied by a time and dated service report indicating the steps that were taken.
   7) If the load or generation equipment that the "affected" PCC is connected to starts to function properly then it will send a notice to the job site "front end" controller AND the FADRS NOC that all is normal. This "normal" status will be accompanied by a time and dated service report indicating the steps that were taken.
   8) If all is still not normal, then the "affected" PCC will send an alarm to the job site "front end" controller AND the FADRS NOC making a second request for a human technician to determine the cause of the problem and make the appropriate repairs.

The various embodiments provide a number of novel improvements over existing power management systems, BAS/BMS such as the following:

1. Typically a "front end" job site controller is used as a human interface into the system of distributed controllers handling one or more loads (consuming or generating). The above-described "front end" can be used in this manner, but is also configured to act as a "triage" unit that holds onto programs for each PCC (distributed controller) in the system.

2. Typical distributed controllers require human intervention to determine whether or not they need repair or reprogramming, but above-described system requires no human intervention for those services as the above-described job site PCCs determine for themselves that they have a problem and go through a series of pre-programmed steps to repair themselves if they determine this to be the case, such as follows:
   a. "Failing" PCC, has two (2) "go to sources" for job site repair:
      1) The "front end" controller (First Source) AND
      2) A PCC that is operating a similar type load or generator
      FIRST SOURCE:
   b. The "failing" PCC "calls" the "Front End" job site controller in a fully automated manner to reprogram it with the correct FADRS programming without having to call the "front office" NOC center (The "front end" controller sends an alert to the "front office" NOC over the Internet to advise what is going on however the NOC does not have to take action at this time).
   c. If the "Front End" controller can reprogram the "failing" PCC, then the "failing" PCC becomes a "functioning" PCC and goes about its assigned tasks. The "front end" controller sends a report to the NOC over the Internet stating everything is back to normal.
   d. However, if the "front end" controller cannot reprogram the "failing" PCC, then it does the following in a fully automated way:
      1) Selects a "Standby Generic" PCC from the "BULL PEN" and programs it with the same program the that the "failing" PCC would typically have. The "Standby Generic" PCC then either takes over all functions of the "failing" PCC OR is now ready for a job site "handyman" to switch out the "failing" PCC with the "Standby Generic" PCC.
      SECOND SOURCE:
   e. If for some reason, the "front end" controller cannot accomplish task "d" then the "failing" PCC already has been programmed to know a second "go to source" for repair, namely a properly operating PCC that performs a similar function.
   f. If the "failing" PCC can copy the FADRS program from such a "properly operating" similarly programmed PCC, then it goes from being a "failing" PCC to a "functioning" PCC and goes about its job. However, it does send an alarm to the FADRS "front office" NOC to have a human software technician make REMOTE load specific changes over the Internet and confirm proper operation. Still, a Human Serviceman has not been dispatched.

g. If the "failing" PCC cannot copy the FADRS program from such a "properly operating" similarly programmed PCC, the it sends an alarm to the "front end" controller AND the "front office" NOC to send a human serviceman to the job site to correct the situation.

The various fully automated operations disclosed herein reduce truck rolls and unnecessary service calls by about 80%.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system providing fully automatic control of controlled devices within a building or group of buildings, wherein the controlled devices comprise at least one of energy producing devices, energy consuming devices, and energy producing/consuming devices, the system comprising:
    a plurality of power consumption controllers (PCCs) configured to provide control signals to respective ones of said controlled devices;
    each PCC comprises a processor configured for operating in at least a discovery mode of operation, an autonomous mode of operation and a recovery mode of operation;
    said discovery mode of operation being triggered by a PCC initialization, and comprising (a) determining a respective controlled energy consuming/producing device associated with said PCC, and (b) determining a set of control instructions corresponding to the respective controlled device;
    said autonomous mode of operation comprising (a) generating a control signal adapted to cause the respective controlled device to operate in accordance with the corresponding set of control instructions, and (b) modifying the control signal in response to received sensor information;
    said recovery mode of operation being triggered by a determination that a predicted performance goal associated with a respective controlled device has not been achieved, and comprising (a) automatically determining an operational state of the respective controlled device based on operating parameters and diagnostic information associated with the controlled device, and (b) based on the determined operational state of the controlled device, invoking an automated reprogramming of the PCC;
    wherein if said determination that a predicted performance goal associated with the respective controlled device has not been achieved after said automatic reprogramming of said PCC has been invoked, then a replacement PCC is identified and programmed in a fully automated manner, and control of the respective control device is transferred to the replacement PCC;
    wherein said replacement PCC comprises one of a redundant PCC installed in the system, an available PCC within a bank of spare unused PCCs connected to the system by a network, or a PCC associated with an energy consuming device having a lower priority than another energy consuming device of the system.

2. The system of claim 1, wherein said PCC initialization comprises a power-on initialization of the PCC.

3. The system of claim 1, wherein said PCC initialization comprises a received triggering signal.

4. The system of claim 1, wherein automated reprogramming of the PCC is invoked by the PCC transmitting a software initialization request toward a front end controller associated with the building or group of buildings, said front end controller having programming information appropriate to the PCC to be reprogrammed.

5. The system of claim 1, wherein automated reprogramming of the PCC is invoked by the PCC transmitting a software initialization request toward another PCC associated with the building or group of buildings, said other PCC having programming information appropriate to the PCC to be reprogrammed.

6. The system of claim 1, wherein automated reprogramming of the PCC is invoked by the PCC transmitting a software initialization request toward a network operations center (NOC) associated with the building or group of buildings, said NOC having programming information appropriate to the PCC to be reprogrammed.

7. The system of claim 4, wherein programming information appropriate to the PCC to be reprogrammed is retrieved from the front end controller.

8. The system of claim 1, wherein said discovery mode of operation of said PCC is triggered after reprogramming of said PCC.

9. The system of claim 1, wherein said triggering of said discovery mode of operation after reprogramming comprises one of self triggering by said PCC, or a discovery trigger signal received from at least one of the front end controller, another PCC or a network operations center (NOC).

10. The system of claim 4, wherein said PCC transmits an error signal to said front end controller or a network operations center (NOC) identifying the replacement PCC.

11. The system of claim 1, wherein the performance goal associated with the respective controlled device is predicted using one or more of environmental or process factors associated with the controlled device.

12. The system of claim 11, wherein the one or more environmental factors associated with the controlled device comprise any of outside ambient temperature, outside relative humidity, outside carbon dioxide saturation, inside space temperature, inside relative humidity and inside carbon dioxide saturation.

13. The system of claim 11, wherein the one or more process factors associated with the controlled device comprise device performance measurements including any of gallons per minute, amount of heat produced or removed, rate of heat production or removal, amount of energy processed, rate of energy processing, voltage, current, power factor, electrical power, electrical power rate, discharge or return air temperatures, discharge or return water temperatures.

14. The system of claim 12, wherein the one or more environmental factors associated with the controlled device may comprise any of capability/capacity data associated with the controlled device, historical data associated with the controlled device and historical data pertaining to other controlled devices.

15. The system of claim 13, wherein the one or more process factors associated with the controlled device may comprise any of capability/capacity data associated with the controlled device, historical data associated with the controlled device and historical data pertaining to other controlled devices.

16. The system of claim 1, wherein the predicted performance goal is adapted using comparisons of historical prediction data and respective actual historical data.

17. The system of claim 7, wherein in response to said front end controller failing to provide said programming information appropriate to the PCC to be reprogrammed, said programming information appropriate to the PCC to be reprogrammed is retrieved from a network operations center (NOC).

18. A method for providing fully automatic control of controlled devices within a building or group of buildings, wherein the controlled devices comprise at least one of energy producing devices, energy consuming devices, and energy producing/consuming devices, each of the controlled devices being controlled by a respective power consumption controller (PCC) configured to provide control signals thereto, the method comprising:
- at each PCC, entering a discovery mode of operation triggered by a PCC initialization, and comprising (a) determining a respective controlled energy consuming/producing device associated with said PCC, and (b) determining a set of control instructions corresponding to the respective controlled device;
- at each PCC, entering an autonomous mode of operation comprising (a) generating a control signal adapted to cause the respective controlled device to operate in accordance with the corresponding set of control instructions, and (b) modifying the control signal in response to received sensor information;
- at each PCC, entering a recovery mode of operation triggered by a determination that a predicted performance goal associated with a respective controlled device has not been achieved, and comprising (a) automatically determining an operational state of the respective controlled device based on operating parameters and diagnostic information associated with the controlled device, and (b) based on the determined operational state of the controlled device, invoking an automated reprogramming of the PCC;
- wherein if said determination that a predicted performance goal associated with the respective controlled device has not been achieved after said automatic reprogramming of said PCC has been invoked, then a replacement PCC is identified and programmed in a fully automated manner, and control of the respective control device is transferred to the replacement PCC;
- wherein said replacement PCC comprises one of a redundant PCC installed in the system, an available PCC within a bank of spare unused PCCs connected to the system by a network, or a PCC associated with an energy consuming device having a lower priority than another energy consuming device of the system.

19. A power consumption controller (PCC) configured to provide fully automatic control of a controlled device comprising one of an energy consuming device, an energy producing device, and an energy producing/consuming device within a building or group of buildings, the PCC comprising:
- a processor configured for operating said PCC in at least a discovery mode of operation, an autonomous mode of operation and a recovery mode of operation; and
- a control circuit, configured to provide control signals to the respective controlled device;
- said discovery mode of operation being triggered by a PCC initialization, and comprising (a) determining a respective controlled energy consuming/producing device associated with said PCC, and (b) determining a set of control instructions corresponding to the respective controlled device;
- said autonomous mode of operation comprising (a) generating a control signal or set of control signals adapted to cause the respective controlled device to operate in accordance with the corresponding set of control instructions, and (b) modifying the control signal(s) in response to received sensor information;
- said recovery mode of operation being triggered by a determination that a predicted performance goal associated with a respective controlled device has not been achieved, and comprising (a) automatically determining an operational state of the respective controlled device based on operating parameters and diagnostic information associated with the controlled device, and (b) based on the determined operational state of the controlled device, invoking an automated reprogramming of the PCC;
- wherein if said determination that a predicted performance goal associated with the respective controlled device has not been achieved after said automatic reprogramming of said PCC has been invoked, then a replacement PCC is identified and programmed in a fully automated manner, and control of the respective control device is transferred to the replacement PCC;
- wherein said replacement PCC comprises one of a redundant PCC installed in the system, an available PCC within a bank of spare unused PCCs connected to the system by a network, or a PCC associated with an energy consuming device having a lower priority than another energy consuming device of the system.

* * * * *